(12) United States Patent
Okamoto

(10) Patent No.: US 6,538,738 B1
(45) Date of Patent: Mar. 25, 2003

(54) METHOD FOR EVALUATING OPTICAL MODULATION CHARACTERISTICS OF LIQUID CRYSTAL MODULATION ELEMENT, LCD DEVICE PRODUCED BY APPLYING THE METHOD, DEVICE FOR EVALUATING OPTICAL MODULATION CHARACTERISTICS OF LIQUID CRYSTAL MODULATION ELEMENT, COMPUTER-READABLE STORAGE MEDIUM STORING PROGRAM FOR EVALUATING OPTICAL MODULATION CHARACTERISTICS OF LIQUID CRYSTAL MODULATION ELEMENT

(75) Inventor: Masayuki Okamoto, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 26 days.

(21) Appl. No.: 09/713,042

(22) Filed: Nov. 16, 2000

(30) Foreign Application Priority Data

Nov. 16, 1999 (JP) .............................. 11-326012

(51) Int. Cl.⁷ .................................. G01J 4/00
(52) U.S. Cl. ....................................... 356/364
(58) Field of Search ................ 356/364, 351, 356/361, 362, 365, 368; 349/18, 117, 118, 120, 121; 359/634, 494, 497, 498, 491

(56) References Cited

U.S. PATENT DOCUMENTS 5,990,996 A * 11/1999 Sharp ........................ 349/119
5,999,240 A * 12/1999 Sharp et al. ................ 349/119

FOREIGN PATENT DOCUMENTS

JP          06167708      6/1994
JP          2616014       3/1997

OTHER PUBLICATIONS

William A. Shurcliff, "Polarized Light Production and Use", Harvard University Press, 1962; pp. 18–29, 94–99, 108–123 and 164–171.

M. Okamoto et al., "Optical Design of the LC Layer on Reflective LCDs with a Single Polarizer", Eco. Tech. Dev. Ctr., IDW '99, pp. 49–52.

Emma Beynon et al., "Single Polariser Reflective Twisted Nematics", SID 1997, pp. L–34 to L37.

M. Shibazaki et al., "Reflective LCD with High Brightness and Wide Viewing Angle By Using Optically COmpensated Twist–LC Cell (OCT)", SID 1999 Digest, pp. 690–693.

O. Itou et al., "Development of Reflective Color STN–LCD Using A New Optimizing Method of Retarders and Polarizer", SID 1998 Digest, pp. 766–769.

C.H. Gooch and H.A. Tarry, "The Optical Properties of Twisted Nematic Liquid Crystal Structures with Twist Angles<90 ", J. Phys. D: Appl. Phys, vol. 8, 1975, pp. 1575–1584.

* cited by examiner

*Primary Examiner*—Michael P. Stafia
(74) *Attorney, Agent, or Firm*—Birch, Stewart, Kolasch & Birch, LLP

(57) ABSTRACT

A quantity of modulation of brightness of bright display with respect to dark display is determined by obtaining a Mueller matrix regarding light since immediately before incidence to an optically anisotropic object until immediately after outgoing therefrom. It is possible to provide a method for evaluating optical modulation characteristics of a liquid crystal modulation element, in which: an index indicative of the brightness modulation quantity as an optical modulation characteristic of the liquid crystal modulation element is expressed by a general method that does not depend on the number of design parameters of optical elements to be finally determined; therefore, a value of the optical characteristic can be simply determined; and consequently conditions of design parameters necessary for optimizing the optical modulation characteristics and providing satisfactory optical modulation can be easily found.

16 Claims, 26 Drawing Sheets

METHOD FOR EVALUATING OPTICAL MODULATION CHARACTERISTICS OF LIQUID CRYSTAL MODULATION ELEMENT, LCD DEVICE PRODUCED BY APPLYING THE METHOD, DEVICE FOR EVALUATING OPTICAL MODULATION CHARACTERISTICS OF LIQUID CRYSTAL MODULATION ELEMENT, COMPUTER-READABLE STORAGE MEDIUM STORING PROGRAM FOR EVALUATING OPTICAL MODULATION CHARACTERISTICS OF LIQUID CRYSTAL MODULATION ELEMENT

FIELD OF THE INVENTION

The present invention relates to a method for evaluating optical modulation characteristics of a liquid crystal modulation element, a liquid crystal display device produced by applying the foregoing method, a device for evaluating optical modulation characteristics of the liquid crystal modulation element by the foregoing evaluating method, and a computer-readable storage medium storing a program for evaluating optical modulating characteristics of a liquid crystal modulation element by the foregoing evaluating method.

BACKGROUND OF THE INVENTION

A liquid crystal display (LCD) device is widely used as display device of an electronic apparatus, and the Jones matrix method is known as typical optical characteristic computing means. In this method, by expressing transmission of an electric field by light with a matrix with complex number elements in two rows and two columns (Jones matrix) and an input electric field of light with a complex vector with two rows and one column (Jones vector), and by operating the Jones matrix to the Jones vector, an electric field of the output light can be expressed and calculated in the same form of the Jones vector. This method is widely applied to optical designing of LCD elements since calculations conducted in the method are easy.

However, the foregoing designing method has two drawbacks shown below. First of all, (1) it is difficult to quickly understand a change in a polarization state with a phase difference, and (2) it is difficult to express a change in a polarization state of light in the case where a medium showing characteristics that may cause depolarization due to the scattering and the like is placed in a path of light.

The foregoing drawbacks can be solved by the Mueller matrix method that is another method of expression of polarization utilizing matrices. In this method, a polarization state is expressed with a Stokes's vector with real number elements in four rows and one column, and a change in a polarization state is expressed by a matrix with real number elements in four rows and four column (Mueller matrix). In the case where a polarized light is in a pure state (monochromatic light that does not require statistical averaging), particularly, such a polarization state can be expressed as a point on a spherical surface (Poincaré Sphere) with its radius being proportional to an intensity of the light. A change in the polarization state due to transmission with a normal phase difference is expressed by rotational transform on the surface of the Poincaré sphere. By so doing, the foregoing drawback (1) can be solved, with such quickly-understood expression. Further, this method is characterized in that expression of light in a mixed state (a monochromatic light that requires statistical averaging), which means that transmission characteristics of a medium that scrambles polarization (for instance, a scatterer with a strong scattering effect) can be expressed with the Mueller matrices.

Regarding these natures about polarization, details are described in "Polarized light: production and use", William A. Shurcliff, Harvard University Press, 1962.

Conventionally, the aforementioned Jones calculating method has been used for predicting optical characteristics of liquid crystal display elements. This process is generally as follows. First, an optical configuration of a liquid crystal element or the like is set, and optical characteristics are calculated by calculating means such as the Jones matrix method, etc., then, the designer adjusts the optical configuration, considering the result of calculation and other design factors. Further, expressing design factors predicted by the designer beforehand as design parameters and adopting values of design parameters that optimize final characteristics is generally conducted. A reflection-type single-polarizing-plate LCD device in which a single polarizing plate is provided on the observer's side and a reflection plate is provided on the liquid crystal layer side, in particular, is disclosed in the Japanese Publication for Laid-Open Patent Application No. 236523/1990 (Tokukaihei 2-236523 [Date of Publication: Sep. 19, 1990]) (Japanese Patent No. 2616014) and the Japanese Publication for Laid-Open Patent Application No. 167708/1994 (Tokukaihei 6-167708 [Date of Publication: Jun. 14, 1994]).

According to conventional optical designs of liquid crystal modulation elements to which the foregoing designing method was applied, designing was conducted through the following flow. First, design parameters including characteristics and configurations of respective optical factors such as optical elements involved in display (polarizing elements such as a polarizing plate, a phase difference plate, a liquid crystal layer), control factors (voltages, etc.) for a liquid crystal layer, etc. are set to specific values intended by the designer. Then, transmittance (or reflectance) of light passing through the entirety of the optical element is calculated by means of Jones matrices or the like, and the result is judged by the designer. In the case where it is judged as inadequate, values of the design parameters are changed.

By the foregoing conventional designing method, however, even in the case where optimal solutions are obtained by correct calculations based on the optical principles in design parameter ranges assumed by the designer, a possibility that further better solution might be obtained in design parameter ranges outside the foregoing range cannot be denied. It follows that it is impossible to surely find the truly optimal setting.

Actually, as to the reflection-type signal-polarizing-plate liquid crystal display device disclosed, a range of the types of optical elements and a range of configurations thereof that the designer supposes are narrow.

More specifically, though calculations of polarization states are appropriately carried out in the foregoing Tokukaihei 2-236523, a guideline for designing a liquid crystal layer in cases including the case where a phase difference plate is used is not taught. Further, obtained in the publication is only an optimal solution in the case of an extremely restricted arrangement in which alignment (director) when a transmission axis (absorption axis) of a polarizing plate is parallel or orthogonal with respect to an alignment orientation of liquid crystal in an area of contact with a polarizing-plate-side substrate. Further, an optimal setting found in result is, in the case of liquid crystal alignment with twist, a setting in which the twist is 63° and a product Δnd of a thickness of a liquid crystal layer (d) and a refraction index difference (Δn) is 193 nm. Further, a case where circularly polarized light enters the liquid crystal layer is taken as an example in the disclosure of the foregoing publication, and the foregoing setting is regarded as optimal in this case as well.

Incidentally, in the disclosure of the foregoing publication, a liquid crystal alignment is limited to the following specific case: among the two types of liquid crystal alignment applied for bright display and for dark display, respectively, one is horizontal alignment with uniform twist, while the other is completely vertical alignment. This means that a combination of voltages applied to the liquid crystal layer is limited to the ideal of 0V and an infinite voltage, and this is far different from voltages actually applied to a liquid crystal modulation element.

Further, in the foregoing Tokukaihei 6-167708, the type and position of provision of the phase difference plate is restricted, and cases where a different type of a phase difference plate is used or cases where the phase difference plate is disposed at a different position are not considered. Moreover, though the device is appropriately designed by considering liquid crystal alignment under actual voltage application, the liquid crystal alignment is limited to alignment without twist, and other general alignment of liquid crystal is not considered.

To execute optimization by using more numbers and ranges of design parameters by the foregoing conventional designing method, an increase in the number of design parameters leads to an increase in calculating operations since calculation has to be carried out with respect to each parameter by the foregoing method: with respect to the number N of design parameters including types and positions of optical elements such as a phase difference plate and alignment of a liquid crystal layer, a quantity of calculation increases in proportion to about N-th power. Consequently, the number of optical elements actually designable is limited.

In other words, in an LCD device such as a single-polarizing-plate reflection-type LCD device, inevitable characteristics of optical elements such as a polarizing element, a phase difference plate, and a liquid crystal layer are not expressed by a method with generality. Besides, a liquid crystal layer is not quantitatively designed by such a general method. Moreover, a method for quantitatively judging adequacy with respect to a result of such designing has not yet been taught.

SUMMARY OF THE INVENTION

An object of the present invention is to provide a method for evaluating optical modulation characteristics of a liquid crystal modulation element, which method is arranged as follows: an index indicative of a brightness modulation quantity as an optical modulation characteristic of a liquid crystal modulation element, namely, adequacy of an optical modulation characteristic, is expressed by a method with generality without being affected by the number of design parameters of optical elements to be determined at a final stage, thereby giving clear strategy to obtain optimal parameters of the optical elements. This gives a designer a relatively easy way to find conditions necessary to optimize the optical modulation characteristics.

Another object is to provide an LCD device produced according to the foregoing evaluating method. Still another object is to provide an evaluating device, and a computer-readable storage medium storing a program for executing the evaluating method.

To achieve the foregoing object, a method for evaluating optical modulation characteristics of a liquid crystal modulation element in accordance with the present invention is a method for evaluating optical modulation characteristics of a liquid crystal modulation element that includes one or a plurality of optical modulation elements for modulating a polarization state of light, one of the optical modulation elements being an optically anisotropic object having a liquid crystal layer, and the method is characterized by comprising the steps of:

given:
  that optical modulation effects of the optical modulation element are expressed by Mueller matrices, respectively;
  that the Mueller matrices are multiplied from left in a light transmission order so as to obtain a Mueller matrix given as $M_{LCD}$;
  that, concerning a control factor $V=V_1$, $V_2$ of the optical modulation element, one of the same is for dark display, and the other one is for bright display; and
  that Mueller matrices regarding light since immediately before incidence to the optically anisotropic object until immediately after outgoing therefrom when $V=V_1$ and when $V=V_2$ are given as $M(V_1)$ and $M(V_2)$, respectively, (a) deriving a Mueller matrix Mα expressed as:

$$M\alpha = M(V_2)M(V_1)^{-1}$$

and, (b) evaluating optical modulation characteristics of the liquid crystal modulation element by:
  expressing a QOM that is a predetermined quantity of the optically anisotropic object with elements of the Mα;
  arranging the QOM so as to be proportional to a difference between a value in the bright display and a value in the dark display of an (0,0)element of the $M_{LCD}$, the (0,0)element indicating a brightness of the liquid crystal modulation element; and
  using the QOM as an index for a brightness modulation quantity equivalent to a difference between brightness of the bright display and that of the dark display.

According to the foregoing arrangement, the QOM that is proportional to the (0,0)element of the foregoing $M_{LCD}$ that indicates a brightness difference in the case where the optically anisotropic object is combined with the polarizing element is used an index of a brightness modulation quantity, expressed with use of elements of the forgoing Mα, whereby optical modulation characteristics of the liquid crystal modulation element are evaluated. In other words, a brightness modulation quantity as a normalized value after excluding brightness of dark display from brightness of bright display is expressed with use of a brightness difference in the case where the optically anisotropic object is used in combination with the polarizing element, so that the brightness modulation quantity is obtained. For instance, assume that dark display is obtained when a control factor V satisfies $V=V_1$, while bright display is obtained when the control factor V satisfies $V=V_2$.

In the case of a single-polarizing-plate reflection-type liquid crystal modulation element, an evaluation function QOM determined by the following expression is used for evaluating a brightness modulation quantity with use of a normalized difference between reflectances of bright display and dark display:

$$QOM \equiv 1 - \{(M_{1c}^-(V_2)(M_{1c}(V_1))^{-1})_{33}\}^2$$

Then, adequacy of optical design of the liquid crystal modulation element is judged with reference to the value thus obtained. Incidentally, $M_{1c}(V_1)$ and $M_{1c}(V_2)$ both are Mueller matrices to affect light with a specific wavelength that passes through a liquid crystal layer in a normal direction with respect to the layer that has a liquid crystal alignment controlled by a control factor V, and a subscript of "33" is indicative of a matrix element of the Mueller matrix that determines transform relationship of a circularly polarized component, that is, an (3,3)element.

Therefore, the foregoing QOM is expressed with only optical characteristics inside the foregoing optically anisotropic object including the liquid crystal layer, and a state of light before incidence to the optically anisotropic object may be affected by any additional polarizing effect due to a phase difference plate or the like.

Therefore, it is possible to express an index indicative of a brightness modulation quantity as an optical modulation characteristic of a liquid crystal modulation element, namely, adequacy of an optical modulation characteristic, by a method with generality that is not affected by the number of design parameters of optical elements to be determined at a final stage, thereby allowing an optical characteristic value to be easily obtained. Consequently, conditions of design parameters necessary for optimizing the optical modulation characteristics and for executing satisfactory optical modulation can be easily found.

Thus, by using the foregoing index, necessary conditions for satisfactory optical modulation can be expressed and evaluated by a method with generality irrespective of the number of optical elements and the types thereof. Therefore, optimal values of design parameters of optical elements can be easily found based on the evaluation result, and consequently, operations for adjusting values of the design parameters for optimization can be easily carried out.

For instance, in the case where the optical modulation element includes at least one linearly polarized light selective transmission element and takes advantage of external field response of the liquid crystalline material, the method may be further arranged by further including the step of controlling the liquid crystal layer and the control factor, in the set alignment of the liquid crystal used, with at least one combination of used control factors, namely, the foregoing control factors $V_1$ and $V_2$, and at at least one wavelength in a wavelength range of light used, so as to cause the QOM to have a value not less than a predetermined value, for instance, 0.9.

Furthermore, an LCD device in accordance with the present invention is an LCD device as a liquid crystal modulation element that includes one or a plurality of optical modulation elements for modulating a polarization state of light, one of the optical modulation elements being an optically anisotropic object having a liquid crystal layer, and the LCD device is characterized by being produced by:

given:
that optical modulation effects of the optical modulation element are expressed by Mueller matrices, respectively;
that the Mueller matrices are multiplied from left in a light transmission order so as to obtain a Mueller matrix given as $M_{LCD}$;
that, concerning a control factor $V=V_1$, $V_2$ of the optical modulation element, one of the same is for dark display, and the other one is for bright display; and
that Mueller matrices regarding light since immediately before incidence to the optically anisotropic object until immediately after outgoing therefrom when $V=V_1$ and when $V=V_2$ are given as $M(V_1)$ and $M(V_2)$, respectively,
deriving a Mueller matrix $M\alpha$ expressed as:

$$M\alpha = M(V_2)M(V_1)^{-1}$$

and,
evaluating the optical modulation characteristics of the liquid crystal modulation element, by:
expressing a QOM that is a predetermined quantity of the optically anisotropic object with elements of the $M\alpha$;
arranging the QOM so as to be proportional to a difference between a value in the bright display and a value in the dark display of an (0,0)element of the $M_{LCD}$, the (0,0)element indicating a brightness of the liquid crystal modulation element; and
using the QOM as an index for a brightness modulation quantity equivalent to a difference between brightness of the bright display and that of the dark display.

According to the foregoing arrangement, by using the foregoing evaluation function QOM as the index, necessary conditions for satisfactory optical modulation can be expressed and evaluated by a method with generality irrespective of the number of optical elements and the types thereof. Therefore, optimal values of design parameters of optical elements can be easily found based on the evaluation result, and operations for adjusting values of the design parameters for optimization can be easily carried out. Consequently, an LCD device with optimal optical modulation characteristics can be produced easily.

Furthermore, an evaluation device in accordance with the present invention for evaluating optical modulation characteristics of a liquid crystal modulation element includes one or a plurality of optical modulation elements for modulating a polarization state of light, one of the optical modulation elements being an optically anisotropic object having a liquid crystal layer, and the evaluation device is characterized by including:

given:
that optical modulation effects of the optical modulation element are expressed by Mueller matrices, respectively;
that the Mueller matrices are multiplied from left in a light transmission order so as to obtain a Mueller matrix given as $M_{LCD}$;
that, concerning a control factor $V=V_1$, $V_2$ of the optical modulation element, one of the same is for dark display, and the other one is for bright display; and
that Mueller matrices regarding light since immediately before incidence to the optically anisotropic object until immediately after outgoing therefrom when $V=V_1$ and when $V=V_2$ are given as $M(V_1)$ and $M(V_2)$, respectively,
a matrix calculation section for deriving a Mueller matrix $M\alpha$ expressed as:

$$M\alpha = M(V_2)M(V_1)^{-1}$$

and,
an evaluation section for evaluating the optical modulation characteristics of the liquid crystal modulation element, by:

expressing a QOM that is a predetermined quantity of the optically anisotropic object with elements of the Mα;

arranging the QOM so as to be proportional to a difference between a value in the bright display and a value in the dark display of an (0,0)element of the $M_{LCD}$, the (0,0)element indicating a brightness of the liquid crystal modulation element; and using the QOM as an index for a brightness modulation quantity equivalent to a difference between brightness of the bright display and that of the dark display.

Furthermore, a computer-readable storage medium in accordance with the present invention is a computer-readable storage medium that stores a program for evaluating optical modulating characteristics of a liquid crystal modulation element, the liquid crystal modulation element including one or a plurality of optical modulation elements for modulating a polarization state of light, one of the optical modulation elements being a optically anisotropic object having a liquid crystal layer, is characterized by storing a program that is for evaluating optical modulation characteristics of the liquid crystal modulation element by:

given: p2 that optical modulation effects of the optical modulation element are expressed by Mueller matrices, respectively;

that the Mueller matrices are multiplied from left in a light transmission order so as to obtain a Mueller matrix given as $M_{LCD}$;

that, concerning a control factor $V=V_1$, $V_2$ of the optical modulation element, one of the same is for dark display, and the other one is for bright display; and that matrices regarding light since immediately before incidence to the optically anisotropic object until immediately after outgoing therefrom when $V=V_1$ and when $V=V_2$ are given as $M(V_1)$ and $M(V_2)$, respectively, deriving a Mueller matrix Mα expressed as:

$$M\alpha = M(V_2)M(V_1)^{-1}$$

and, evaluating the optical modulation characteristics of the liquid crystal modulation element, by:

expressing a QOM that is a predetermined quantity of the optically anisotropic object with elements of the Mα;

arranging the QOM so as to be proportional to a difference between a value in the bright display and a value in the dark display of an (0,0)element of the $M_{LCD}$, the (0,0)element indicating a brightness of the liquid crystal modulation element; and using the QOM as an index for a brightness modulation quantity equivalent to a difference between brightness of the bright display and that of the dark display.

For a fuller understanding of the nature and advantages of the invention, reference should be made to the ensuing detailed description taken in conjunction with the accompanying drawings.

DESCRIPTION OF THE PREFERRED EMBODIMENTS

The following description will explain an embodiment of the present invention while referring to FIGS. 1 through 25. The inventors of the present invention first put in order arithmetic elements necessary for modulation of polarized light at a reflection-type liquid crystal modulation layer, and using this, attempted to quantitatively express a contrast display capability of a liquid crystal layer without preliminarily determining directions of a polarizing plate or a phase difference plate at an initial stage of designing of the liquid crystal layer. Consequently, appropriate arithmetic elements of contrast display and concrete transform relationship of the same became clarified as described below. Then, by evaluating the transform relationship with use of a single wavelength, it was confirmed that a contrast display capability of a reflection-type liquid crystal modulation element could be appropriately evaluated.

Figure 1:
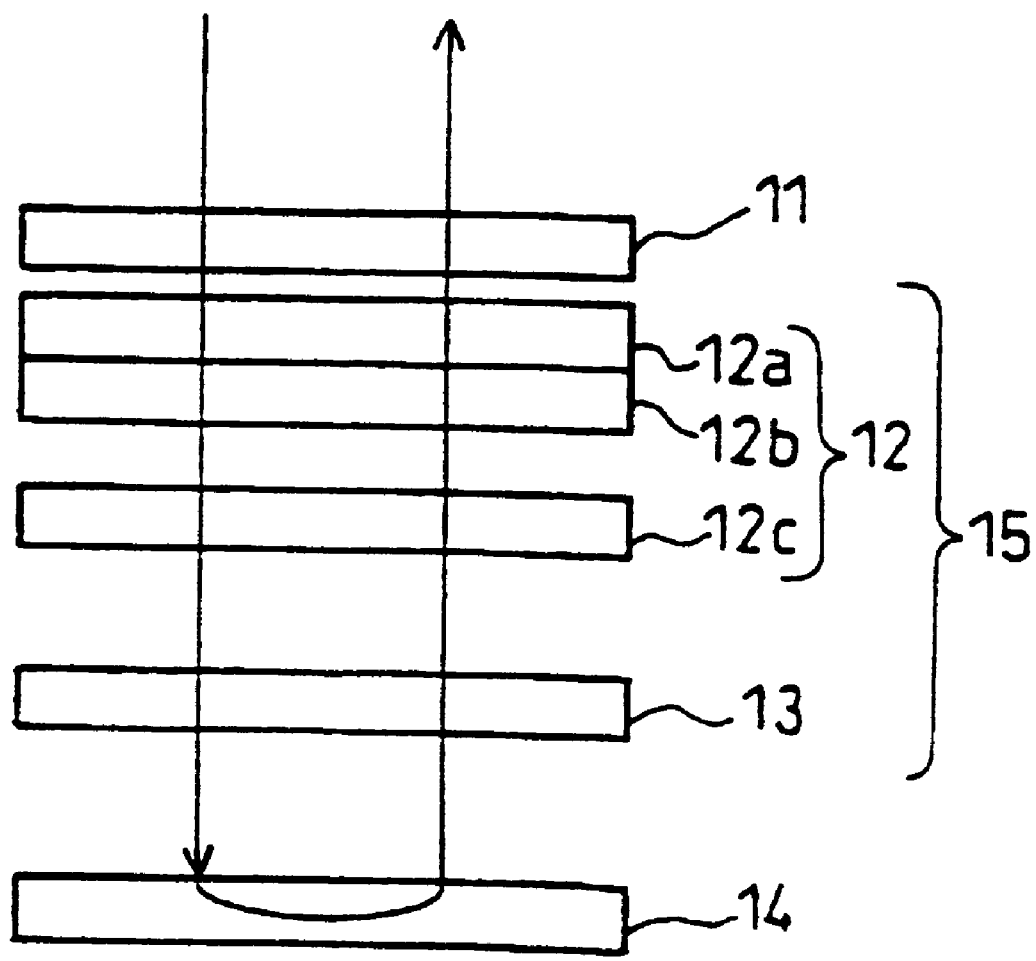
FIG. 1 is an explanatory view illustrating a schematic arrangement of a single-polarizing-plate reflection-type LCD device whose design is evaluated by the present invention.

A method for evaluating optical modulation characteristics of a liquid crystal modulation element in accordance with the present invention is applicable to a reflection-type LCD device as shown in FIG. 1, or a transmission-type LCD device, not shown. Such a reflection-type LCD device includes a polarizing plate (polarizing element) 11, phase difference plates 12a, 12b, and 12c (collectively referred to as phase difference plates 12), a liquid crystal layer 13, and a reflection plate 14 that performs ideal reflection, that are laminated in the stated order from the observer's side, that is, the upper side of the drawing. The liquid crystal layer 13 is formed by sealing a liquid crystalline material between glass substrates with electrodes to drive liquid crystalline material, an alignment film, and the like, not shown, being laminated on their surfaces facing each other. The reflection plate 14 may be provided behind liquid crystal and may have a function as the liquid crystal actuation-use electrodes. However, note that among the liquid crystal actuation-use electrodes, at least electrodes on the light incident side viewed from the liquid crystal have to have a light transmitting characteristic. Incidentally, glass substrates, transparent electrodes, and alignment films are omitted herein since their optical effects are small, but their effects can be considered in the range of the present invention. A phase difference structure 15 is composed of the phase difference plates 12 and the liquid crystal layer 13. The polarizing plate 11 is an ideal polarizing plate that transmits only a specific linearly polarized light component and completely absorbs the other polarized light component. Further, a specific wavelength is assumed as a wavelength of light. After passing the polarizing plate 11, light from outside that is natural light in indefinitely polarized states becomes a completely linearly polarized light, thereby entering the phase difference plates 12. Note that there is no particular limitation on the number of the phase difference plates 12 or characteristics thereof. Then, the light passes the phase difference plates 12 and the liquid crystal layer 13, becomes reflected by the reflection plate 14, then again passes the liquid crystal layer 13 and the phase difference plates 12 in a reverse direction, and again enters the polarizing plate 11 in a reverse direction.

[Definition of Coordinates of Electromagnetic Waves]

The following description will explain expressions of light (time dependency and coordinates dependency of electromagnetic waves) tacitly assumed in all expressions in the present invention. The following expression describes a plane wave, where t, z, and k represent time, a coordinate in a direction that light passes, and a magnitude of a wave number vector, respectively. Complex number expressions of an electric field are distinguished with use of "~" in an expression 1 expressing relationship between a complex-number electric field and a real-number electric field.

$$\tilde{E}_1(t, z) = |\tilde{E}_1| e^{i(\omega t - kz + \delta_1)}, 1 = p, s \quad (1)$$

$$E_1(t, z) = \text{Re}[\tilde{E}_1(t, z)], 1 = p, s$$

Furthermore, a phase difference between a component (P component) of an electric field included in a plane of incidence and a component (S component) vertical to the foregoing P component is defined as an expression (2) below:

$$\delta = \delta_s - \delta_p \quad (2)$$

With the foregoing definitions, polarization states are expressed so that rotation of the polarized light is right-handed rotation when a value of $\sin\delta$ is positive, while it is left-handed rotation when a value of $\sin\delta$ is negative.

[Regarding Whole Optical Element in Mueller Matrix]

The following description will explain a process for optimization of an LCD device using the Mueller Matrix calculus. First of all, LCD elements, which perform display without emitting light, can be roughly classified into a transmission-type and a reflection-type according to the light path of display light. The transmission-type one utilizes, for display, transmittance modulation of LCD elements with support of a backlight unit, while the reflection-type one utilizes, for display, reflectance modulation of LCD elements in passage of light that enters the LCD device from an observer's side and goes back and forth.

In both the transmission-type and reflection-type LCD devices, the following display modes are applicable: (a) a display mode using a polarizing plate for modulation of natural light, whose polarization state cannot be designated, a backlight unit (transmission type), ambient light, and a frontlight unit (both are reflection types) cannot be designated (polarizing plate mode); (b) a display mode varying absorbance with use of light absorbing dyes (dichroic dyes) that change their directions according to alignment of liquid crystal thereby varying absorbance (guest host mode); (c) a display mode modulating light passing directions by modulatable scattering (scattering mode); or (d) a display mode reversing light passing direction with use of a liquid crystalline material in a part of dielectric cyclic structure (holographic mode).

[Input/Output Relationship]

In designing an LCD device, input light and output light of an LCD element may be expressed with Stokes's vectors S and input/output relationship thereof may be expressed with $M_{LCD}$ that is a Mueller matrix, so that relationship of output light $S_{out}$ with respect to incident light $S_{in}$ can be derived as an expression (3) below, whereby prediction of characteristics of the LCD device is enabled:

$$S_{out} = M_{LCD} S_{in} \quad (3)$$

Here, $S_{in}$ and $S_{out}$ are expressed as an expression (4) below with P components and S components of photoelectric fields of input/output ("in" and "out" are omitted). Note that "T" indicates transposition of a matrix or a vector which immediately follows the "T". Further, "< >" indicates statistical average.

$$S = {}^T(S_0 \ S_1 \ S_2 \ S_3) \quad (4)$$

$$\begin{cases} S_0 = \langle E_p^2 \rangle + \langle E_s^2 \rangle \\ S_1 = \langle E_p^2 \rangle - \langle E_s^2 \rangle \\ S_2 = 2\langle E_p E_s \cos\delta \rangle \\ S_3 = 2\langle E_p E_s \sin\delta \rangle \end{cases}$$

The $M_{LCD}$ is a matrix that is obtained by expressing each optical element of an LCD element (LCD) with a Mueller matrix and by calculating these obtained Mueller matrices by multiplication such that these are made to affect the $S_{in}$ in an order of light propagation. In other words, $M_{LCD}$ is expressed as:

$$M_{LCD} = M_n M_{n-1} \ldots M_1$$

Note that it is assumed that light is propagated in the order of $M_1, M_2, \ldots, M_n$.

[Lamination of Optical Elements, and Transmission and Reflection thereof]

Figure 2:
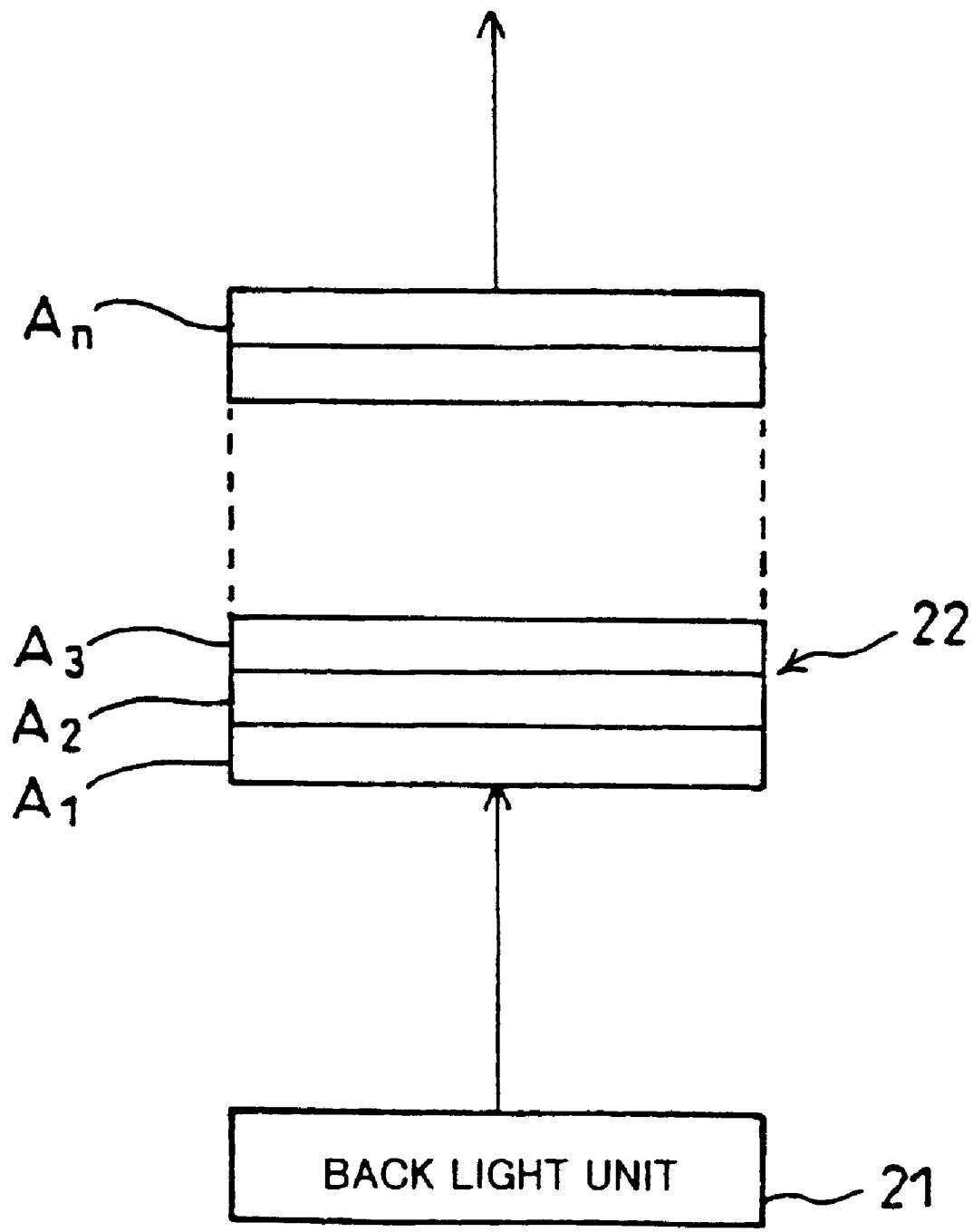
FIG. 2 is an explanatory view illustrating a schematic arrangement of a transmission-type LCD device used in explanation of an evaluation function.
Figure 3:
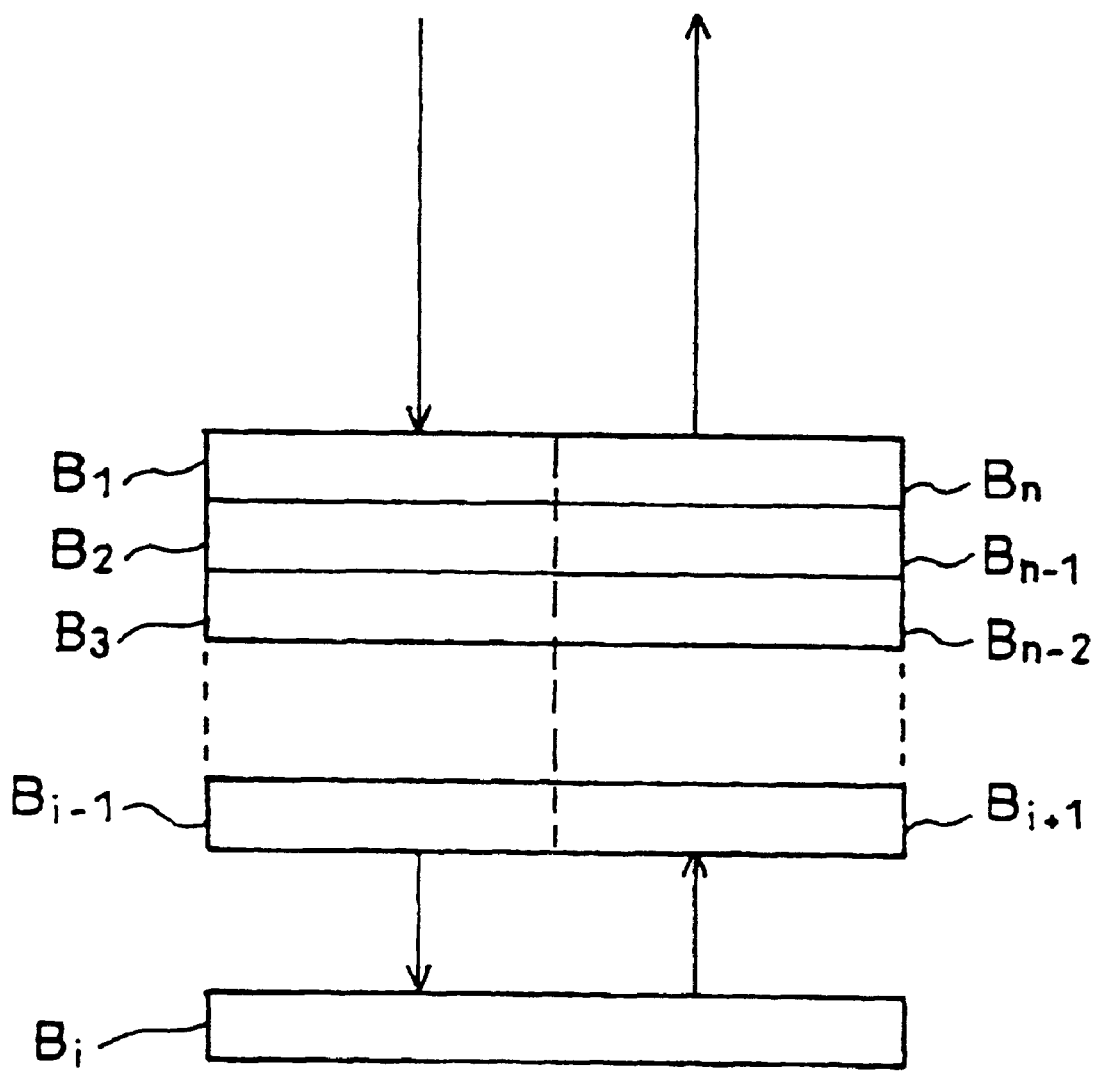
FIG. 3 is an explanatory view illustrating a schematic arrangement of a reflection-type LCD device used in explanation of an evaluation function.

These states are shown in FIGS. 2 and 3. FIG. 2 shows a liquid crystal element used in a transmission-type LCD device. An arrow indicates a route of light. Light from a backlight unit 21 as a light source provided behind passes an optical element group 22 in an order from an optical element $A_1$ provided behind. Here, in the case where the optical elements composing the optical element group 22 are identified with identifiers of 1, 2, . . . n in an order from the light source (backlight unit 21) side, respectively, $M_{LCD}$ can be obtained by calculating a product of Mueller matrices $M_1$, $M_2$, . . . , $M_n$ that respectively express optical effects of polarization of the foregoing optical elements.

Furthermore, FIG. 3 illustrates a liquid crystal element used for a reflection-type LCD device. An arrow indicates a light passing route. An optical element $B_1$ that changes a direction of passage of light is present in the path of light, and in this case as well, $M_{LCD}$ can be obtained by calculating a product of Mueller matrices that respectively express optical effects of polarization of the optical elements $B_1$ through $B_n$. In the reflection-type case, light passes a same medium upon incidence and reflection, but Mueller matrices with respect to light that passes a same medium in different direction are usually different. Therefore, respective Mueller matrices of the optical elements are arranged depending on directions of passage of light, respectively.

Furthermore, in the case where elements that provide different optical effects depending on wavelengths are included, Mueller matrices are arranged depending on wavelengths.

[Definition of Stokes's Vector]

To express an orientation of a linearly polarized light, in the case where an orientation of a plane of polarization (hereinafter referred to as plane polarization orientation) is defined with angles so as to be positive into an S polarization orientation with respect to a P polarization orientation as reference (0°), the Stokes's vector of the expression (4) is expressed with a four-dimensional column vector composed of a zero'th component ($S_0$) indicative of an intensity of light, a first component ($S_1$) that is a component of light in a plane polarization orientation of 0°, a second component ($S_2$) that is a component of light in a plane polarization orientation of 45°, and a third component ($S_3$) that is a right-handed circular polarization component, as described in "Polarized light: production and use". Incidentally, a component at the (x+1)'th rank is expressed as an x'th component. For instance, let S be a positive constant, and natural light that has no polarization component is expressed as ${}^T(S, 0, 0, 0)$, a linearly polarized light having a polarization plane orientation of 90° is expressed as ${}^T(S, -S, 0, 0)$, and a complete right-handed circularly polarized light is expressed as ${}^T(S, 0, 0, S)$. Incidentally, the foregoing variables are named as I, M, C, and S in "Polarized light: production and use", but they are equivalent to $S_0$, $S_1$, $S_2$, and $S_3$, respectively.

[Rotational Transform on Surface of Poincaré sphere]

Often conducted is to express three components standardized by $S_0$ indicative of an intensity, namely, $S_1/S_0$, $S_2/S_0$, and $S_3/S_0$, with three-dimensional orthogonal coordinates and to express a polarization state of light with a vector whose end is on a surface of a sphere with a radius of 1 (surface of Poincaré sphere). According to "Polarized light: production and use", a change of a polarization state of light due to only a phase difference, without occurrence of absorption or polarization scramble, can be expressed by rotational transform of a vector on the surface of Poincaré sphere, corresponding to polarization. More specifically, it can be expressed by rotational transform around a rotation axis that is a straight line at an angle of 2θ with respect to the $S_1$ axis, among straight lines passing through an origin on an $S_1$-$S_2$ plane, the angle of 2θ being twice an angle θ formed between a fast axis of an optically anisotropic object and an oscillation orientation of the P polarized light in an actual space. An effect of such an optically anisotropic object is expressed as rotational transform around the foregoing rotation axis clockwise through a phase difference r measured with an angle as unit ($\Gamma=2\pi(n_s-n_F)d/\lambda$, where $n_s$ and $n_F$ represent indexes of refraction of linearly polarized lights in a slow axis and a fast axis, d represents a length of a light path of an optical device, λ represents a wavelength in vacuum).

[Transform on Surface of Poincaré sphere in General Case]

Light passing a twist-aligned liquid crystal layer or light passing phase difference plates laminated in different arrangements is expressed as a series of rotational transforms on the surface of Poincaré sphere having rotational axes in orientations that continuously or discontinuously vary with progress of light, considering that a fast axis orientation continuously varies or that a fast axis orientation discontinuously varies. On the other hand, transform using optically anisotropic objects connecting two points on the surface of Poincaré sphere can be expressed with a rotation around an $S_2$ axis and a rotation around an $S_3$ axis, without any exceptions. Light whose oscillation orientation conforms with that of the P polarized light and whose $S_1$ is positive at a point on the $S_1$ axis can be transformed to an arbitrary position on the surface of Poincaré sphere by a Mueller matrix $M_{arb}$ expressed as an expression (5) below that is based on a rotation around the $S_2$ axis (elevation angle P) and a rotation around the $S_3$ axis (rotational angle A). Note that P and A in the expression represent rotational angles around the $S_2$ axis and the $S_3$ axis, respectively.

$$M_{arb} = \begin{pmatrix} 1 & 0 & 0 & 0 \\ 0 & \cos A & -\sin A & 0 \\ 0 & \sin A & \cos A & 0 \\ 0 & 0 & 0 & 1 \end{pmatrix} \begin{pmatrix} 1 & 0 & 0 & 0 \\ 0 & \cos P & 0 & -\sin P \\ 0 & 0 & 1 & 0 \\ 0 & \sin P & 0 & \cos P \end{pmatrix} \quad (5)$$

Such transform of an optical element on the surface of Poincaré sphere is reflected in a partial square matrix extending from a (1,1)element to a (3,3)element of the Mueller matrix. Incidentally, elements of the Mueller matrix are expressed with indexes of 0 to 3, like "(0,0)element", "(0,1)element", . . . "(3,3)element" corresponding to the expressions of the Stokes's vector, respectively. Namely, an element at the (x+1)'th column and the (y+1)'th row is expressed as "(x,y)element".

[Concrete Example of Mueller Matrix: Mirror]

Figure 4A:
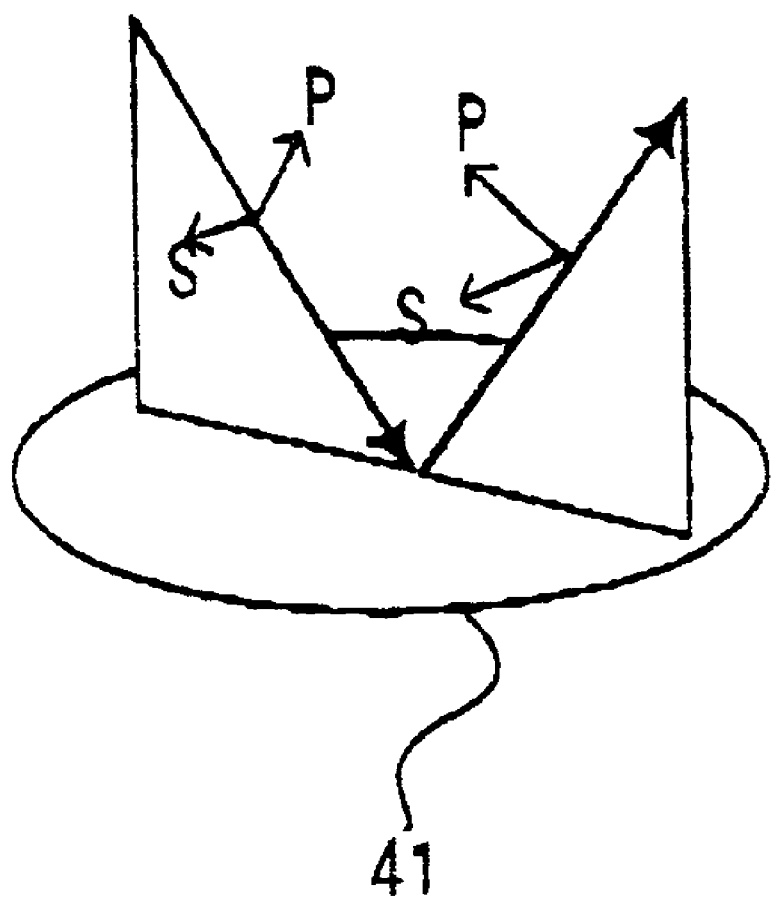
FIGS. 4(a) and 4(b) are explanatory views illustrating definition of coordinates of light before and after reflection.
Figure 4B:
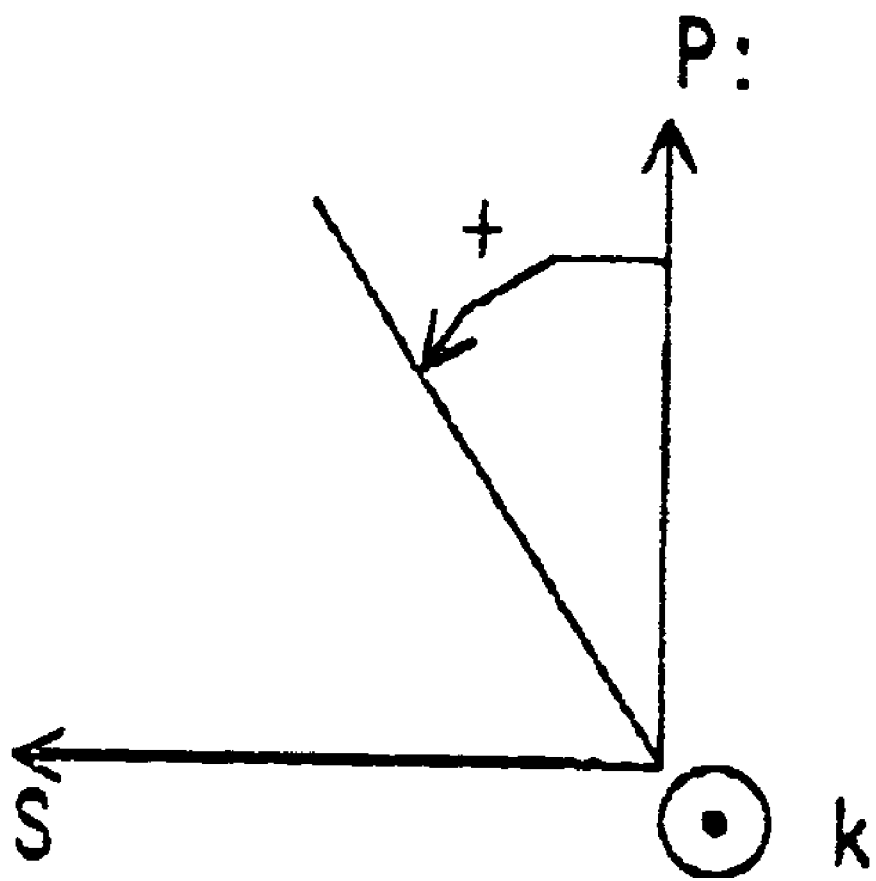

An example of an optical element having a Mueller matrix characterized as above is described in "Polarized light: production and use". Here, a reflection plate ideally arranged (hereinafter referred to as ideal reflection plate) will be particularly described. Coordinates of P and S before and after reflection are set as shown in FIGS. 4(a) and 4(b). Note that 41 is a sample, P and S represent a P polarized light and an S polarized light, respectively. The P polarized light is a component in a plane of incidence, and in FIG. 4(b), the progress of light is supposed to be directed from the background to the foreground of the drawing. In this case, even in the case where light becomes incident vertically and outgoes vertically after reflection, it is necessary to reverse the $S_2$ axis due to an effect of reversal of the coordinate axis of the P polarized light. For example, an incident light expressed as $^T(1, 0, 1, 0)$ expresses a linearly polarized light with an intensity of 1 and an orientation of a plate of polarization of 45°, and this is reflected with the orientation of polarization maintained even if being reflected by an ideal reflection plate. However, only as long as the P axis of the coordinates of the outgoing light is reversed, the light has to be reflected, as expressed by a Stokes's vector $^T(1, 0, -1, 0)$. Therefore, it need to be expressed so that the $S_2$ axis should be reversed. Furthermore, in the case of a circularly polarized light, when a rotational orientation of an electric field that temporally rotates is projected onto a reflection surface, the rotational orientation before the reflection is maintained after the reflection. Due to the effect of the reversal of the direction of progress by the reflection, however, right-hand rotation is switched to left-hand rotation, or vice versa. Therefore, it is necessary to reverse the $S_3$ axis. Due to these effects, a Mueller matrix $M_{im}$ of the ideal reflection plate can be expressed by an expression (6) below, in the case of the coordinates shown in FIG. 3. In other words, a reflection plate satisfying the expression (6) is defined as an ideal reflection plate.

$$M_{im} = \begin{pmatrix} 1 & 0 & 0 & 0 \\ 0 & 1 & 0 & 0 \\ 0 & 0 & -1 & 0 \\ 0 & 0 & 0 & -1 \end{pmatrix} \quad (6)$$

[Concrete Example of Mueller Matrix: Polarizing Plate]

The following description will depict a polarizing plate. A polarizing plate absorbs only polarization plane components in specific orientations out of incident light to the polarizing plate, thereby functioning to direct outgoing lights in one direction by making the outgoing light be composed of only linearly polarized light components directed in the foregoing single direction. Here, supposing a polarizing plate that perfectly absorbs the light to be absorbed according to its polarization plane and that perfectly transmits the light to be transmitted according to its polarization plane (such a polarizing plate is hereinafter referred to as an ideal polarizing plate), a Mueller matrix $M_{ip}$ of a polarizing plate that transmits polarized light having a polarization plane at an orientation of 0° is expressed by an expression (7) below:

$$M_{ip} = \begin{pmatrix} 1/2 & 1/2 & 0 & 0 \\ 1/2 & 1/2 & 0 & 0 \\ 0 & 0 & 0 & 0 \\ 0 & 0 & 0 & 0 \end{pmatrix} \quad (7)$$

[Relationship Between Matrices of Light Progressing in Opposite Directions]

Furthermore, the following description will explain relationship in the case where light is transmitted through a certain medium in a forward direction and in a reverse direction. A Mueller matrix $M_r$ in the case where light progresses in a reverse direction and a Mueller matrix $M_f$ in the case where light progresses in a forward direction have relationship therebetween as shown by an expression (8) below:

$$m_r = M'_f$$

$$M' = \begin{pmatrix} 1 & 0 & 0 & 0 \\ 0 & 1 & 0 & 0 \\ 0 & 0 & -1 & 0 \\ 0 & 0 & 0 & 1 \end{pmatrix} {}^T\!M \begin{pmatrix} 1 & 0 & 0 & 0 \\ 0 & 1 & 0 & 0 \\ 0 & 0 & -1 & 0 \\ 0 & 0 & 0 & 1 \end{pmatrix} \quad (8)$$

Incidentally, this expresses relationship in the case where coordinates are, as shown in FIG. 3, set in a manner such that coordinates of either one of the P or S polarized lights are reversed. Hereinafter an apostrophe given to a matrix indicates this transform.

[Relationship between Mueller Matrix and Jones Matrix]

Furthermore, in the case where the medium does not exhibit depolarization with respect to monochromatic light, it is possible to derive each element of a Mueller matrix by using elements of a Jones matrix J if the Jones matrix J has already been derived separately. According to examinations in the present invention, specifically, relationship expressed by an expression (9) below is exhibited therebetween, and it is possible to form a Mueller matrix based on a Jones matrix.

$$M = \begin{pmatrix} \frac{1}{2}(|j_{pp}|^2 + |j_{sp}|^2 + |j_{ps}|^2 + |j_{ss}|^2) & \frac{1}{2}(|j_{pp}|^2 + |j_{sp}|^2 - |j_{ps}|^2 - |j_{ss}|^2) \\ \frac{1}{2}(|j_{pp}|^2 - |j_{sp}|^2 + |j_{ps}|^2 - |j_{ss}|^2) & \frac{1}{2}(|j_{pp}|^2 + |j_{sp}|^2 + |j_{ps}|^2 + |j_{ss}|^2) \\ \mathrm{Re}(j^*_{pp} j_{sp} + j^*_{ps} j_{ss}) & \mathrm{Re}(j^*_{pp} j_{sp} + j^*_{ps} j_{ss}) \\ \mathrm{Im}(j^*_{pp} j_{sp} + j^*_{ps} j_{ss}) & \mathrm{Im}(j^*_{pp} j_{sp} + j^*_{ps} j_{ss}) \end{pmatrix}$$

$$\begin{pmatrix} \mathrm{Re}(j^*_{pp} j_{ps} + j^*_{sp} j_{ss}) - \mathrm{Im}(j^*_{pp} j_{ps} + j^*_{sp} j_{ss}) \\ \mathrm{Re}(j^*_{pp} j_{ps} + j^*_{sp} j_{ss}) - \mathrm{Im}(j^*_{pp} j_{ps} - j^*_{sp} j_{ss}) \\ \mathrm{Re}(j^*_{pp} j_{ss} + j^*_{ps} j_{sp}) - \mathrm{Im}(j^*_{pp} j_{ss} - j^*_{ps} j_{sp}) \\ \mathrm{Im}(j^*_{pp} j_{ss} + j^*_{ps} j_{sp}) - \mathrm{Re}(j^*_{pp} j_{ss} - j^*_{ps} j_{sp}) \end{pmatrix}$$

where, $$\begin{pmatrix} \tilde{E}_p \\ \tilde{E}_s \end{pmatrix}_{out} = \begin{pmatrix} j_{pp} & j_{ps} \\ j_{sp} & j_{ss} \end{pmatrix} \begin{pmatrix} \tilde{E}_p \\ \tilde{E}_s \end{pmatrix}_{in}$$

Next, an optical operation of a reflection-type LCD element in the case where one polarizing plate is provided on the observer's side will be explained below, based on arithmetic matters shown by the foregoing expressions (1) through (9).

[Case of Specific Wavelength of Single Polarizing Plate Reflective LCD]

First of all, a case of a specific wavelength of a single polarizing plate reflective LCD is discussed. An LCD device shown in FIG. 1 described above is designed as a reflection-type LCD device. As described above, light transmitted through the polarizing plate 21, the phase difference plate 22, and the liquid crystal layer 23 in the stated order, and is reflected by the reflection plate 24, then again passes the liquid crystal layer 23, the phase difference plate 22, and the polarizing plate 21 in the stated order that is reverse to the foregoing order. A series of changes occurring to light during this transmission can be analyzed by the above-described Mueller matrix method.

[Physical Requirements Regarding Contrast]

Here, arithmetic requirements for obtaining contrast of display, exclusively regarding the case shown in FIG. 1. This intends to clarify guidelines to follow in designing a liquid crystal layer, based on, in the case where an ideal polarizing plate is used, that light is transmitted through the same polarizing plate upon entering and outgoing, that the polarizing plate can be expressed by the expression (6), and that transform of a polarization state due to the laminated product of the phase difference plate and the liquid crystal layer can be expressed by two rotational transforms on the surface of Poincaré sphere as shown by the expression (5). Arithmetic requirements under conditions of vertical incidence and vertical light reception are particularly derived.

First of all, the laminated product of the phase difference plate and the liquid crystal layer is expressed as $M_{arb}$ defined by the expression (5) with respect to light upon forward transmission. The ideal reflection plate $M_{im}$ affects the same. Then, the laminated product of the phase difference plate and the liquid crystal layer is expressed as $M_{arb}'$ by using the transform by the expression (8) with respect to light that progresses in a reverse direction to that upon incidence. The ideal polarizing plate is expressed as $M_{ip}$ according to the expression (7) with respect to light upon incidence, while it is expressed as $M_{ip}'$ with respect to light upon outgoing. Let these take effects in an order of light transmission, and a polarized light transform effect in the arrangement of the polarizing plate, the phase difference plate, the liquid crystal layer, and the reflection plate can be computed. Thus, a Mueller matrix $M_{LCD}$ of an entirety of an optical device including a laminated product of a polarizing plate, a phase difference plate, and a liquid crystal layer as well as a reflection layer can be expressed by an expression (10) below:

$$M_{LCD} = M'_{ip} M'_{arb} M_{im} M_{arb} M_{ip} \quad (10)$$

Furthermore, in the foregoing $M_{LCD}$, to find a change in the light intensity due to light transmission (reflectance), an (0,0)element should be noted. This is because the 0th component indicative of the intensity of outgoing light in the case where natural light $^T(1, 0, 0, 0)$ with a unit intensity is incident on the foregoing optical device expressed as $M_{LCD}$ is determined by only the (0, 0)element. The (0,0)element is calculated by an expression (11) below:

$$(M_{LCD})_{00} = \frac{1}{2} \cos^2 P \quad (11)$$

In other words, this clarifies that: a reflectance of an entirety of a display device is determined by an elevation angle from the $S_1$–$S_2$ plane to a position on the surface of Poincaré sphere that is a position to which a linearly polarized light after transmitted through a polarizing element is transformed by a phase difference product composed of a phase difference plate and a liquid crystal layer; and it is not relevant to an azimuth angle A on the surface of Poincaré sphere at that time.

Here, when P satisfying that $\cos^2 P$ is a maximum value of 1 satisfies $P = m\pi$ (m: integer), or to state differently, when a polarization state of light on the reflection plate is indicated as a point on a line at which the surface of Poincaré sphere and the $S_1$–$S_2$ plane intersect, a maximum reflectance is obtained. Here, light immediately before incidence onto the reflection plate is a linearly polarized light, and the reflectance does not depend on the azimuth angle A. In short, the reflectance does not depend on an oscillation orientation of a linearly polarized light on reflector.

On the other hand, when P satisfying that $\cos^2 P$ is a minimum value of 0 satisfies $P = (m+1/2)\pi$ (m: integer), or to state differently, when a polarized state of light on the reflection plate is indicated by a point at which the surface of Poincaré sphere and the $S_3$ axis intersect, the reflectance becomes minimum. Here, light immediately before incidence onto the reflection plate is a circularly polarized light. The reflectance is not different between the left-handed circularly polarized light and the right-handed circularly polarized light.

Thus, requirements for bright display and dark display in an arrangement that includes one polarizing plate and one reflection plate, and a phase difference plate and a liquid crystal layer between the polarizing plate and the reflection plate (such as the arrangement shown in FIG. 1) are clarified. More specifically, a requirement to realize a sufficiently bright display is that incident light has become a linearly polarized light with an arbitrary oscillation orientation when the light reaches the reflection plate, and a requirement to realize a sufficiently dark display is that incident light has become a circularly polarized light with an arbitrary rotational orientation when the light reaches the reflection plate.

Thus, it can be seen that, concerning a single polarizing plate reflective LCD, with a polarization state of light immediately before incidence onto a reflection plate being considered on the surface of Poincaré sphere, both of the brightness and darkness of the display are predictable according to an elevation angle thereof.

[Explanation on Transform of Bright Display and Dark Display on Poincaré Sphere]

Figure 5:
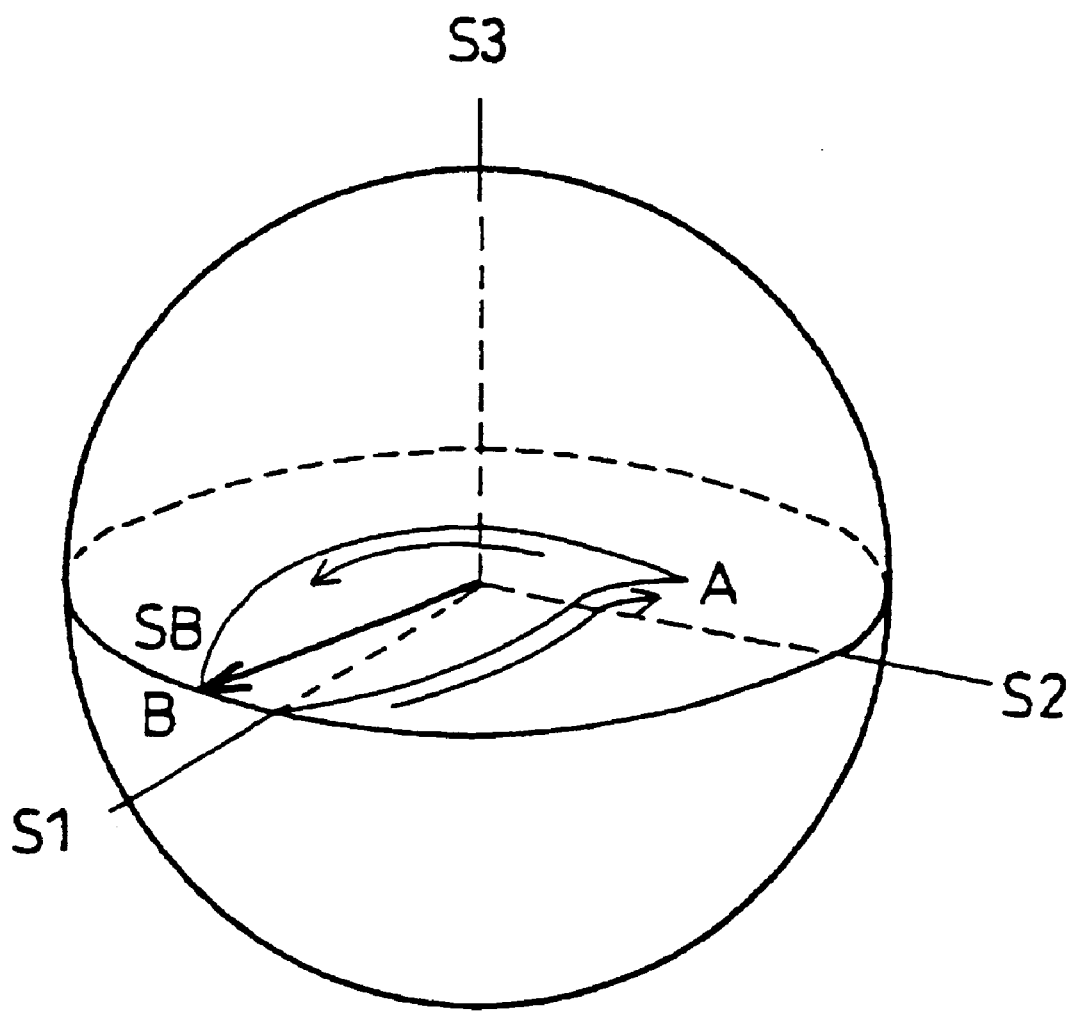
FIG. 5 is an explanatory view illustrating how light through a phase difference plate and a liquid crystal layer is transformed on the Poincaré sphere, when a single-polarizing-plate reflection-type LCD that can provide satisfactory contrast display exhibits bright display.
Figure 6:
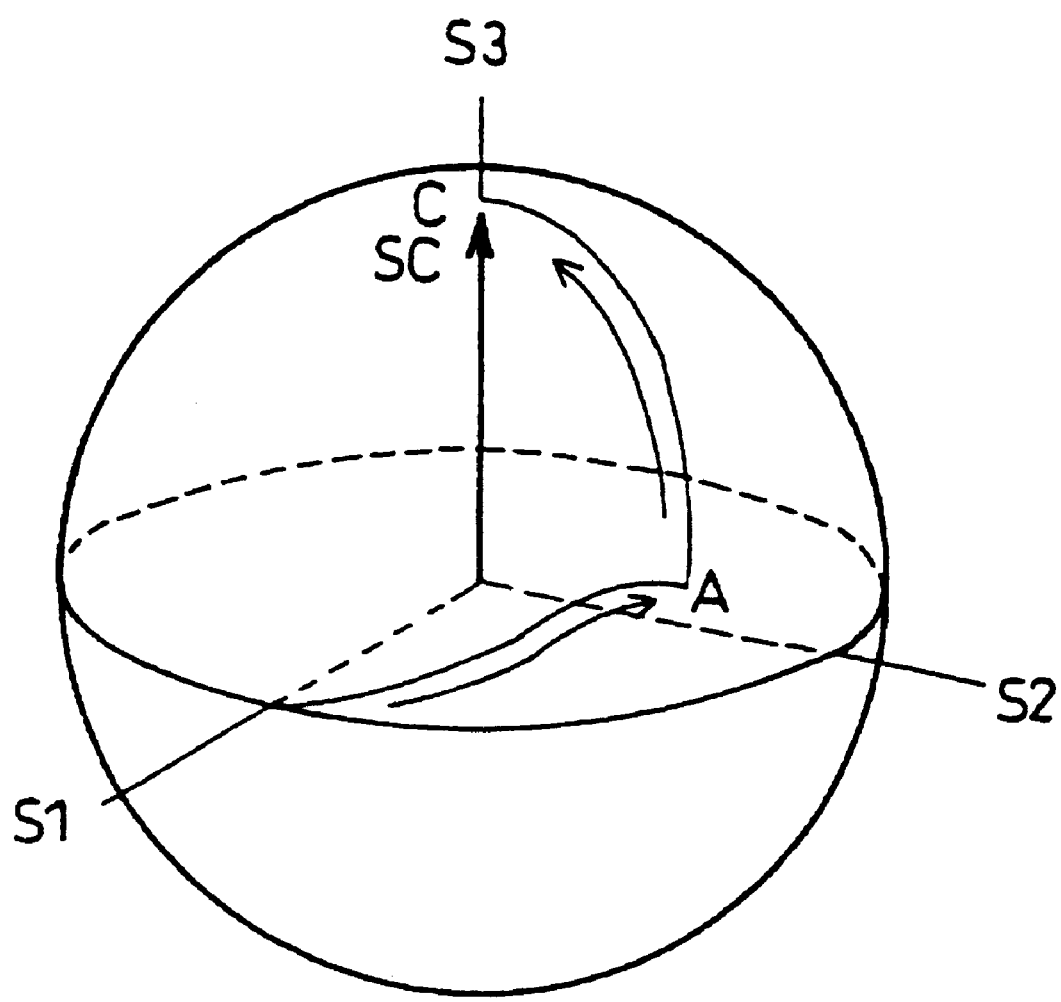
FIG. 6 is an explanatory view illustrating how light through a phase difference plate and a liquid crystal layer is transformed in the Poincaré sphere, when a single-polarizing-plate reflection-type LCD that can provide satisfactory contrast display exhibits dark display.

The process in which light from outside enters and reaches the reflection plate will be further analyzed below. The following description will explain, with use of the Poincaré sphere, a state in which the liquid crystal layer is set so that light transmitted through the phase difference plate should be controlled by the liquid crystal layer so as to provide bright display if it is for bright display, and to provide dark display if it is for dark display. FIGS. 5 and 6 illustrate a path of light on the sphere when light is transformed to a polarization state on the reflection plate corresponding to good bright display (linearly polarized light in an arbitrary orientation), and a path of light when light is transformed to a polarization state on the reflection plate corresponding to good dark display state (circularly polarized light in an arbitrary rotational orientation). FIG. 5 illustrates a case where light having passed the polarizing plate is transformed to a point A by the phase difference plate, and then, it is transformed to a point B by the liquid crystal layer. Incidentally, Stokes's vectors with respect to the points A, B, and C are hereinafter referred to as $S_A$, $S_B$, and $S_C$, respectively, unless otherwise described. For bright display, generally the point B may be anywhere on an intersection line of the $S_1$–$S_2$ plane and the surface of Poincaré sphere (a line equivalent to the equator when the surface of Poincaré sphere and the $S_3$ axis are likened to the Earth and its axis, respectively), since the oscillation orientation of the linearly polarized light is arbitrary. Besides, FIG. 6 illustrates a case where light having passed the polarizing plate is transformed to the point A by the phase difference plate, and then, it is transformed to the point C by the liquid crystal layer, whereby it becomes a circularly polarized light. For dark display, generally the point C may be either one of two intersection points of the $S_3$ axis and the surface of Poincaré sphere (points equivalent to the north and south poles when the Poincaré sphere and the $S_3$ axis are likened to the Earth and its axis, respectively), since the rotational orientation of the circularly polarized light is arbitrary.

[Introduction of QOM Concept]

Considering transform in bright display and dark display shown in FIGS. 5 and 6 in an arrangement shown in FIG. 1, a requirement for good display is that an end of a vector of a polarized light on the reflection plate that is expressed with a point on the surface of Poincaré sphere should be appropriately controlled by controlling alignment of the liquid crystal layer, as shown in FIGS. 5 and 6. Therefore, in FIG. 7, considering that the phase difference plate is identical even if the liquid crystal layer provides bright display or dark display, only a path for polarized light transform in the liquid crystal layer controllable from outside is shown on one surface of Poincaré sphere. In this figure, light immediately after having passed the polarizing plate and the phase difference plate is expressed with the point A, and the figure expresses that the point A is transformed to the point B by the liquid crystal layer for bright display, and that the point A is transformed to the point C by the liquid crystal layer for dark display.

Figure 7:
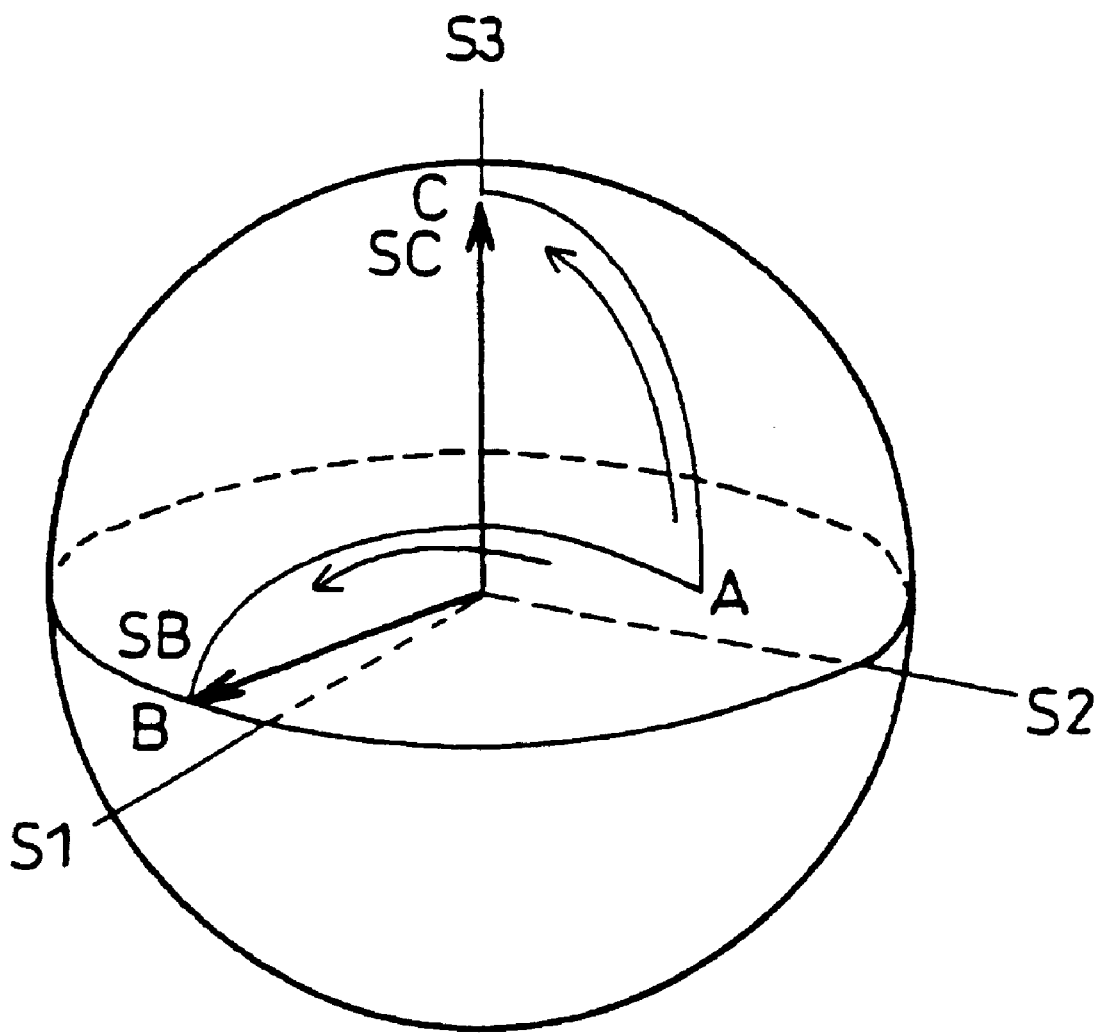
FIG. 7 is an explanatory view illustrating how light through a liquid crystal layer of a single-polarizing-plate reflection-type LCD that can provide satisfactory contrast display is transformed in the Poincaré sphere, in the case of bright display and in the case of dark display.

The point A in FIG. 7 is a determined point in a final LCD device, but it is appropriate to regard the point A as adjustable so as to find a capability of a modulating operation of the liquid crystal layer. This also corresponds to that the phase difference plate has an optical characteristic that can be appropriately set. Therefore, to find a contrast modulating capability of the liquid crystal layer, means for evaluating whether or not the liquid crystal layer is capable of modulation are required without fixing the point A.

Figure 8:
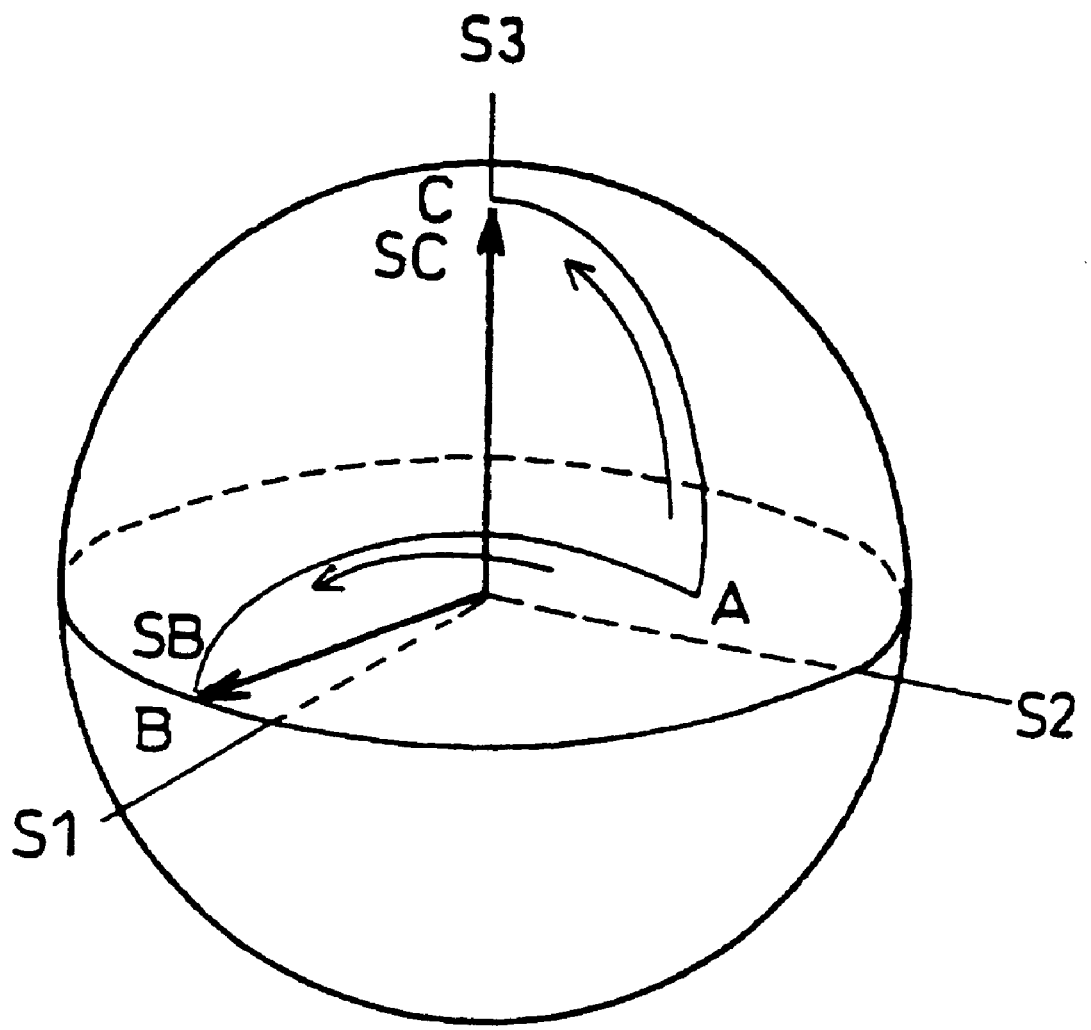
FIG. 8 is an explanatory view illustrating how light through a liquid crystal layer of a single-polarizing-plate reflection-type LCD device in response to two voltages is transformed in the Poincaré sphere, in the case where satisfactory contrast display is realized.
Figure 9:
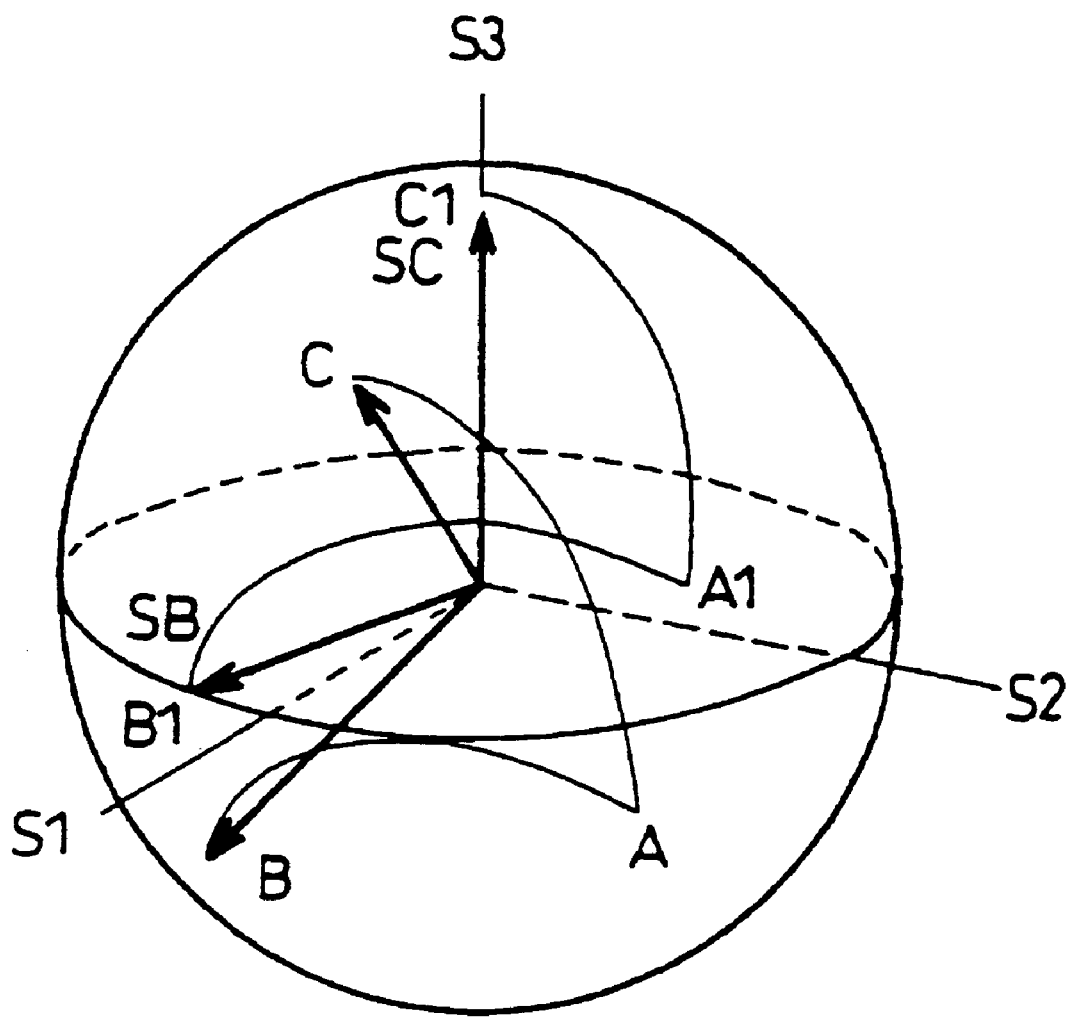
FIG. 9 is an explanatory view illustrating how light through a liquid crystal layer of a single-polarizing-plate reflection-type LCD device in response to two voltages is transformed on the Poincaré sphere, in the case where satisfactory contrast display is possible.
Figure 10:
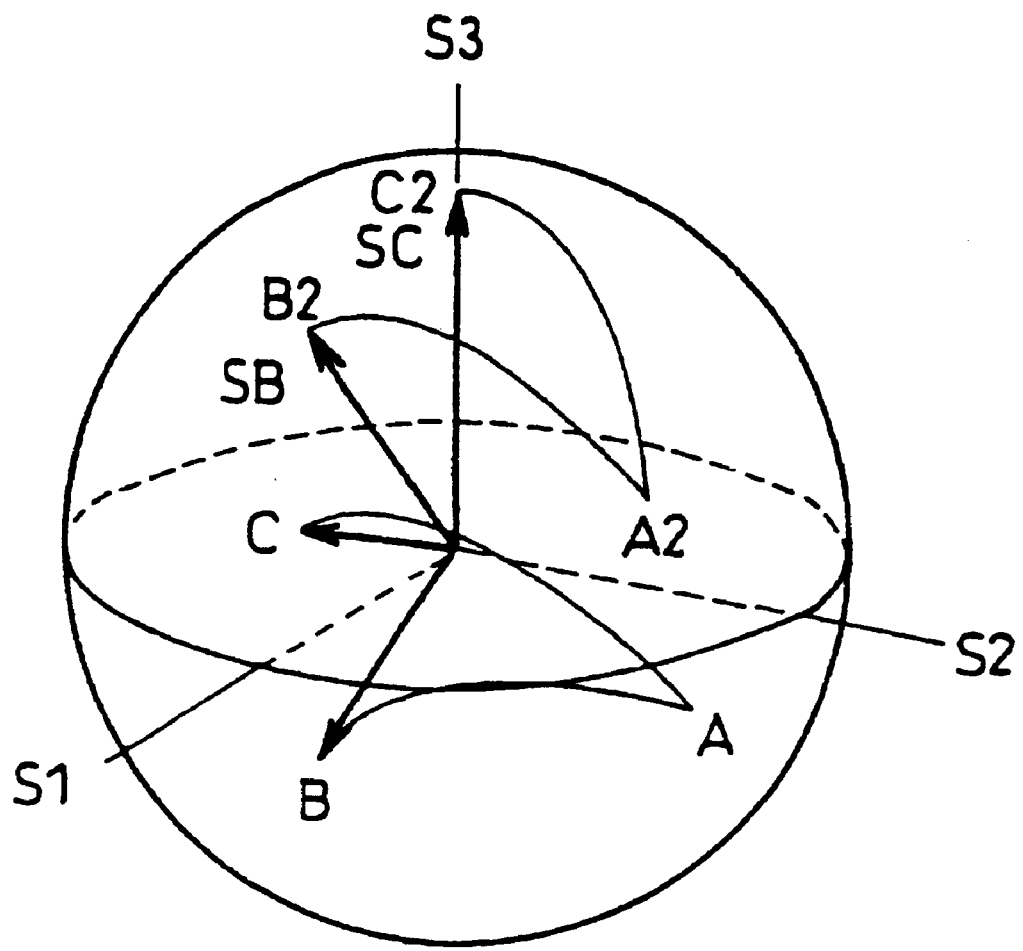
FIG. 10 is an explanatory view illustrating how light through a liquid crystal layer of a single-polarizing-plate reflection-type LCD device in response to two voltages is transformed in the Poincaré sphere, in the case where satisfactory contrast display is impossible.

FIGS. 8, 9, and 10 illustrate cases where modulation of the contrast is good (FIGS. 8 and 9), and a case where it is not good (FIG. 10), respectively. In FIG. 8, since polarized light on the reflection plate in the case of dark display is a circularly polarized light, the point C is on the $S_3$ axis. On the other hand, since polarized light on the reflection plate in the bright display is a linearly polarized light, the point B is on the $S_1$–$S_2$ plane. FIG. 9 illustrates a case where the foregoing conditions are not satisfied but adjustment of a position of the point A allows the points B and C to be provided in the same manner as that in FIG. 8. In other words, when in FIG. 9 the points A, B, and C are transferred to points $A_1$, $B_1$, and $C_1$, respectively, by transform of the position of the point A, it is possible to make the point C1 and the point B1 to be present on the $S_3$ axis and on the $S_1$–$S_2$ plane, respectively. Incidentally, transform matrices indicative of transforms from the point A to the point B and from the point A to the point C on the surface of Poincaré sphere need to be also applicable to the points $A_1$, $B_1$, and $C_1$ in the place of the points A, B, and C, and need to be such that only the position of the point A should be adjusted to the point $A_1$.

FIG. 10 illustrates a case where the points B and C both cannot be transformed to adequate positions with adjustment of the position of the point A. In other words, the foregoing case is a case where any adjustment of the point A to another point (let this point be a point $A_2$) cannot allow a corresponding point $C_2$ indicative of a polarized light in dark display and a corresponding point $B_2$ indicative of a polarized light in bright display to be obtained simultaneously on the $S_3$ axis and on the $S_1$–$S_2$ plane, respectively.

The following description will explain how to distinguishes the cases shown in FIGS. 8 and 9 from the case shown in FIG. 10. Assuming that the phase difference plate can be completely freely designed, there is no limitation on the position of the point A on the surface of Poincaré sphere at all. Adequate bright/dark display cannot be obtained unless the points B and C are appropriately set when no limitation is on the point A. Therefore, considered in the present invention was a series of transforms, namely, transform of the point C to the point A that is reverse to the transform of the point A to the point C, and subsequent transform from the point A to the point B. By so doing, without assuming the point A, position relationship between the point B and the point C is made clear. Furthermore, in the present invention, it was found that to adapt a point on the $S_3$ axis as a starting point C is effective. By checking whether or not the final point B comes on the $S_1$–$S_2$ plane, it is possible to determine whether or not both satisfactory bright and dark displays can be obtained. In other words, in the case where the point B falls on the $S_1$–$S_2$ plane when the point C is set on the $S_3$ axis, bright and dark displays of the liquid crystal layer can be satisfactorily set, and otherwise it can be judged that the displays cannot be satisfactorily set. Incidentally, there are two points where the surface of Poincaré sphere and the $S_3$ axis intersect, but since they are symmetric with respect to the center of the Poincarésphere and this relationship is maintained in the foregoing transform as well, any point may be selected.

Figure 11:
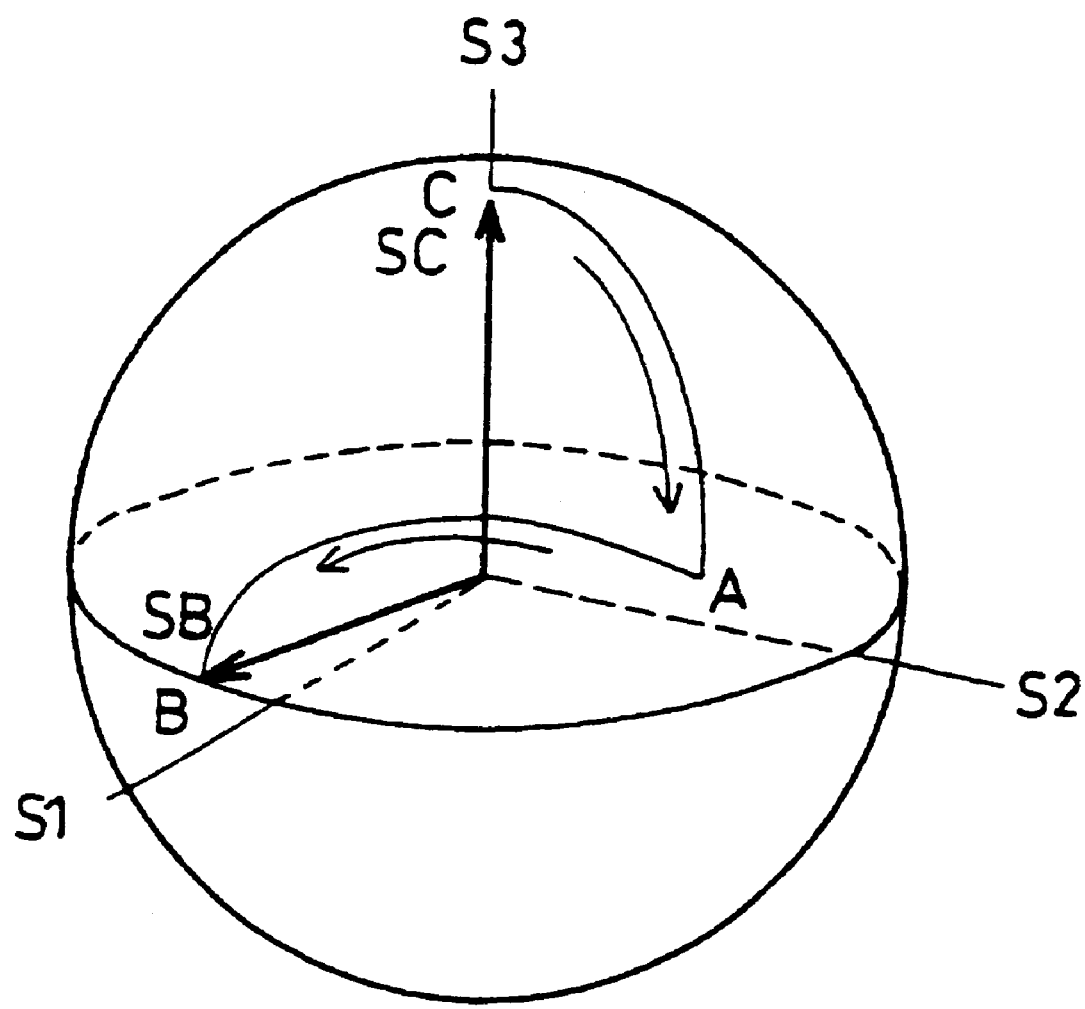
FIG. 11 is an explanatory view illustrating a concept of an evaluation function introduced by the present invention, showing transform in the Poincarésphere.
Figure 12:
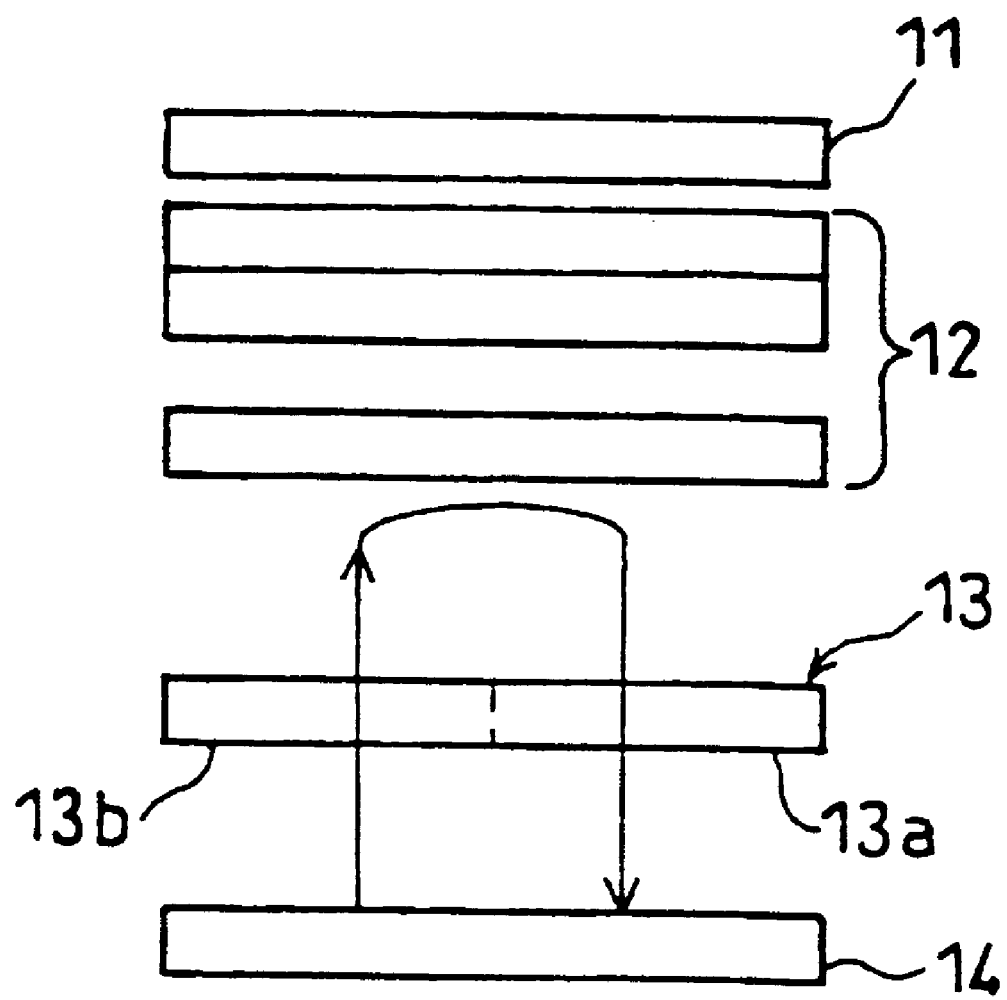
FIG. 12 is an explanatory view illustrating a concept of an evaluation function introduced by the present invention, showing an actual operation in a liquid crystal modulation element.

The path of the transform, and a transmission path of light in a liquid crystal element corresponding to the foregoing path are shown in FIGS. 11 and 12. More specifically, the light transmission path is a path for progress starting from the reflection plate 14, a dark display section 13b in a reversed direction, a bright display section 13a in a forward direction, and the reflection plate 14 in this order as depicted in FIG. 12. As clear from this figure, capability of the liquid crystal layer for bright display and dark display can be evaluated on its own, not depending on the design of the phase difference plate.

[Formulation of QOM]

Further, the following description will explain a Mueller matrix expressing the foregoing diagrammatic interpretation, to quantitatively examine a degree of such bright and dark displays of the liquid crystal layer by considering the bright and dark displays both at the same time. That the transform between the points A and B and the transform between the points C and A differ in liquid crystal alignment is taken into consideration. More specifically, to make it clear that a transform path on the surface of Poincaré sphere that depends on a control factor controlling the liquid crystal layer (for instance, a voltage applied to the liquid crystal layer) is traced, a Mueller matrix of the liquid crystal layer in an orientation toward the reflection plate is given as $M_{1c}(V)$. In the case where $V_1$ is selected as V in the path from the point C to the point A, a Mueller matrix corresponding to the foregoing path is expressed as $(M_{1c}(V_1))^{-1}$ that is a inverse matrix to indicate that light retrogresses time. In the case where $V_2$ is selected as V in the path from the point A to the point B, the transform is expressed as $M_{1c}(V_2)$. Therefore, the transform from the point C to the point A, then subsequently from the point A to the point B is expressed as $M_{1c}(V_2)(M_{1c}(V_1))^{-1}$.

Since Stokes's vectors of light on the reflection plate in the dark display case and in the bright display case are equivalent to the points C and B on the surface of Poincaré sphere, respectively, let them be $S_C$ and $S_B$, respectively, and $S_B$ can be obtained by operating $M_{1c}(V_2)(M_{1c}(V_1))^{-1}$ on $S_c$. In other words, relationship as expressed by an expression (12) below is held:

$$S_B = M_{1c}(V_2)(M_{1c}(V_1))^{-1} S_C \quad (12)$$

Then, by calculating a value of $S_B$ by using, as $S_C$, a circularly polarized light $^T(1, 0, 0, 1)$ as a point on the $S_3$ axis, determination of capability of bright/dark display of the liquid crystal layer is enabled.

Here, with reference to FIG. 11, physical significance in this case will be explained below. The point A when $S_C$ is selected as a circularly polarized light is indicative of polarized light immediately after passing a phase difference plate that is adjusted so as to realize good dark display at $V_1$. Then, the point A is transformed to the point B by the liquid crystal layer in alignment corresponding to $V_2$. A polarized state on the reflection plate corresponding to the point B expresses a polarized state on the reflection plate for bright display. Therefore, with an elevation angle of $S_B$ on the surface of Poincaré sphere from the $S_1$–$S_2$ plane, it is possible to predict a reflectance of the bright display in the case where it is assumed that good dark display is obtained with $V_1$. This indicates that a degree of modulation of the assumed liquid crystal layer can be quantitatively expressed as a quantity proportional to a reflectance.

The following description will explain concrete expression of the foregoing. Cases where light progressing toward the reflection plate in the liquid crystal layer when V is $V_1$ and when V is $V_2$ is transformed on the surface of Poincaré sphere by $M_{1c}(V_1)$ and by $M_{1c}(V_2)$ respectively, are assumed. These transforms $M_{1c}(V_1)$ and $M_{1c}(V_2)$ need to represent transform of polarized light by a general liquid crystal layer, and therefore need to be treated in a more general manner as compared to the case of the expression (5). Let an angle formed with a difference between polar angles from the $S_3$ axis on the surface of Poincaré sphere before and after the transform $M_{1c}(V_1)$ and one formed with a difference between those before and after the transform $M_{1c}(V_2)$ be $\Delta P_1$ and $\Delta P_2$, and let starting points and end points of azimuth angles (an azimuth angle projected onto the $S_1$–$S_2$ plane) of these transforms $A_{S1}$ and $A_{S2}$ as starting points and $A_{E1}$ and $A_{E2}$ as end points, respectively. By so doing, $M_{1c}(V_1)$ and $M_{1c}(V_2)$ can be dealt with generally. More specifically, they can be expressed by an expression (13) below.

$$M_{1c}(V_q) = \begin{pmatrix} 1 & 0 & 0 & 0 \\ 0 & \cos A_{E_q} & -\sin A_{E_q} & 0 \\ 0 & \sin A_{E_q} & \cos A_{E_q} & 0 \\ 0 & 0 & 0 & 1 \end{pmatrix} \begin{pmatrix} 1 & 0 & 0 & 0 \\ 0 & \cos\Delta P_q & 0 & -\sin\Delta P_q \\ 0 & 0 & 1 & 0 \\ 0 & \sin\Delta P_q & 0 & \cos\Delta P_q \end{pmatrix} \quad (13)$$

$$\begin{pmatrix} 1 & 0 & 0 & 0 \\ 0 & \cos A_{S_q} & -\sin A_{S_q} & 0 \\ 0 & -\sin A_{S_q} & \cos A_{S_q} & 0 \\ 0 & 0 & 0 & 1 \end{pmatrix}$$

where q is 1 or 2.

Therefore, by applying the foregoing expression to the expression (12), so as to derive $S_B$. Consequently, since the point A is common, an expression (14) below can be derived by applying $A_{S1} = A_{S2}$.

$$S_B = \begin{pmatrix} 1 \\ \cos A_{E_1} \sin(\Delta P_2 - \Delta P_1) \\ \sin A_{E_1} \sin(\Delta P_2 - \Delta P_1) \\ \cos(\Delta P_2 - \Delta P_1) \end{pmatrix} \quad (14)$$

Here, the elevation angle P that determines a reflectance is measured on the $S_1$–$S_2$ plane while it is measured from the $S_3$ axis in the expression (14). By taking this into consideration, an expression (15) below can be obtained:

$$\cos P = \sin(\Delta P_2 - \Delta P_1) \quad (15)$$

-continued $$\therefore \cos^2 P = 1 - \cos^2(\Delta P_2 - \Delta P_1)$$
$$= 1 - \{(S_B)_3\}^2$$
$$= 1 - \{(M_{1c}(V_2)(M_{1c}(V_1))^{-1})_{33}\}^2$$

By combining this with the expression (11), the capability of contrast display is predictable as a quantitative value proportional to a reflectance, by using only the (3,3)element of $M_{1c}(V_2)$ $(M_{1c}(V_1))^{-1}$ expressing light transmission in FIGS. 11 and 12. Therefore, let a quantity of modulation between bright display and dark display be QOM, and be defined as an expression (16), and let the capability of modulation of the liquid crystal layer be evaluated by using QOM. Note that in the expression both $M_{1c}(V_1)$ and $M_{1c}(V_2)$ are Mueller matrices to affect light with a specific wavelength that passes through a liquid crystal layer in a normal direction with respect to the liquid crystal layer that has a liquid crystal alignment controlled by a control factor V, and a subscript of "33" is indicative of a matrix element of the Mueller matrix that determines transform relationship of a circularly polarized component.

$$QOM \equiv 1 - \{(M_{1c}(V_2)(M_{1c}(V_1))^{-1})_{33}\}^2 \qquad (16)$$

[Characteristics of QOM]

In the foregoing explanation, a parameter (voltage) in control design to realize dark display is given as $V_1$ and that to realize bright display is given as $V_2$. However, since these liquid crystal layers can be expressed as the expression (13) without losing generality, a inverse matrix and a transposed matrix become the same matrix. Therefore, an expression (17) is derived as follows:

$$(M_{1c}(V_2)(M_{1c}(V_1))^{-1})_{33} = (M_{1c}(V_2)^T M_{1c}(V_1))_{33} \qquad (17)$$
$$= (M_{1c}(V_1)^T M_{1c}(V_2))_{33}$$
$$= (M_{1c}(V_1)(M_{1c}(V_2))^{-1})_{33}$$

In other words, even in the case of a combination of control design parameters in which the parameter for the dark display is $V_2$ while the parameter for the bright display is $V_1$, that is reverse to the combination in the foregoing explanation, the foregoing expression (16) likewise expresses capability of modulation. Therefore, whether a control state used in the QOM is for bright state or for dark state need not be determined beforehand. To state differently, the QOM possesses an effective property as a general expression for evaluating only capability of brightness modulation.

Thus, in the present invention, in evaluating optical modulation characteristics of a liquid crystal modulation element that has at least one optical modulation element for modulating light, one of the optical modulation elements being an optically anisotropic object, let optical modulation effects of each optical modulation element be expressed by matrices, and let a Mueller matrix obtained by multiplying the matrices from left in a light transmission order be $M_{LCD}$. Concerning a certain control factor V (a voltage in the present embodiment)=$V_1$, $V_2$ of the optical modulation element, let one be for dark display ($V_1$) while let the other one be for bright display ($V_2$), and let matrices regarding light since immediately before incidence to the optically anisotropic object until immediately after outgoing therefrom in the foregoing cases be $M(V_1)$ and $M(V_2)$, respectively. Then, $M(V_1)^{-1}$ as reverse transform is derived, so that a Mueller matrix $M\alpha$ as below is derived:

$$M\alpha = M(V_2)M(V_1)^{-1}$$

Then, a QOM as a predetermined quantity of the foregoing optically anisotropic object is expressed with elements of the foregoing $M\alpha$, and the QOM is arranged so as to be proportional to a difference between a value in a bright display and a value in dark display of an (0,0)element of the foregoing $M_{LCD}$, the (0,0)element being indicative of a brightness of the foregoing liquid crystal modulation element. By using the QOM as an index for a brightness modulation quantity equivalent to a difference between brightness of the bright display and that of the dark display, the optical modulation characteristics of the liquid crystal modulation element are evaluated.

[Example 1 of Evaluation with Calculation]

A capability of modulation of bright and dark display of a single-polarizing-plate reflection-type display in the case of a liquid crystal layer characterized by combination of a liquid crystalline material with a positive dielectric anisotropy and horizontal alignment, which is of the widest use as liquid crystal layer, was evaluated by using a QOM, and conditions for enabling good contrast display of the liquid crystal layer were determined. More specifically, let one controlled state be a state in the case where a nematic liquid crystalline material is aligned so as to be horizontally twisted and a voltage is not applied to a liquid crystal layer ($V_1$=0), while let the other controlled state be a state in the case where, assuming that a high voltage is applied, a voltage $V_2=\infty$ is applied to the liquid crystal layer thereby causing the liquid crystal layer to have no polarization transforming characteristic.

The state in the case where no voltage is applied to the liquid crystal layer ($V_1$=0) can be expressed by an optical medium that is aligned so that uniaxial crystals have a twisted slow axis that changes an orientation in a layer plane as light progresses, and its Jones matrix can be analytically calculated. By using matrix elements of the Jones matrix, it is transformed to a Mueller matrix according to the expression (9). A medium not having a polarization transform characteristic (a liquid crystal layer when $V_2=\infty$) provides an identity matrix in both the Jones matrix case and the Mueller matrix case. These are used as two matrices in the expression (16), so that a QOM is obtained. Consequently, an expression (18) below is derived. Here, $\Delta n$ represents a difference between refractive indices for ordinary ray and extraordinary ray of the liquid crystalline material, d represents a thickness of the liquid crystal layer, $\lambda$ represents a wavelength, $\phi_{tw}$ represents a twist angle given as a difference between respective orientations of alignment of upper and lower substrates:

$$QOM = 1 - \left(1 - \frac{2\phi_\lambda^2}{\Theta^2}\sin^2\Theta\right)^2 \text{ where, } \phi_\lambda = \pi\Delta nd/\lambda, \Theta = \sqrt{\phi_\lambda^2 + \phi_{tw}^2} \qquad (18)$$

Figure 13:
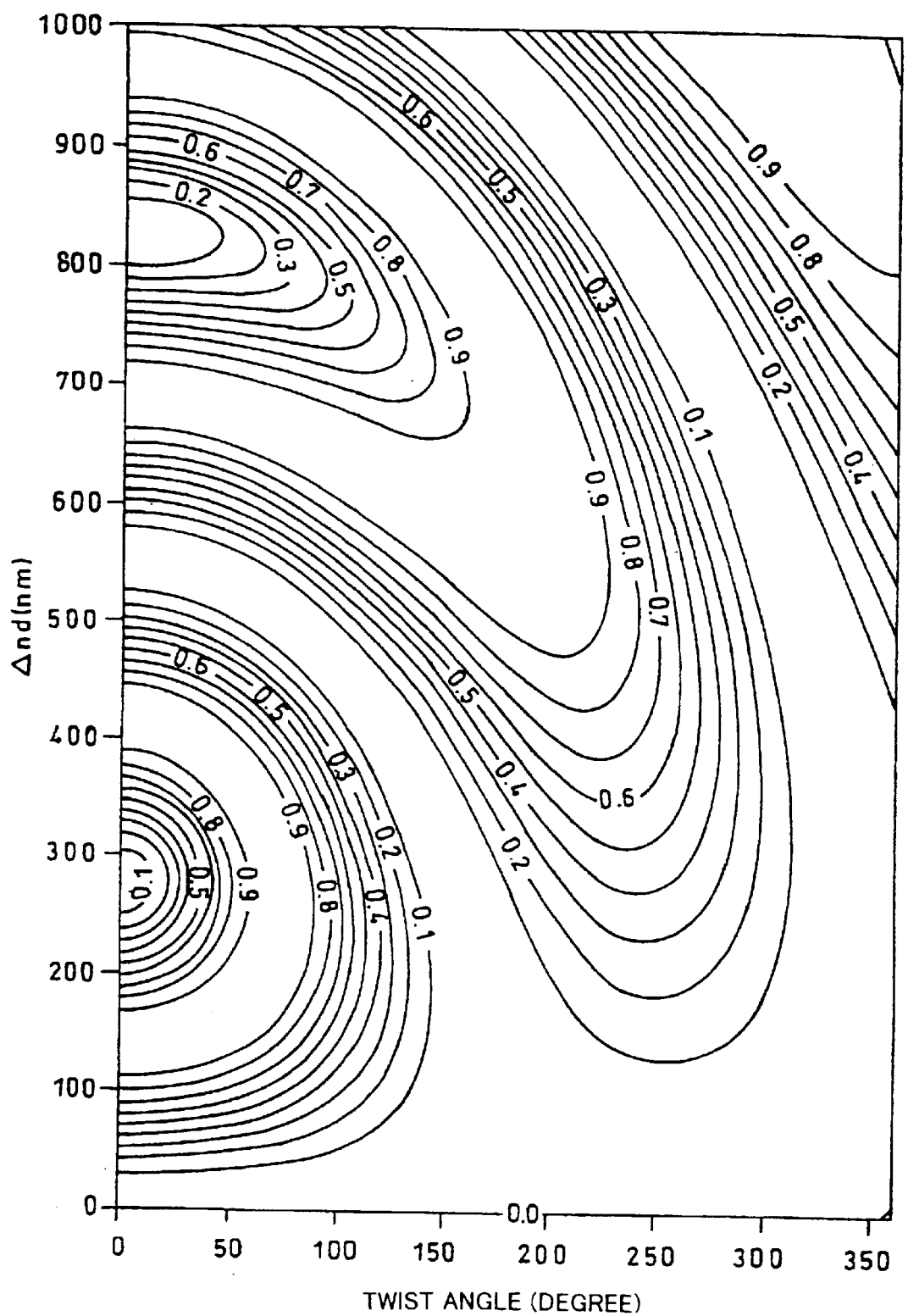
FIG. 13 is an explanatory view illustrating characteristics determined according to an evaluation function QOM introduced by the present invention with respect to light of 550 nm in the case of horizontal twist alignment.

Setting the wavelength $\lambda$ to 550 nm, which is a wavelength in the middle of the visible light range, QOMs are shown in FIG. 13, with a twist angle plotted as an abscissa and with $\Delta nd$ plotted as an ordinate. The expression 18 is an even function with respect to a twist angle, and is shown only in the case where the twist angle is positive. This shows a well-known result in which, in alignment with no twist, a case where good contrast display is possible ($\Delta nd$ is $\lambda/4$, or $3\lambda/4$, etc.) and a case where good contrast display is impossible ($\Delta$ is $\lambda/2$, or $\lambda$, etc.) alternately appear. What should be noted particularly is the case where a twist angle is given: with a twist angle of about 70° and Δnd of about 240 nm, an orientation in which a peak of the QOM is extended is parallel with the axis of Δnd in FIG. 13. This shows that in this area the value of the QOM is irresponsive to λ in the expression (18), and realization of satisfactory characteristics with respect to even visible light of a wavelength other than 550 nm can be predicted.

Hereinafter "a value of the QOM that is invariable with a value of Δnd (or a value obtained by dividing Δnd by a wavelength λ, i.e., Δnd/λ) and has a maximum of 1" is used as a criterion, referred to as a criterion C1.

To confirm that combination of the evaluation function QOM and the criterion C1 not only simply provides satisfactory contrast display, but also actually provides satisfactory color characteristics, a detailed evaluating scheme that is capable of dealing with light with different wavelengths as well as capable of predicting color characteristics of display is further provided in the present invention,

[In the Case Where Luminosity is Considered in Single Polarizing Plate Reflective LCD]

The evaluation function QOM arranged as in the foregoing description is a quantity of modulation of light having a certain uniform wavelength. By extending this so that luminosity and color information sensed by a human can be considered, an evaluation function that provides more effective information is provided.

First of all, the definition of the QOM, upon derivation of the expression (16), such that the QOM should be proportional to the reflectance and that physically the QOM should express the reflectance in bright display under the condition that satisfactory dark display is realized is utilized. Since the foregoing characteristics are secured, evaluation taking a color matching function and a light-source spectrum into account is enabled, in the same manner in which tristimulus values according to the CIE 1931 Standard Colorimetric System are derived from a general reflection spectrum. In other words, the evaluation function FOM as defined by an expression (19) below serves as a reference for a change of a modulation quantity in the visible wavelength range, with a weight according to luminosity being considered.

$$FOM = K \int_{380}^{780} QOM(\lambda) y(\lambda) S(\lambda) d\lambda \quad (19)$$

Here, the evaluation function QOM is given as the expression (16), λ represents a wavelength of light, y(λ) represents a curve of a spectral luminous efficiency for the CIE 1931 standard photometric observer, S(λ) represents a spectrum of light source used in the evaluation that is selected according to a light source at a site where the LCD device is used, K represents a proportional constant that is set so as to cause a maximum value of FOM to be 1, as shown in the following expression (20):

$$K = 1 / \int_{380}^{780} y(\lambda) S(\lambda) d\lambda \quad (20)$$

Furthermore, by using, as S(λ), a spectrum of a light source actually used, or by using a spectrum of a standard light source $D_{65}$, FOM_Y is defined as an expression (22) below. At the same time, by replacing the color matching function (a curve of a spectral luminous efficiency for the CIE standard photometric observer) y with color matching functions x and z, FOM_X and FOM_Z are defined as expressions (21) and (23) below, respectively.

$$FOM\_X = K \int_{380}^{780} QOM(\lambda) x(\lambda) S(\lambda) d\lambda \quad (21)$$

$$FOM\_Y = K \int_{380}^{780} QOM(\lambda) y(\lambda) S(\lambda) d\lambda \quad (22)$$

$$FOM\_Z = K \int_{380}^{780} QOM(\lambda) z(\lambda) S(\lambda) d\lambda \quad (23)$$

In this case, K is given as an expression (24) below:

$$K = 1 / \int_{380}^{780} y(\lambda) S(\lambda) d\lambda \quad (24)$$

By regarding FOM_Y, FOM_X, and FOM_Z as Y, X, and Z of the tristimulus values according to the CIE 1931, chromaticity coordinates can be calculated. Needless to say, the chromaticity is a chromaticity of bright display under the condition that satisfactory dark display is realized. Thus, prediction of a modulation capability and a color characteristic with the entirety of visible wavelengths taken into consideration is enabled.

[Example 2 of Calculation for Evaluation]

Figure 14:
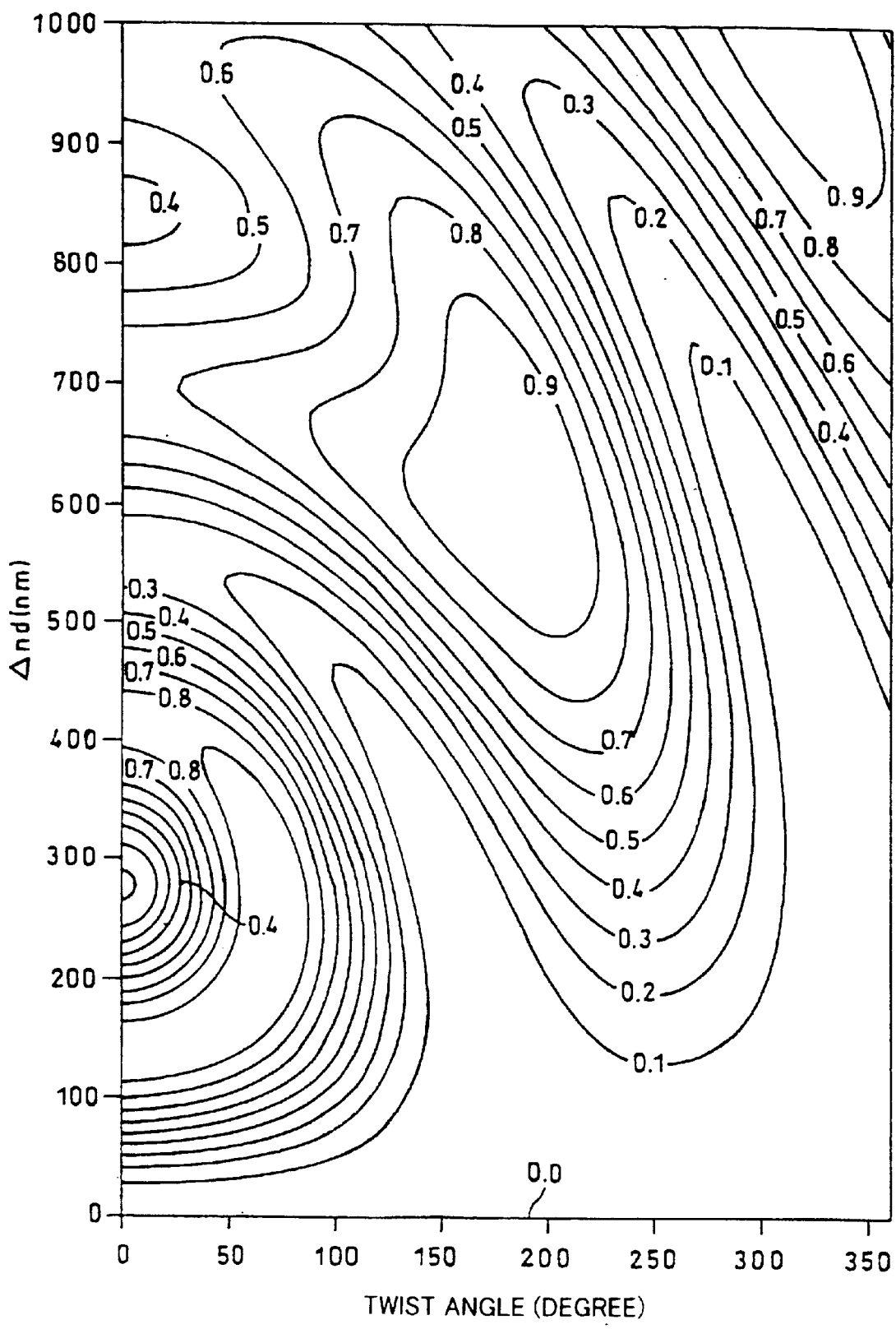
FIG. 14 is an explanatory view illustrating characteristics determined according to an evaluation function FOM introduced by the present invention with respect to light of 550 nm in the case of horizontal twist alignment.

The FOM defined by the expression (19) was calculated under the conditions described in conjunction with the foregoing evaluation calculation Example 1. For the light source spectrum, a standard light source D65 was used. Values of the evaluation function FOM are shown in FIG. 14, with a twist angle plotted as an abscissa and with Δnd plotted as an ordinate. Here, upon integration over the visible wavelengths, it is necessary to consider wavelength dispersion of Δn in calculating the evaluation function QOM in an integrand, but here a wavelength distribution characteristic of ZLI-4792 (available from Merck Co.), which is a common liquid crystalline material was used.

Consequently, it was found that a point with a twist angle of 0° and Δnd of 137 nm and a point with a twist angle of 0° and Δnd of 412 nm, both of which exhibited the same value of 0.996 as a result (FIG. 13) of calculation of the evaluation function QOM in the case where the single wavelength was 550 nm, could be expressed as points with different luminous brightnesses (luminous reflectances). More specifically, at the point with a twist angle of 0° and Δnd of 137 nm, the evaluation function FOM was 0.976, while at the point with a twist angle of 0° and Δnd of 412 nm, the evaluation function FOM was 0.845. Thus, by characteristic prediction according to the expression 19, the luminous brightness throughout an entirety of the visible light range is possible.

Figure 15:
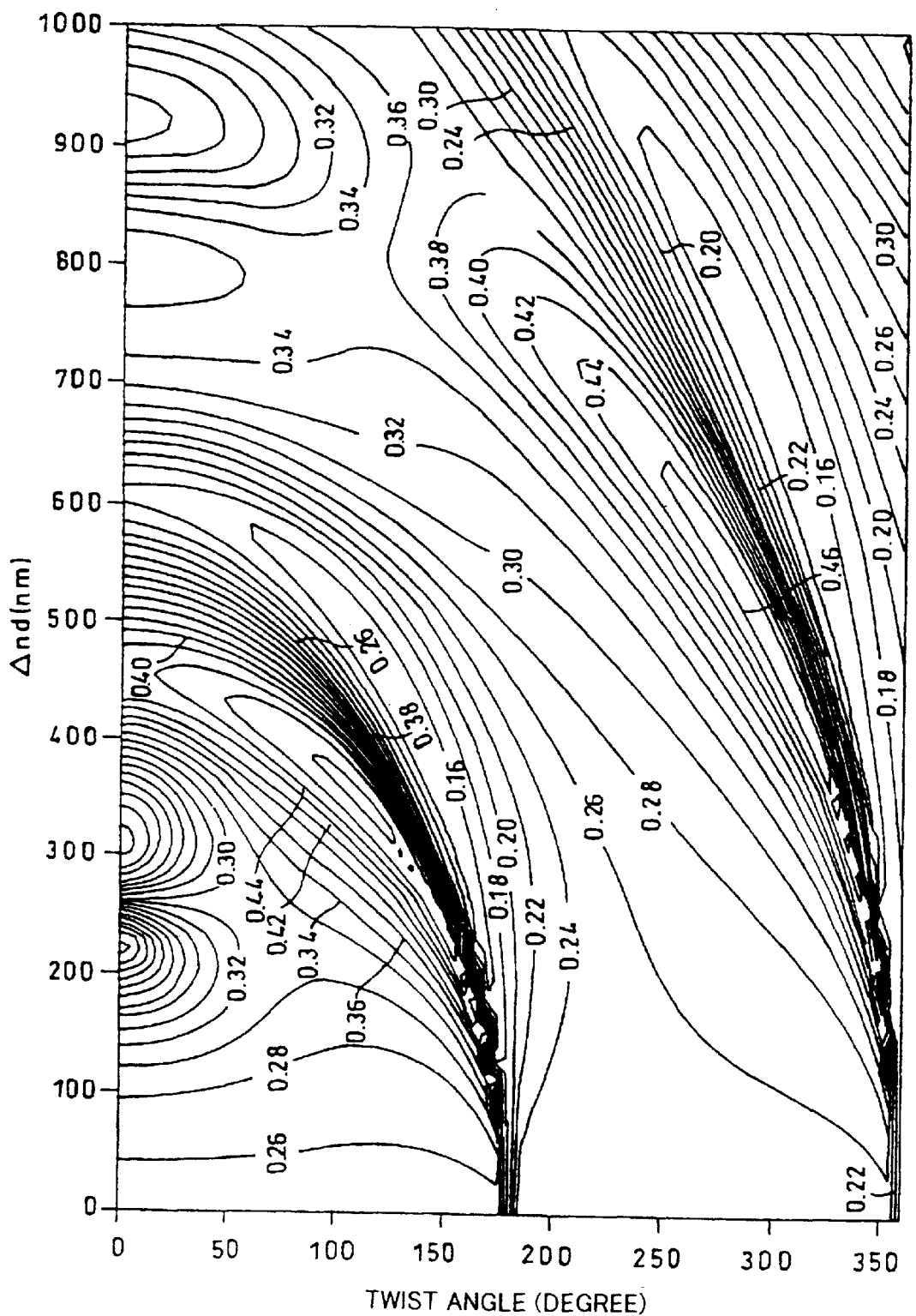
FIG. 15 is an explanatory view illustrating characteristics indicating an x coordinate of a chromaticity coordinate CIE 1931 determined according to an evaluation function introduced by the present invention.
Figure 16:
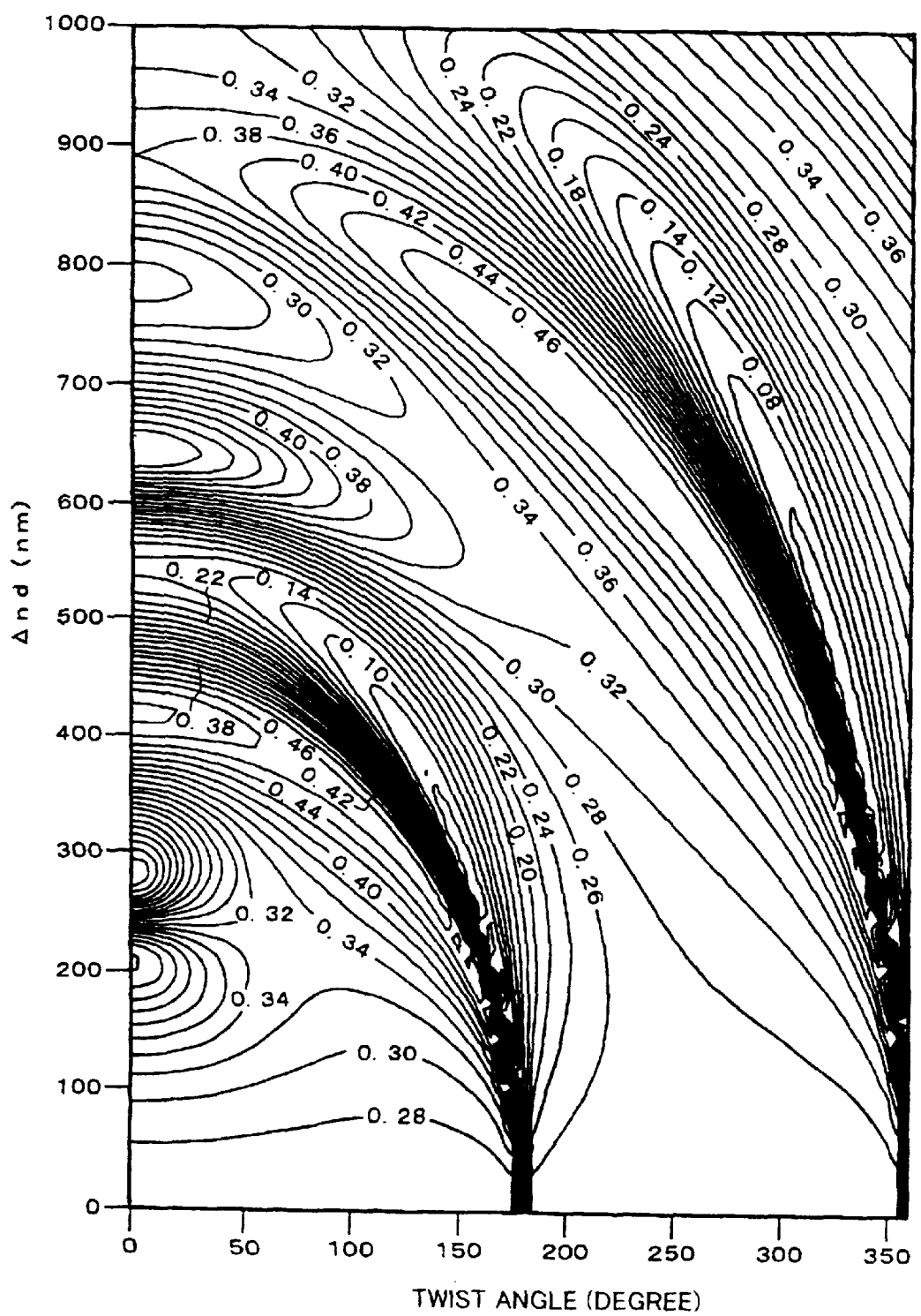
FIG. 16 is an explanatory view illustrating characteristics indicating a y coordinate of a chromaticity coordinate CIE 1931 determined according to an evaluation function introduced by the present invention.

Furthermore, under the same conditions, by using the definitions according to the expressions (21) through (23), the tristimulus values X, Y, and Z according to the CIE 1931 were derived, and an x coordinate and a y coordinate were calculated. Respective results concerning the x coordinate and the y coordinate are shown in FIGS. 15 and 16, separately.

By adding the color information X and Z to the evaluation function FOM equivalent to the luminous brightness of FIG. 14, detailed characteristic prediction including display colors is enabled. For instance, regarding two points (45°, 380 nm) and (70°, 240 nm), the former has an evaluation function FOM of 0.917 and chromaticity coordinates (x, y) of (0.3775, 0.4604), while the latter has an evaluation function FOM of 0.998 and chromaticity coordinates (0.3123, 0.3293). Thus, even if two satisfactory display designs are realized with good dark display and good bright display using FOM, they may have different white balances each other. Thus, color characteristics of a liquid crystal layer can be predicted by the expressions (21) through (23).

Furthermore, to clarify design conditions that could provide satisfactory bright display and satisfactory white balance both, a value of FOM of the expression (19), as well as a* and b* of the CIE 1976 L*a*b* system (hereinafter referred to as the CIE LAB system) that reflects human vision characteristics better than the CIE 1931 chromaticity coordinate system does and that can be calculated based on the CIE 1931 chromaticity coordinate system were calculated according to the expressions (21) and (23), and conditions that could provide satisfactory display by combining a* and b* with FIG. 14 were found.

Figure 17:
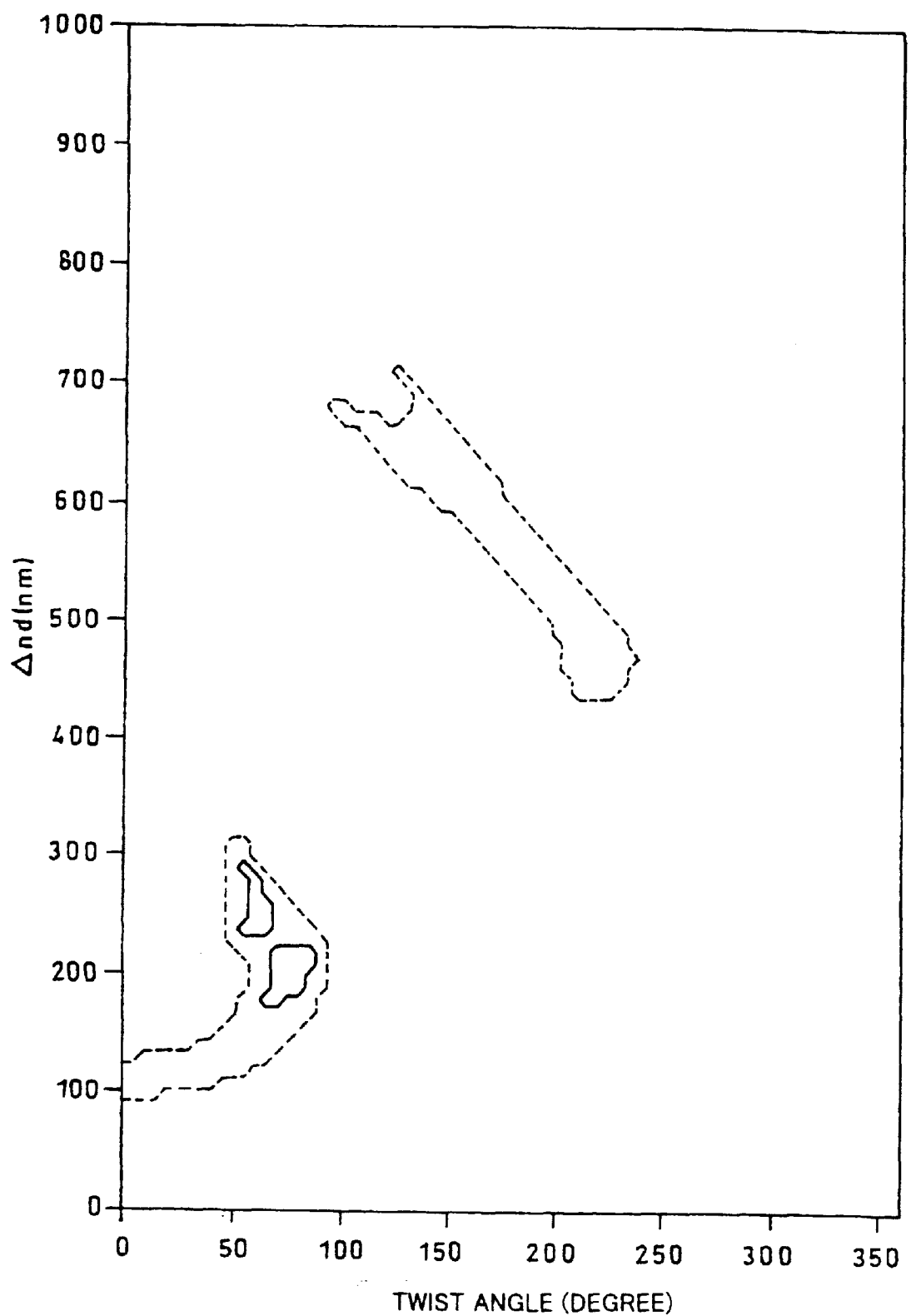
FIG. 17 is an explanatory view illustrating characteristics indicating an area indicative of a range of design parameters that cause a modulation quantity and white balance determined according to an evaluation function introduced by the present invention to become satisfactory.

The result is shown in FIG. 17. A region encircled with a broken line in FIG. 17 is a region in which FOM is not less than 0.8 and not more than 1.0, a* is not less than −8 and not more than 10, and b* is not less than −13 and not more than 5. On the other hand, a region encircled with a solid line in FIG. 17 is a region in which IFOM is not less than 0.9 and not more than 1, a* is not less than −3 and not more than 5, and b* is not less than −8 and not more than 0. As clear from this figure, there is a region where the satisfactory bright display and the satisfactory white balance both are achieved, only in the close vicinity of a point (70°, 210 nm) and in the vicinity of a point (60°, 260 nm). Incidentally, ranges of a* and b* used in the foregoing judgement were determined by considering the foregoing coordinates as well as experiment outcomes of colorimetry based on human subjective evaluations. Here, the point (60°, 260 nm) has satisfactory characteristics when $V_2$ is infinite, but as will become explicit in Example 3 of the calculation for evaluation below, good conditions leading to this point (60°, 260 nm) cannot be realized even with an increase of the voltage under good conditions in the case where the voltage is finite. Therefore, this point is not dealt with hereinafter.

Consequently, the best brightness modulation capability of the liquid crystal layer under the condition of no voltage application and under the condition of infinite voltage application is achieved in the two cases where the twist angle and the Δnd are 70° and 210 nm, respectively, and where the twist angle and the Δnd are 60° and 260 nm, respectively. From FIG. 17, it can be seen that these cases provide better conditions than the case shown in Tokukaihei 2-236523 in which the twist angle is 63° and the Δnd is 193 nm. The foregoing Tokukaihei 2-236523 adopts a derivation method based on orientations of a polarizing plate and a liquid crystal layer that are limited to specific orientation, using only a specific wavelength. However, with more accurate characteristic prediction according to the method of the present invention, it is found that different conditions from above are optimal.

Actually, in the case where the twist angle and the Δnd were 63° and 193 nm, respectively, the evaluation function FOM, a* and b* were 0.992, −1.622, and 1.527, respectively. On the other hand, in the case where the twist angle and the Δnd were 70° and 210 nm, respectively, the evaluation function FOM, a* and b* were 0.998, −1.141, and −0.371, respectively. Thus, there is a difference between the values of b*. Based on this, it is found that better brightness modulation is achieved at the point with the twist angle of 70° and the Δnd of 210 nm, with regard to the white balance.

Here, set as a criterion C2 is a criterion such that, "with a set of voltages ($V_1$, $V_2$), the FOM should be not less than 0.9 and not more than 1, a* should be not less than −3 and not more than 5 and b* should be not less than −8 and not more than 0".

In other words, a region enclosed by the solid line in FIG. 17 indicates optimal values selected according to the criterion C2.

The region indicating satisfactory contrast modulation over a wide range of wavelengths according to the criterion C1 provided before, and the region indicating satisfactory color characteristics according to the criterion C2 are substantially the same, and actually, design conditions that are adjacent to each other are selected as respective optimal values. Therefore, for conveniences' sake, optimal conditions are searched for according to the determination based on the criterion C1.

Furthermore, by adopting the method in accordance with the present invention, it is possible to evaluate the capability of contrast display, even in the case where the director of the liquid crystal layer is a director intermediate between the two assumed director configurations of the liquid crystal layer. Accordingly, the following description will explain an example of design in which the method in accordance with the present invention is applied to the intermediate liquid crystal director.

[Example 3 of Calculation for Evaluation (Case of Finite-Voltage, without Twist)]

Different from the above described examples 1 and 2 of the calculation for evaluation, design taking a liquid crystal alignment with respect to an actual voltage applied to the liquid crystal layer into consideration is carried out by a method in accordance with the present invention. The QOM according to the expression (16) was calculated by limiting the conditions such that the liquid crystal layer was horizontally aligned without twist. Here, to examine an optical effect, an elastic constant and a dielectric constant of liquid crystal typical as a liquid crystalline material (ZLI-4792) were used. Furthermore, the liquid crystal layer thickness d was set to 3 μm, and the liquid crystal alignment upon application of a voltage of 0V to 10V was calculated according to the continuum theory.

Next, optical characteristics in the case of the foregoing liquid crystal alignment were calculated. By dividing the originally continuum liquid crystal layer in the foregoing alignment with thickness of 3 μm into 100 sub-layers, and by sampling the layer at each sub-layer, optical properties of the whole layer was approximated with the consecutive series of sampled properties. Hereinafter each part thus discretely separated is referred to as liquid crystal sub-layer. Light transmission characteristics in the liquid crystal layer that is expressed as an aggregation of liquid crystal sub-layers are calculated as a lamination of characteristics of transmission of light through a uniaxial birefringent object having an optic axis that represents a liquid crystal alignment orientation of each liquid crystal microelement. Optical characteristics of a series of liquid crystal layers were calculated by the Jones Matrix method that is capable of a case where the optical axis is tilted. Since an object herein was to examine an optical effect of the liquid crystal layer, the following calculation was carried out by varying a ratio of an optical anisotropy Δn of a liquid crystalline material with respect to a wavelength λ. Then, a Jones matrix of light that passes in a layer normal direction of the liquid crystal layer was derived by numerical computation.

Thus, each polarization transform characteristic of the liquid crystal layer with respect to each voltage was expressed with a Jones matrix, and it is transformed to the Mueller matrix by the expression (9), and the evaluation function QOM was calculated according to the expression (16). In the calculation, Mueller matrices according to the expression (9) were prepared as tables for each voltage, and by executing calculation with respect to a combination of two desired voltages selected from the tables according to the expression (16), the calculation of the QOM with arbitrary two voltages in combination was enabled. Voltages of 0V and 3V were selected as the voltage $V_1$, the other voltage $V_2$ for determining liquid crystal alignment was set variable, and further, Δnd/λ obtained by multiplying Δn/λ that was set variable in calculation with d was set variable, whereby values of the QOM were diagrammatically shown with the foregoing two variables. The values of the QOM in the case where $V_1$ was 0V and in the case where $V_1$ was 3V were shown in FIGS. 18 and 19, respectively.

Figure 18:
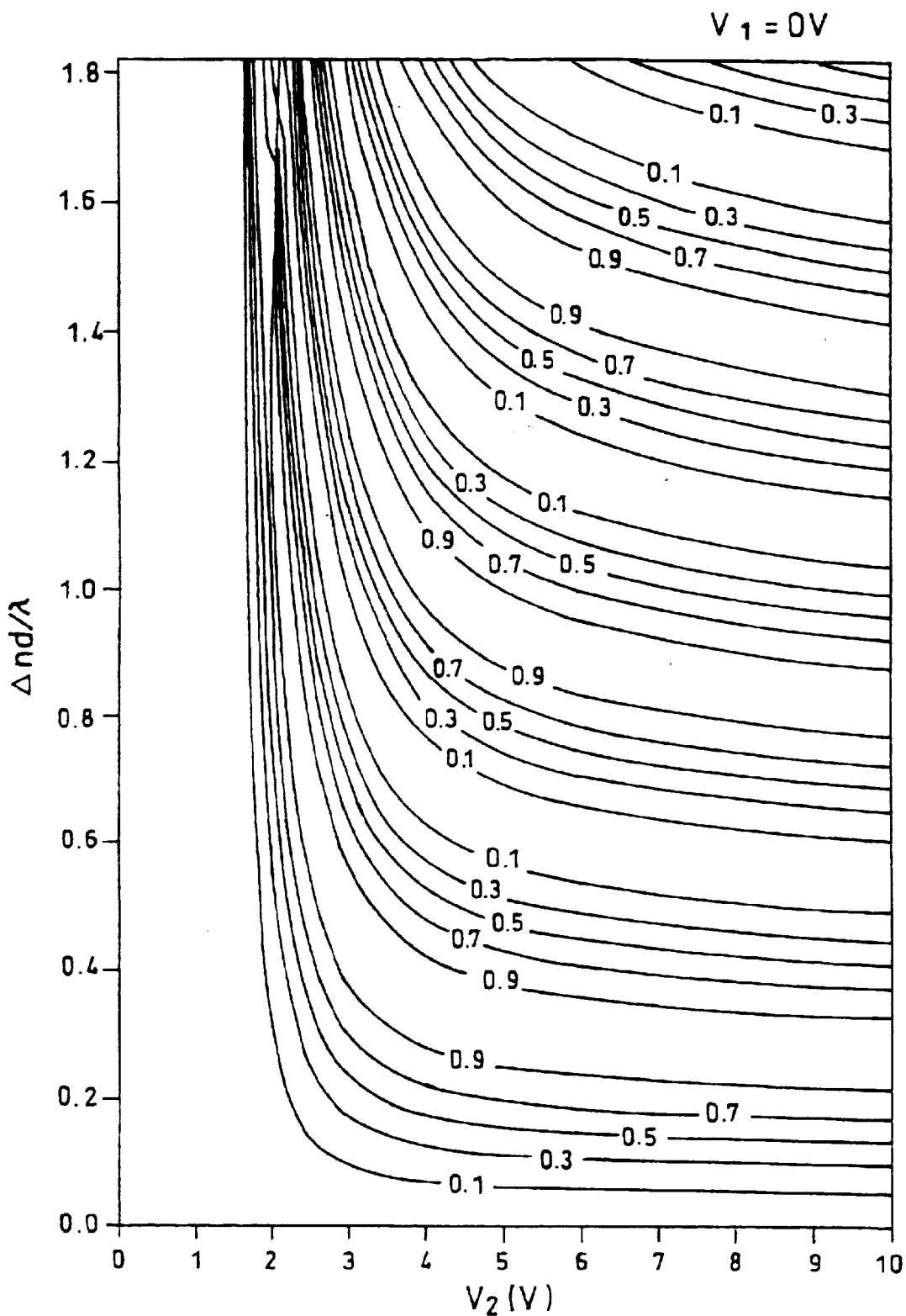
FIG. 18 is an explanatory view illustrating characteristics determined according to the evaluation function QOM introduced by the present invention with respect to a voltage $V_2$ that is applicable in combination with the voltage $V_1$ and a value of a design parameter, in the case where the liquid crystal layer is prepared in horizontal alignment without twist, when $V_1=0V$.

According to FIG. 18 showing the case where the voltage $V_1$ was 0V, the following can be seen: in the case where the $\Delta nd/\lambda$ was set to about 0.3, good contrast display was made possible with a combination of the voltage $V_1$ (0V) and the voltage $V_2$ of 10V; and in the case where the $\Delta nd/\lambda$ was set to about 0.5, contrast display was made possible with a combination of the voltage $V_1$ and the voltage $V_2$ of 3V.

Figure 19:
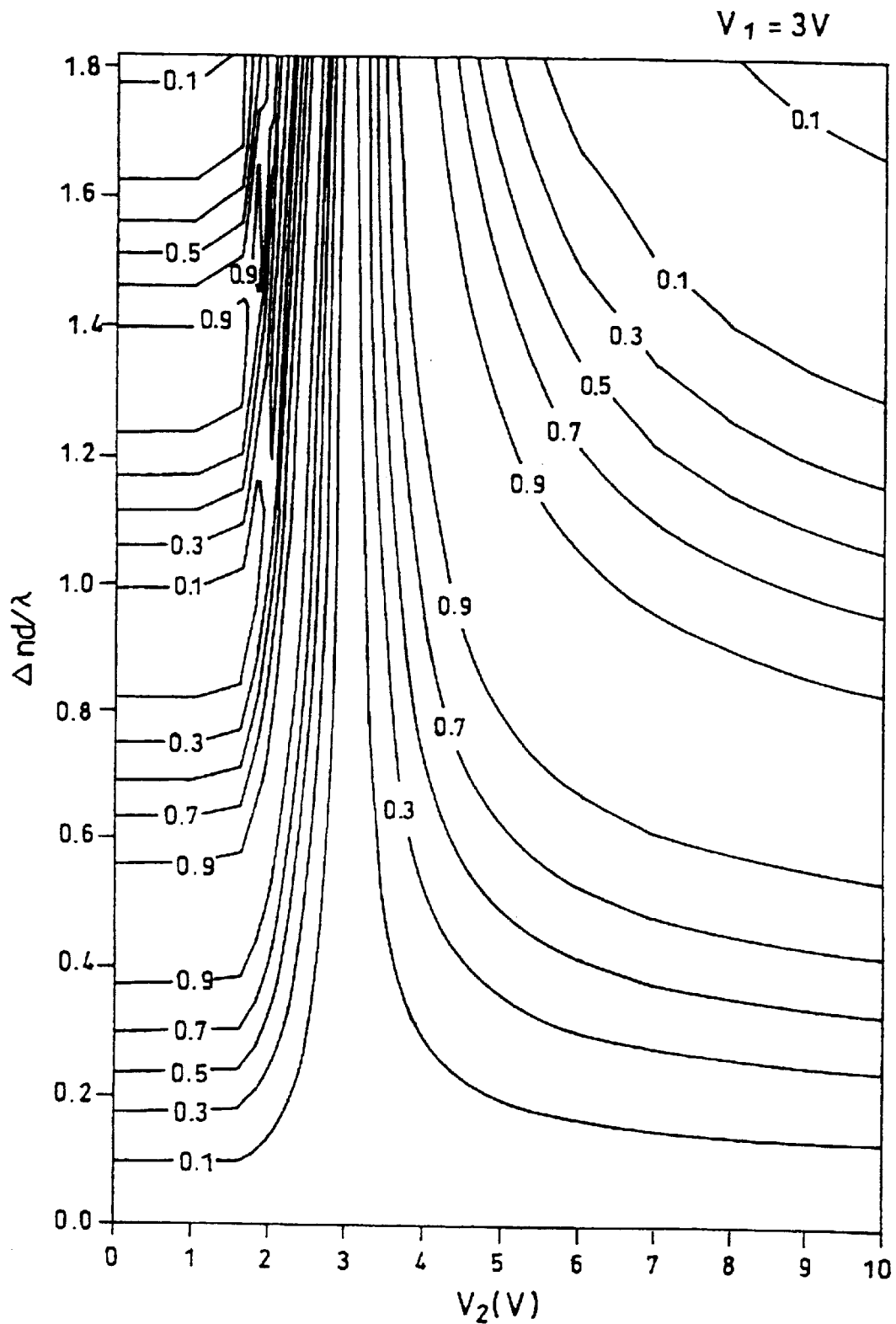
FIG. 19 is an explanatory view illustrating characteristics determined according to the evaluation function QOM introduced by the present invention with respect to a voltage $V_2$ that is applicable in combination with the voltage $V_1$ and a value of a design parameter, in the case where the liquid crystal layer is prepared in horizontal alignment without twist, when $V_1=3V$.

Furthermore, according to FIG. 19 showing the case where the voltage $V_1$ was 3V, the following can be seen: in the case where the $\Delta nd/\lambda$ was set to about 0.5, satisfactory contrast display was made possible when the voltage $V_2$ was se,t to 0V; and in the case where the $\Delta nd/\lambda$ was set to about 0.7, satisfactory contrast display was made possible with a combination of the voltage $V_1$ and the voltage $V_2$ of 10V.

Thus, by the foregoing method, whether combinations of liquid crystal layers in different controlled states are capable of contrast display is determined by calculation. Furthermore, the QOM is applied to the expression (19), the FOM can be also calculated, and moreover, the color characteristics can be predicted according to the expressions (21) through (23).

In other words, the evaluation means in accordance with the present invention enables the design with the residual effect of the polarization transform taken into consideration, in which infinite voltages are not allowed to be applied to an actual liquid crystal layer, unlike the case where one of the voltages is infinite as shown in the above described example 1 of evaluation with calculation.

[Example 4 of Calculation for Evaluation (Case of Finite Voltage, with Twist)]

Furthermore, to intend to design a liquid crystal layer with an actual liquid crystal alignment upon application of an actual and finite voltage taken into consideration, the QOM was derived, also in other cases than the case where the twist angle is 0°. The method of calculation was identical to that of Example 2, while a twisted alignment was applied to the liquid crystal layer. The twist was arranged applying alignment by changing the orientation of liquid crystal in the vicinity of interfaces thereof with the substrates sandwiching the liquid crystal layer, and further, by mixing a chiral dopant that naturally induces twist in the liquid crystal layer, in a quantity such that a twist angle should conform to the interface condition. The twist angle was varied from 0° to 180°. Since the result did not depend on whether the twist was positive or negative, only the cases where it was positive were used in the calculation.

The result is shown in FIGS. 20 through 24. Unlike FIGS. 18 and 19 $V_1$ and $V_2$ were fixed, and the twist angle is plotted as the abscissa. Furthermore, $\Delta nd/\lambda$ is plotted as the ordinate, as in FIGS. 18 and 19. FIGS. 20 through 24 illustrate results in the case where the combination of $V_1$ and $V_2$ is (0V, 10V), (1.6V, 4.8V), (1.6V, 4V), (1.6V, 3.2V), and (1.6V, 2.4V), respectively.

Figure 20:
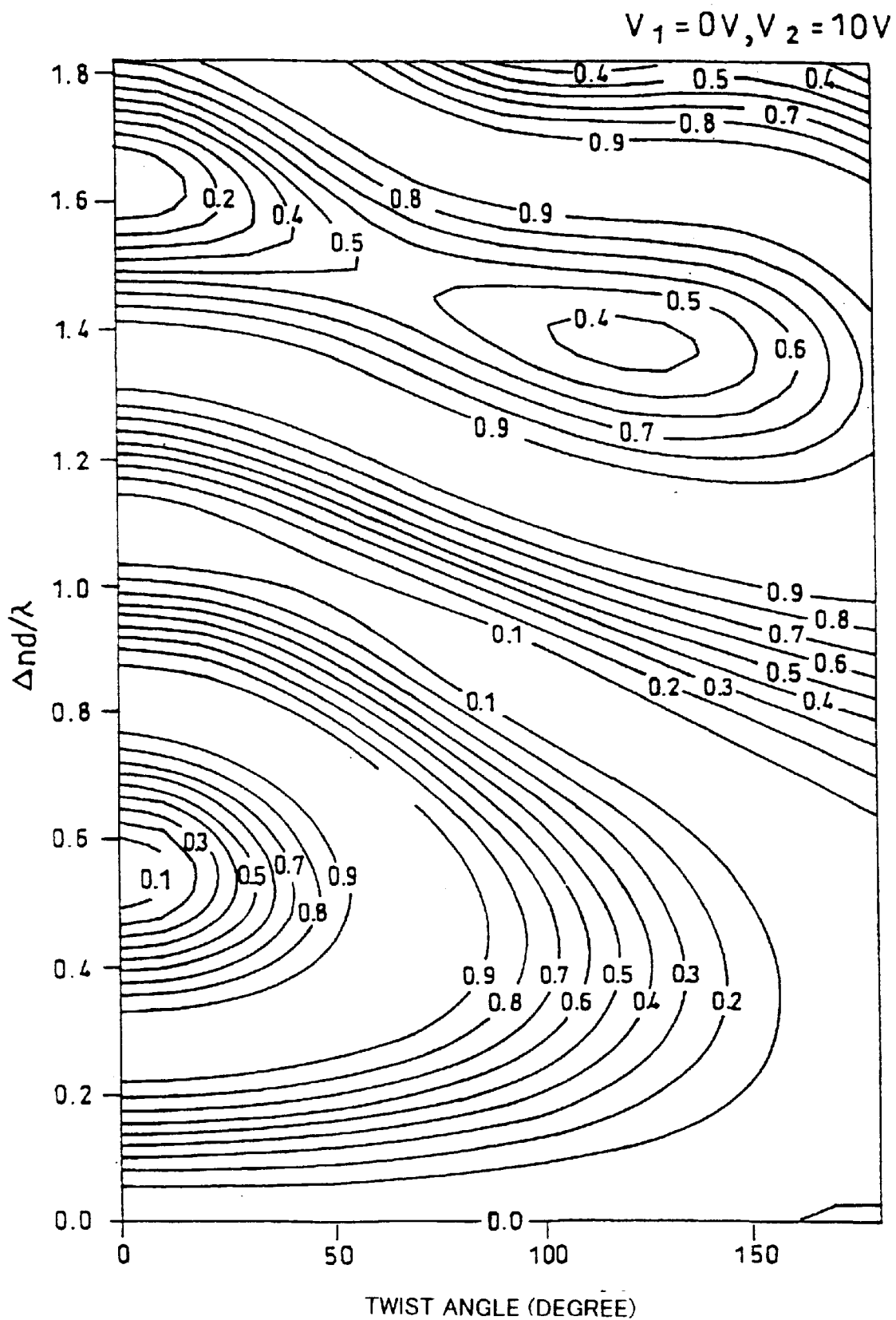
FIG. 20 is an explanatory view illustrating characteristics determined according to the evaluation function QOM introduced by the present invention with respect to a twist angle and a value of a parameter, with a combination of a voltage $V_1$ and a voltage $V_2$ when they satisfy $V_1-0$ and $V_2-10V$, respectively, in the case where a liquid crystal layer is prepared in horizontal alignment with twist.
Figure 21:
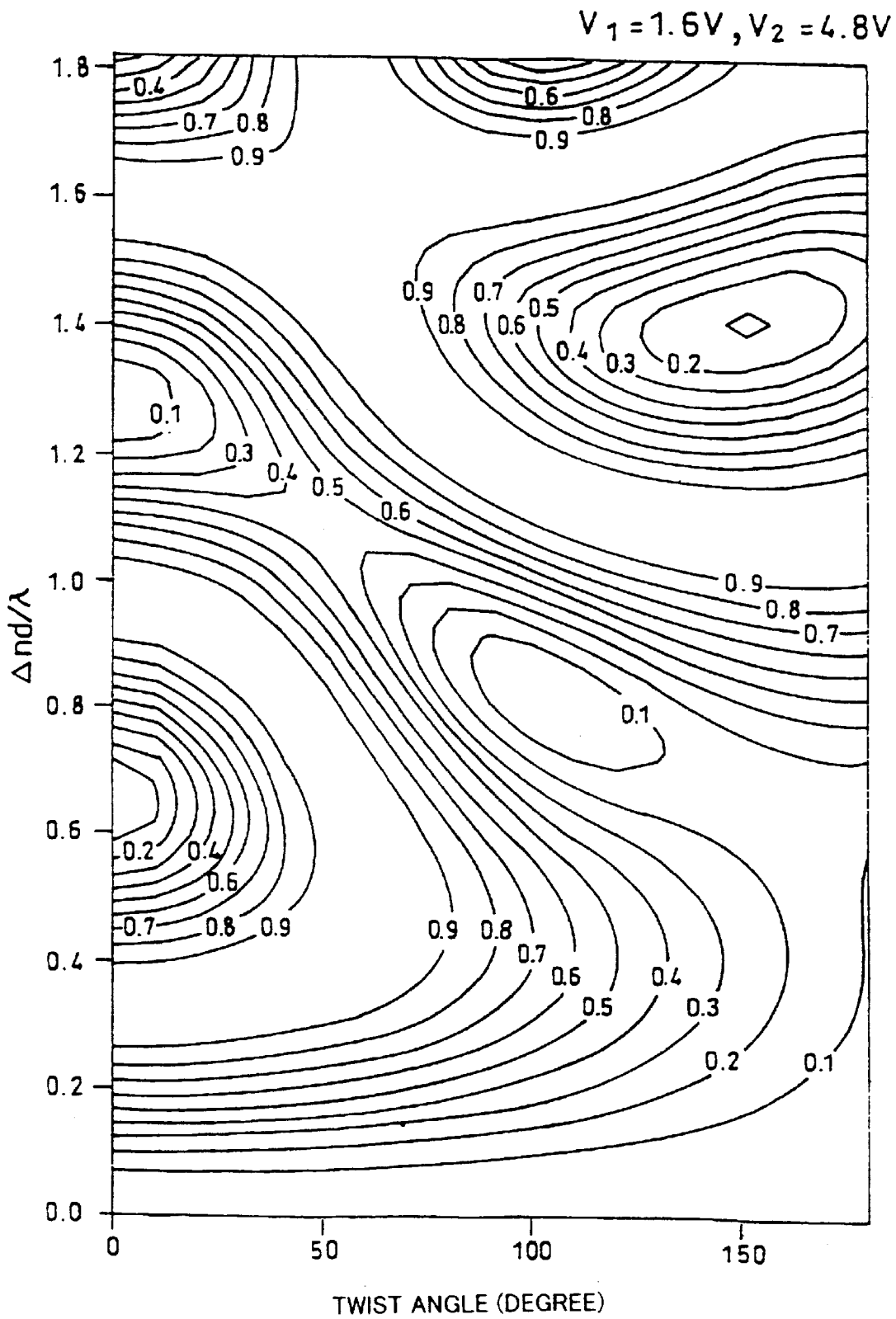
FIG. 21 is an explanatory view illustrating characteristics determined according to the evaluation function QOM introduced by the present invention with respect to a twist angle and a value of a parameter, with a combination of a voltage $V_1$ and a voltage $V_2$ when they satisfy $V_1-1.6$ and $V_2-4.8V$, respectively, in the case where a liquid crystal layer is prepared in horizontal alignment with twist.
Figure 22:
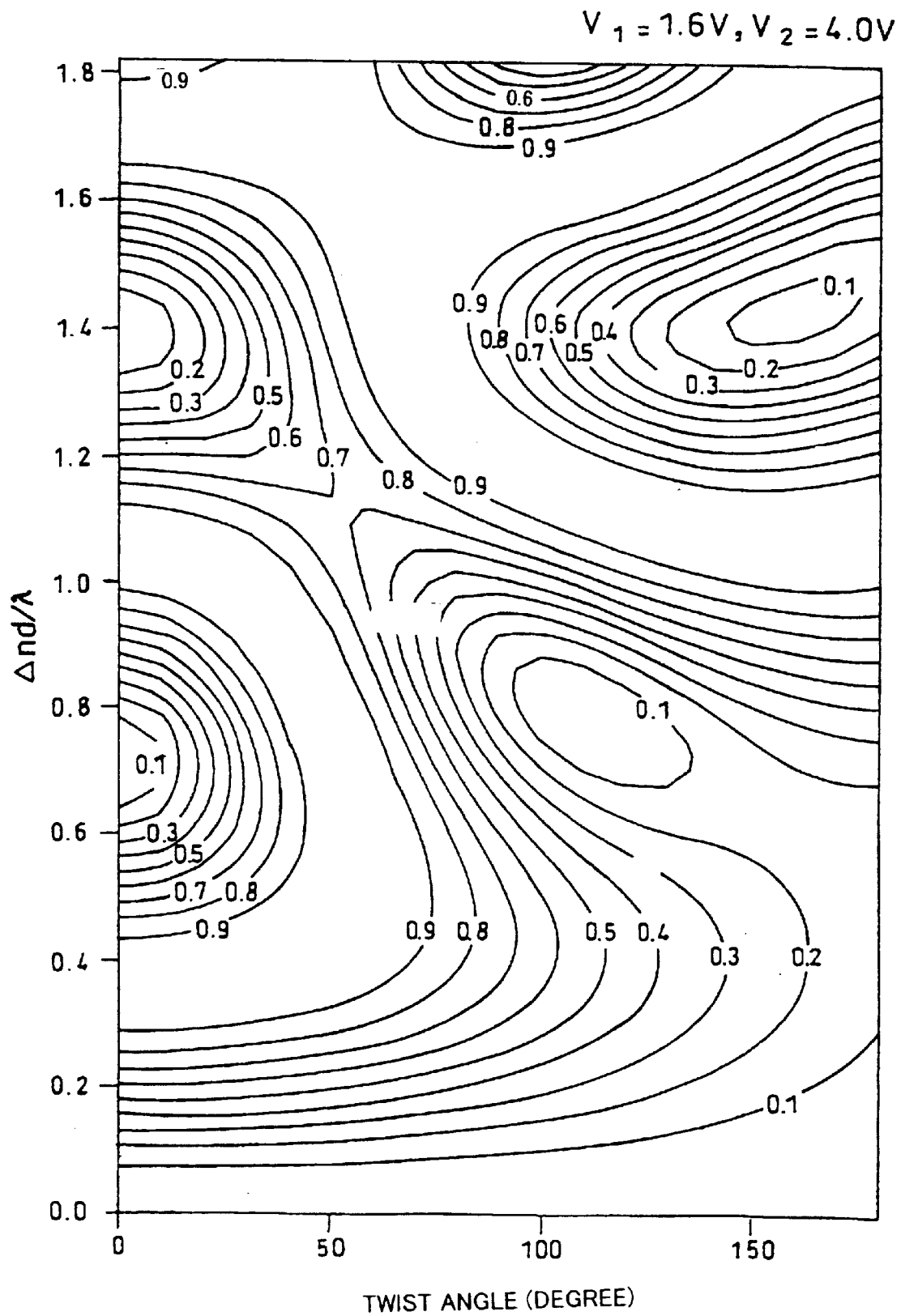
FIG. 22 is an explanatory view illustrating characteristics determined according to the evaluation function QOM introduced by the present invention with respect to a twist angle and a value of a parameter, with a combination of a voltage $V_1$ and a voltage $V_2$ when they satisfy $V_1-1.6$ and $V_2-4.0V$, respectively, in the case where a liquid crystal layer exhibits horizontal alignment with twist.
Figure 23:
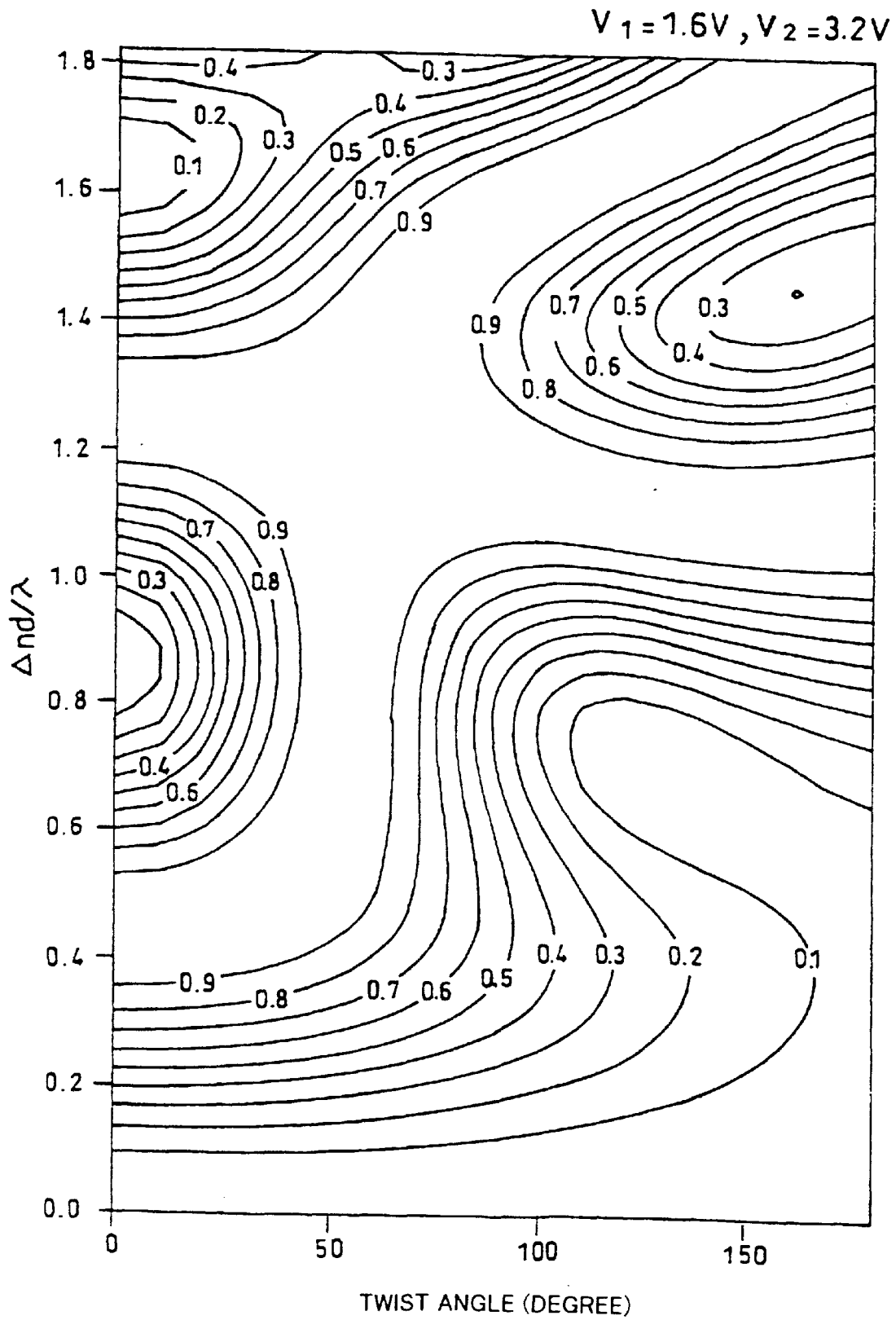
FIG. 23 is an explanatory view illustrating characteristics determined according to the evaluation function QOM introduced by the present invention with respect to a twist angle and a value of a parameter, with a combination of a voltage $V_1$ and a voltage $V_2$ when they satisfy $V_1-1.6$ and $V_2-3.2V$, respectively, in the case where a liquid crystal layer exhibits horizontal alignment with twist.
Figure 24:
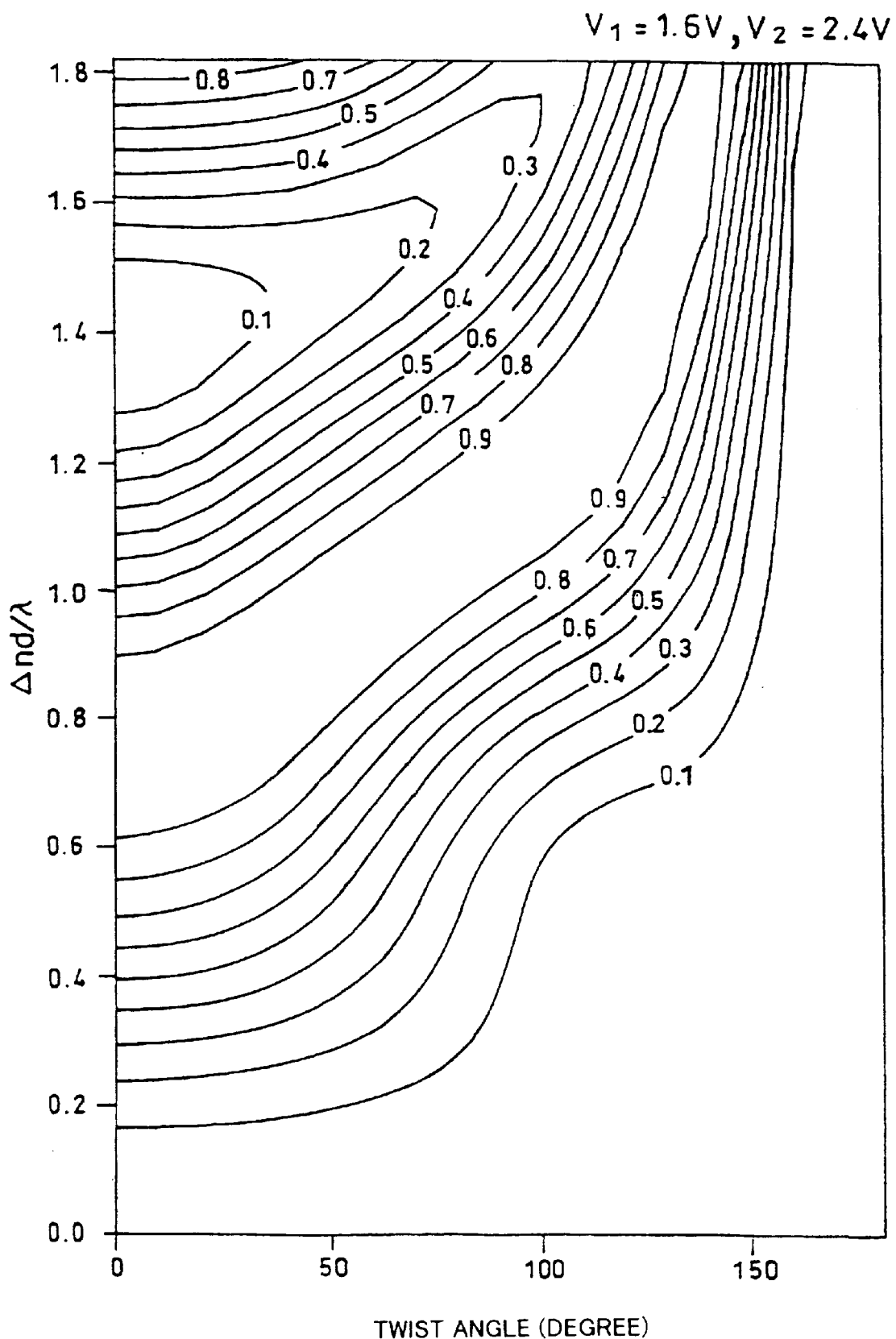
FIG. 24 is an explanatory view illustrating characteristics determined according to the evaluation function QOM introduced by the present invention with respect to a twist angle and a value of a parameter, with a combination of a voltage $V_1$ and a voltage $V_2$ when they satisfy $V_1-1.6$ and $V_2-2.4V$, respectively, in the case where a liquid crystal layer exhibits horizontal alignment with twist.

According to FIG. 20 in which $V_1$ and $V_2$ are 0V and 10V, respectively, the result shown therein, as long as it regards to the case where the liquid crystal layer, at $V_2$, does not exhibit polarization transform characteristic at all, conforms to the result shown in FIG. 13 that is a result of analysis in this case of light of 550 nm. In the case where $V_2$ is 10V, however, the polarization transform characteristics remain since the liquid crystal layer is not completely vertically aligned. Thus, there is a slight difference between the foregoing two cases. Incidentally, since light of 550 nm is used in the case shown in FIG. 13, the vertical axis thereof can be made to coincide with the foregoing one, by dividing a value on the ordinate by 550 (nm). Further, a range of the drawing of FIG. 20 along the horizontal axis is ½ of that of FIG. 13.

As described above, it is also possible to calculate a QOM with regard to the twist alignment in the case of a finite voltage. Furthermore, an actual LCD device driving method is considered in FIGS. 21 through 24. Normally, applicable voltages are those in the vicinity of a threshold, minimum voltage for occurrence of a change of alignment of a liquid crystal layer, as well as those higher than that and not higher than about three times the threshold voltage. By using a combination of voltages in the foregoing range, a QOM in the case where $V_1$ was 1.6V that is a threshold voltage was determined.

Applying a determination criterion C1 to each of the cases of the figures, combinations of a twist angle and $\Delta nd/\lambda$ that provide a satisfactory display were determined as shown in Table 1 below. Incidentally, the result of determination according to the criterion C1 in the case of FIG. 13, the result of determination according to the criterion C2 in the case of FIG. 17, and results of calculations not shown in figures are also shown in the table, for comparison.

TABLE 1

| FIG. NO. | $V_1$ | $V_2$ (UNIT: V) | CRITERION | TWIST ANGLE | $\Delta and/\lambda$ |
|---|---|---|---|---|---|
| 13 | 0 | INFINITE | C1 | 70° | 240 nm/550 nm = 0.44 |
| 17 | | | C2 | 70° | 210 nm/550 nm = 0.38 |
| 20 | 0 | 10 | C1 | 70° | 0.47 |
| — | 1.6 | 8 | | 70° | 0.48 |
| — | | 6.4 | | 65° | 0.50 |
| 21 | | 4.8 | | 60° | 0.55 |
| 22 | | 4.0 | | 55° | 0.57 |
| 23 | | 3.2 | | 50° | 0.80 |
| 24 | | 2.4 | | — | — |

Figure 25:
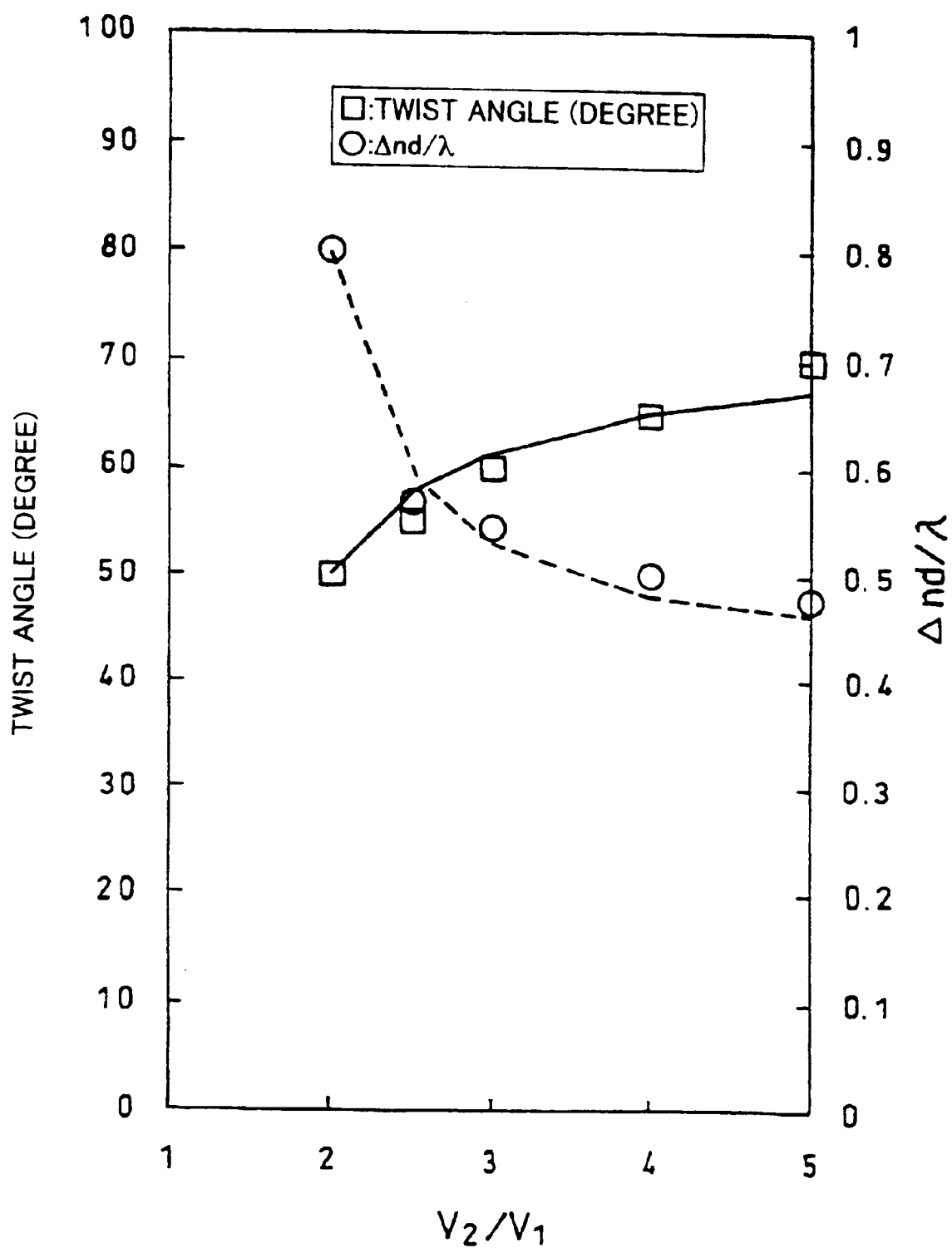
FIG. 25 is an explanatory view illustrating relationship between driving conditions and optimal design parameters at the moment determined according to the evaluation function QOM and an evaluation criterion C1 introduced by the present invention, in the case where a liquid crystal layer exhibits horizontal alignment with twist.

Combinations with which $V_2/V_1$ becomes finite are selected, and the twist angles and $\Delta nd/\lambda$ with which satisfactory bright display is obtained with respect to $V_2/V_1$ are plotted as shown in FIG. 25. Sample points in FIG. 25 are values shown in Table 1, and indicate how the twist angle and the $\Delta nd/\lambda$ as main conditions in designing the liquid crystal layer should be appropriately set with respect to two voltages $V_1$ and $V_2$ actually used. A reflection-type LCD device produced so as to satisfy the foregoing conditions is capable of satisfactory contrast display. A solid line in FIG. 25 is determined by approximation with respect to the twist angle, by an expression (25) below:

$$-\frac{23}{\left(\frac{V_2}{V_1}-1\right)}+73 \tag{25}$$

Furthermore, a broken line in FIG. 25 is determined by approximation with respect to the $\Delta nd/\lambda$, by an expression (26) below:

$$\frac{0.36}{\left(\frac{V_2}{V_1}-1\right)^2}+0.44 \tag{26}$$

From these expressions, appropriate twist angle and $\Delta nd/\lambda$ can be determined when a combination of voltages $(V_1, V_2)$ that satisfy $V_2 > V_1$ is applied. The expression (26) is a result for $\Delta nd$ according to the criterion C1, but as shown in Table 1, about 86% of the same is appropriate according to the criterion C2, which is the more detailed criterion.

Therefore, as shown in an expression (27) below, the upper limit is determined according to the expression (26) while the lower limit is determined according to multiplication of the expression (26) by 0.86:

$$\frac{0.31}{\left(\frac{V_2}{V_1}-1\right)^2}+0.38 \leq \frac{\Delta nd}{\lambda} \leq \frac{0.36}{\left(\frac{V_2}{V_1}-1\right)^2}+0.44 \quad (27)$$

Incidentally, the result of the present evaluation method is described by way of example only by taking a case where physical constants of a specific liquid crystalline material (ZLI-4792), and it is obvious that approximation can be achieved by expressions different from the above in the case where a liquid crystalline material with different physical constants or in the case where a liquid crystalline material actually used has different material property values, and needless to say, these all can be designed by the designing method in accordance with the present invention.

As clear from the above descriptions, the evaluation method of the present invention allows reflection-type liquid crystal modulation element utilizing a single polarizing plate to be generally dealt with. In other words, apart from the foregoing elements in which elevation angles of the alignment orientation with respect to the substrates are changed with voltages, the present invention may be applied to: elements arranged so that azimuth angles of the alignment orientation of the liquid crystal layer are changed in the substrate plains; element in which the alignment is discontinuously changed by control factors; or elements that exhibit hysteresis of a plurality types of alignment according to, not only instantaneous values of the control factors, but also values of the control factors in the past.

[Phase Difference Plate Setting Method]

Furthermore, characteristics and an orientation of the phase difference plate may be selected after the design of the liquid crystal layer is determined. More specifically, the liquid crystal layer is designed so that satisfactory contrast display characteristics can be achieved, and in so doing, since the points C and B are positioned as shown in FIG. 11, the point A indicative of the polarization state of light after transmission through the phase difference plate is found on the surface of Poincaré sphere. For this purpose, the point A may be obtained based on the point C (circularly polarized light) in FIG. 11, utilizing the liquid crystal alignment at the moment. Then, the phase difference plate may be arranged so as to have an effect to prepare the polarization state indicated by the point A from the linearly polarized light indicated by the equator of the Poincaré sphere.

More specifically, in the case where the voltage $V_1$ that provides transform from the point A to the point C is arranged so as to be used as the voltage that provides dark display, the dark display at the voltage $V_1$ can be achieved automatically only by transforming a certain linearly polarized light to the point A. Transform of linearly polarized light to a certain position on the surface of Poincaré sphere can be easily realized by adding and using a phase difference plate between the polarizing plate and the liquid crystal layer, as described in the "Polarized light: production and use". This is realized, by utilizing the principle that a point indicative of a linearly polarized light on the equator on the surface of Poincaré sphere can be transformed to an arbitrary point on the spherical surface by rotational transform, by the foregoing added phase difference plate. Needless to say, the number of such an added phase difference plate provided is not limited to one, but any arbitrary number of the same, including 0, can be used. When the point A is on the equator, the phase difference plate is 0 in number, and in the other cases, not less than one phase difference plate is used. Furthermore, the orientation of the linearly polarized light is determined depending on the orientation of the polarizing plate, and since it is represented by a point on the equator at a different longitude, it is set along with the characteristics of the additional phase difference plate. In other words, if the additional phase difference plate is arranged so as to realize the polarization state of the point A, a point on the equator such that the polarization state of the point A is realized is necessarily determined. Consequently, the orientation of the polarizing plate is determined. Based on the foregoing principle, it is possible to realize the polarization state of the point A, and generally it can be realized with a combination that varies infinitely. It is possible to arrange a phase difference plate and a polarizing plate so as to realize satisfactory dark display with a plurality of wavelengths, by taking advantage of the foregoing degree of freedom in designing.

Upon provision of the foregoing additional phase difference plate, in the case where the setting of the liquid crystal layer is determined by the method in accordance with the present invention, satisfactory dark display can be surely realized with the voltage $V_1$ while satisfactory bright display can be surely realized with the voltage $V_2$ even in the case where the setting of the phase difference plate and that of the polarizing plate are changed. In other words, even with changes in the conditions of the additional phase difference plate, there is no need to change the design of the liquid crystal layer, and the steps in designing for optimization of the entirety of the reflection-type LCD device can be reduced.

Furthermore, in the case where the voltage $V_1$ is to be used as a voltage for bright display, the other voltage $V_2$ may be set as the voltage for dark display, and this method is identical to that applied to the foregoing $V_1$ only except that $V_1$ and $V_2$ are replaced with each other.

More specifically, prediction of modulation capability of a reflection-type liquid crystal modulation element employing a single polarizing plate is enabled without assuming characteristics of the polarizing plate or a phase difference plate beforehand. Consequently, it is possible to design a reflection-type liquid crystal modulation element with the greatest modulation capability, thereby making it possible to realize a liquid crystal modulation element that provides satisfactory contrast display.

Incidentally, a method for evaluating an optical modulation element in accordance with the present invention may be arranged as follows. Namely, design evaluating means for evaluating a reflection-type liquid crystal modulating element that includes at least one linearly polarized light selective transmission element and that takes advantage of external field response of the liquid crystalline material is used, wherein design evaluating means includes quantitative designing means that uses an evaluation function QOM having a maximum value of 1 and a minimum value of 0 according to the expression (16) with respect to at least two values $V_1$ and $V_2$ of a control factor V used in. modulation, so as to judge adequacy of optical design of the liquid crystal modulation element at a specific wavelength, with the value of the QOM. By so doing, it is possible to evaluate contrast, display capability of the reflection-type liquid crystal modulation element.

Alternatively, it may be arranged as follows. Namely, the function of the foregoing evaluating means may be extended so as to evaluate the contrast display capability not only at a single wavelength but also at a different wavelength. In other words, design evaluating means for evaluating a liquid crystal display element that includes at least one linearly polarized light selective transmission element and that takes advantage of external field response of the liquid crystalline material is used, wherein the design evaluating means can include quantitative designing means that uses an evaluation function FOM having a maximum value of 1 and a minimum value of 0 according to the expression (19) with respect to at least two values $V_1$ and $V_2$ of a control factor V used in display, so as to judge adequacy of optical design of the liquid crystal modulation element in a visible wavelength range of a liquid crystal modulation element, with the value of the FOM. By so doing, contrast display capability is predictable over a visible wavelength range with luminosity taken into consideration.

Alternatively, it may be arranged as follows. Namely, not only evaluation of contrast display capability is arranged so that luminosity is taken into consideration, but further, the method can be extended so that white balance should be evaluated. More specifically, the design evaluating means for evaluating the liquid crystal modulation element may be arranged so as to include quantitative designing means that derives tristimulus values X, Y, and Z defined by the CIE from evaluation functions FOM_X, FOM_Y, and FOM_Z expressed as the expressions (21) through (23), respectively, in which the evaluation function FOM_Y that is defined by the expression (22) and that has a maximum value of 1 is set so as to be not less than a predetermined value, and derives a value of a chromaticity coordinate calculable from the tristimulus values X, Y, and Z, so that the adequacy of white balance of the liquid crystal modulation element should be evaluated with the value of the chromaticity coordinate. This arrangement is effective in designing a satisfactory reflection-type liquid crystal modulation element. Here, a light source spectrum may be a spectrum of a light source used for illumination, or in the case where definite determination is impossible, it may be a spectrum of a standard light source $D_{65}$.

Furthermore, with application of any one of these design evaluating methods, it is possible to concretely design a liquid crystal modulation element. More specifically, a reflection-type liquid crystal modulating element that includes at least one linearly polarized light selective transmission element and that takes advantage of external field response of the liquid crystalline material may be arranged so that an evaluation function QOM according to the expression (16) should have a value of not less than 0.9, in the set alignment of the liquid crystal used, at at least one wavelength in a wavelength range of light used, with at least one combination of used control factors. By so doing a satisfactory liquid crystal modulation element at a specific wavelength can be realized.

Furthermore, as a reflection-type liquid crystal modulating element with luminosity at a visible light wavelength taken into consideration, a reflection-type liquid crystal modulating element that includes at least one linearly polarized light selective transmission element and that takes advantage of external field response of the liquid crystalline material may be arranged so that an evaluation function FOM according to the expression (19) should have a value of not less than 0.9, in the set alignment of the liquid crystal used, with at least one combination of used control factors. By so doing modulation with satisfactory contrast can be realized.

Furthermore, a reflection-type liquid crystal modulating element that includes at least one linearly polarized light selective transmission element and that takes advantage of external field response of the liquid crystalline material may be arranged so as to control a liquid crystal layer and control factors so that an evaluation function QOM defined by the expression (16) should have a value of not less than 0.9, with at least one combination of used control factors, at at least a part of a wavelength range of light used. By so doing, optimization is enabled in a simpler manner than in the case where the FOM is determined.

Furthermore, a reflection-type liquid crystal modulating element that includes at least one linearly polarized light selective transmission element and that takes advantage of external field response of the liquid crystalline material may be arranged so as to control a liquid crystal layer and control factors so that FOM should have a value of not less than 0.9, with at least one combination of used control factors, over a wavelength range of light used. By so doing, a liquid crystal modulation element having satisfactory modulation capability and an LCD device including the same can be realized.

Furthermore, by considering white balance, the foregoing liquid crystal modulation element can be arranged so as to control the liquid crystal layer and the control factors so that a chromaticity calculated according to the expressions (21) through (23) falls in a predetermined range. By so doing, a reflection-type liquid crystal modulation element capable of satisfactory contrast display can be obtained. In other words, a reflection-type liquid crystal modulation element that provides satisfactory black-and-white display can be obtained.

Furthermore, to thus evaluate contrast modulation capability of a liquid crystal modulation element at a design stage, the foregoing expression (16) can be easily calculated by transform from a Jones matrix format normally used. As means for evaluation of the same, it is possible to include means for calculating polarized light transmission characteristics of the liquid crystal element at a plurality of external field intensities, and to include, in the case where the polarized light transmission characteristics are expressed in a Jones matrix form, means for transforming the same into a Mueller matrix according to the expression (9), and it is effective to include means for calculating an evaluation function given as the expression (16) using elements of the foregoing Mueller matrix.

Furthermore, an example of reflection-type liquid crystal modulation elements obtained by concrete execution is the foregoing reflection-type liquid crystal modulation element, wherein (i) the $V_1$ is a voltage not greater than a threshold voltage that causes the liquid crystal layer to start acting, while the $V_2$ is not smaller than 5 times the threshold voltage, (ii) a twist angle is not less than 70 degrees and not more than 73 degrees, and (iii) $\Delta nd/\lambda$ is not less than 0.38 and not more than 0.48, where d represents a liquid crystal layer thickness and $\Delta n$ represents a difference between indexes of refraction of the liquid crystalline material at at least one wavelength $\lambda$ among wavelengths used, $\Delta nd/\lambda$ being obtained by dividing a product of the difference $\Delta n$ and the thickness d by the wavelength $\lambda$.

Furthermore, a reflection-type liquid crystal modulation element that is optimal with respect to different voltages may be arranged so that (i) the $V_1$ is about a threshold voltage that causes the liquid crystal layer to start acting, while the $V_2$ exceeds 1.5 times the threshold voltage and not greater than 5 times the threshold voltage, (ii) a twist angle is determined according to the expression (25) with use of $V_1$ and $V_2$, and (iii) $\Delta nd/\lambda$, obtained by dividing a product $\Delta nd$ of a liquid crystal layer thickness d and a difference $\Delta n$ between indexes of refraction of the liquid crystalline material at a wavelength in a range of wavelengths used, by at least one wavelength $\lambda$, is set so as to satisfy the expression (27).

A system as an evaluating device for carrying out the evaluating method in accordance with the present invention has, for instance, an arrangement in which, though not shown, a personal computer, a key board and a mouse as input devices, and a display and a printer as output devices, etc. are connected with each other. In the personal computer, a CPU (matrix computing means and evaluating means) (not shown), a memory, and a storage device are incorporated, though not shown. The foregoing system is realized by a program for causing the evaluation processing to function. The program is stored in a computer-readable recording medium. The storage medium may be a medium that is readable when inserted into a program reading device provided as an external storing device, and that is arranged so as to be separated from the main body, for example: a tape type medium such as a magnetic tape or a cassette tape; a disk type medium such as CD-ROM, MO, MD, or DVD; and a card type medium such as an IC card (memory card) or an optical card. Or the storage medium may be a medium that fixedly carries a program, for example, a semiconductor memory type medium such as a mask ROM, an EPROM, an EEPROM, or a flush ROM. Furthermore, it may be a medium that dynamically carries a program by downloading a program from a communication network including Internet. In the case where thus a program is downloaded from a communication network, a program for downloading may be stored in the device main body beforehand, or may be installed from another storage medium.

Furthermore, in addition to the foregoing arrangement, the method for evaluating optical modulation characteristics of a liquid crystal modulation element in accordance with the present invention can be further arranged so as to further including the step of evaluating whether a value of the QOM is not less than a predetermined value, in at least a part of a wavelength range of light used, with the control factors $V_1$ and $V_2$.

According to the foregoing arrangement, the liquid crystal modulation element evaluates whether or not the value of the QOM is a predetermined value or above in at least a part of a wavelength range of light used, with the foregoing control factors $V_1$ and $V_2$.

Therefore, the value of the QOM becomes not less than a predetermined value, not at a single wavelength but in a certain wavelength range.

Therefore, in addition to the effect achieved by the foregoing arrangement, the following effect can be also achieved: namely, conditions to provide satisfactory color characteristics with respect to a certain visible light wavelength range can be easily found, whereby an operation for adjusting design parameters for optimization can be easily carried out.

By controlling the liquid crystal layer and the control factors so as to achieve the foregoing predetermined value, the identical optimization is enabled more easily than in the case where an FOM is determined as described below.

For instance, in the case where the optical modulation element includes at least one linearly polarized light selective transmission element and takes advantage of external field response of the liquid crystalline material, the method is further arranged by further including the step of controlling the liquid crystal layer and the control factor, with at least one combination of used control factors, namely, the foregoing control factors $V_1$ and $V_2$, and at least a part of a wavelength range of light used, so as to cause the QOM to have a value not less than a predetermined value, for instance, 0.9. By so doing, the identical optimization is enabled more easily than in the case where an FOM is determined.

Furthermore, the method for evaluating optical modulation characteristics of a liquid crystal modulation element, arranged as above, may be further arranged so that:

FOM is used as an index for a brightness modulation quantity concerning the optically anisotropic object, the FOM being derived as:

$$K = 1/\int_{380}^{780} Y(\lambda)S(\lambda)d\lambda$$

where:

K is a constant that causes a maximum of the FOM to become 1, the K being expressed as:

$$FOM = K\int_{380}^{780} QOM(\lambda)y(\lambda)S(\lambda)d\lambda$$

where:

$\lambda$ represents a wavelength of light to be modulated;

$y(\lambda)$ represents a curve of a spectral luminous efficiency for the CIE standard photometric observer; and $S(\lambda)$ represents a spectrum of a light source used in the evaluation.

According to the foregoing arrangement, the foregoing FOM is determined, and is used as an index for the intensity change rate, in evaluation of optical modulation characteristics of a liquid crystal modulation element. For instance, $S(\lambda)$ may be selected according to a light source at a site where the LCD device is used. Further, when compared with another, $S(\lambda)$ of the liquid crystal modulation element may be made to conform with that of the comparison target.

Therefore, since the FOM is expressed only by an optical characteristic inside the foregoing optically anisotropic object including the liquid crystal layer, a state of light before incidence to the optically anisotropic object may be affected by any additional polarizing effect due to a phase difference plate or the like. Moreover, since not only light of a single wavelength but also luminosity sensed by a human are taken into consideration, it is applicable to a certain range of visible light wavelengths.

Accordingly, it is possible to express a brightness modulation quantity as an optical modulation characteristic of a liquid crystal modulation element, or in other words, to express an index indicating how good the optical modulation characteristics are, by a method with generality that is not affected by the number of design parameters of optical elements to be determined at a final stage. By so doing, it is possible to easily find an optical characteristic value, and also to easily find conditions of design parameters necessary for optimizing the optical modulation characteristics and executing satisfactory optical modulation.

By using the foregoing index, conditions necessary for executing satisfactory optical modulation can be expressed and evaluated by a method with generality irrespective of the number of optical elements and the types of the same. Therefore, even if optical elements are many, optimal set values of design parameters of an optically anisotropic object including a liquid crystal layer can be easily found based on the result of the foregoing evaluation, and an operation for adjusting design parameters for optimization can be easily executed.

Furthermore, it is possible to easily find conditions for providing satisfactory color characteristics with respect to a range of visible light wavelength range, and to easily execute an operation for adjusting design parameters for optimization.

For instance, in the case where the optical modulation element includes at least one linearly polarized light selective transmission element and takes advantage of external field response of the liquid crystalline material, the method is further arranged by further including the step of controlling the liquid crystal layer and the control factor, in the set alignment of the liquid crystal used, with at least one combination of used control factors, namely, the foregoing control factors $V_1$ and $V_2$, so as to cause the FOM to have a value not less than a predetermined value, for instance, 0.9.

Alternatively, in the case where the optical modulation element includes at least one linearly polarized light selective transmission element and takes advantage of external field response of the liquid crystalline material, the method is further arranged by further including the step of controlling the liquid crystal layer and the control factor, with at least one combination of used control factors, namely, the foregoing control factors $V_1$ and $V_2$, and at at least one wavelength in a wavelength range of light used, so as to cause the FOM to have a value not less than a predetermined value, for instance, 0.9.

The foregoing method for evaluating optical modulation characteristics of a liquid crystal modulation element in accordance with the present invention, arranged as above, may be further arranged as follows. Namely, in the case where the spectrum $S(\lambda)$ of a light source is a spectrum of an illumination light source used for illumination of a liquid crystal display device or a spectrum $S_{D65}(\lambda)$ of a standard light source $D_{65}$, and the constant K is defined as below, the method may be further arranged so as to further include the steps of:

evaluating whether or not an evaluation function FOM_Y defined as below has a value not less than a predetermined value; and evaluating adequacy of white balance of the liquid crystal modulation element by:

deriving tristimulus values X, Y, and Z defined by the CIE from FOM_X and FOM_Z expressed as below as well as the FOM_Y; and deriving a chromaticity coordinate from the tristimulus values X, Y, and Z, so that the adequacy of white balance of the liquid crystal element should be evaluated with the chromaticity coordinate.

$K=1/\int_{380}^{780} Y(\lambda)S(\lambda)d\lambda$ $FOM\_Y=K\int_{380}^{780} QOM(\lambda)y(\lambda)S(\lambda)d\lambda$ $FOM\_X=K\int_{380}^{780} QOM(\lambda)x(\lambda)S(\lambda)d\lambda$ $FOM\_Z=K\int_{380}^{780} QOM(\lambda)z(\lambda)S(\lambda)d\lambda$ By the foregoing arrangement, with the spectrum of an illumination light source used for illumination of a liquid crystal display device or a spectrum $S_{D65}(\lambda)$ of a standard light source $D_{65}$, whether the foregoing evaluation function FOM_Y has a value not less than a predetermined value is evaluated, while the tristimulus values X, Y, and Z defined by the CIE are derived from the FOM_X, FOM_Y, and FOM_Z, so as to determine a value of a chromaticity coordinate with which adequacy of white balance of the liquid crystal modulation element.

Therefore, by using the foregoing FOM, it is possible to provide a method for easily evaluating a brightness modulation quantity under a light source used or a standard light source, with the luminosity sensed by a human as well as color information taken into consideration, which method is applicable to light in a wide range of visible light wavelengths.

This enables to easily find conditions that provide satisfactory color characteristics and to easily execute an operation for adjusting design parameters for optimization, under a light source used or a standard light source.

For instance, it is possible to arrange a reflection-type liquid crystal modulation element so that the QOM may be caused to have a value not less than a predetermined value, for instance, 0.9, in the set alignment of liquid crystal used, at at least one wavelength in a wavelength range of light used, with the foregoing control factors $V_1$ and $V_2$. By so doing, a liquid crystal modulation element satisfactory with respect to a single wavelength can be realized.

Furthermore, it is possible to arrange a reflection-type liquid crystal modulation element so that the FOM may be caused to have a value not less than a predetermined value, for instance, 0.9, in the set alignment of liquid crystal used, with the control factors $V_1$ and $V_2$. By so doing, modulation with satisfactory contrast is realized with the luminosity at a visible light wavelength taken into consideration.

Furthermore, it is possible to arrange a reflection-type liquid crystal modulation element so that the FOM may be caused to have a value not less than a predetermined value, for instance, 0.9, with the control factors $V_1$ and $V_2$, with respect to a range of wavelengths of light used. By so doing, a liquid crystal modulation element with satisfactory modulation capability and an LCD device including the same can be realized.

Furthermore, the foregoing liquid crystal modulation element may be further arranged so that the liquid crystal layer and the control factors should be controlled so that the chromaticity calculated according to the foregoing expressions fall in a predetermined range, whereby a reflection-type liquid crystal modulation element that can provide satisfactory contrast display, with white balance taken into consideration, can be obtained. In other words, a reflection-type liquid crystal modulation element that provides satisfactory black-and-white display can be obtained. Incidentally, needless to say, in evaluation, it is appropriate to use, as a light source spectrum, a luminance spectrum of a backlight device used in the case of a transmission-type liquid crystal display device, while in the case of a transmission-type liquid crystal display device, if a definite light source is used, it is appropriate to use the spectrum of the light source, and if used in an environment with various light from surroundings, it is appropriate to use a spectrum of the standard light source $D_{65}$.

To derive a Mueller matrix from a Jones matrix, the following expression can be employed. Here, "*" indicates a conjugate complex number.

$$M = \begin{pmatrix} \frac{1}{2}(|j_{pp}|^2+|j_{sp}|^2+|j_{ps}|^2+|j_{ss}|^2) & \frac{1}{2}(|j_{pp}|^2+|j_{sp}|^2-|j_{ps}|^2-|j_{ss}|^2) & \text{Re}(j_{pp}^*j_{ps}+j_{sp}^*j_{ss}) & -\text{Im}(j_{pp}^*j_{ps}+j_{sp}^*j_{ss}) \\ \frac{1}{2}(|j_{pp}|^2-|j_{sp}|^2+|j_{ps}|^2-|j_{ss}|^2) & \frac{1}{2}(|j_{pp}|^2-|j_{sp}|^2-|j_{ps}|^2+|j_{ss}|^2) & \text{Re}(j_{pp}^*j_{ps}-j_{sp}^*j_{ss}) & -\text{Im}(j_{pp}^*j_{ps}-j_{sp}^*j_{ss}) \\ \text{Re}(j_{pp}^*j_{sp}+j_{ps}^*j_{ss}) & \text{Re}(j_{pp}^*j_{sp}-j_{ps}^*j_{ss}) & \text{Re}(j_{pp}^*j_{ss}+j_{ps}^*j_{sp}) & -\text{Im}(j_{pp}^*j_{ss}+j_{ps}^*j_{sp}) \\ \text{Im}(j_{pp}^*j_{sp}+j_{ps}^*j_{ss}) & \text{Im}(j_{pp}^*j_{sp}-j_{ps}^*j_{ss}) & \text{Im}(j_{pp}^*j_{ss}+j_{ps}^*j_{sp}) & \text{Re}(j_{pp}^*j_{ss}-j_{ps}^*j_{sp}) \end{pmatrix}$$

-continued where, $\begin{pmatrix} \tilde{E}_p \\ \tilde{E}_s \end{pmatrix}_{out} = \begin{pmatrix} j_{pp} & j_{ps} \\ j_{sp} & j_{ss} \end{pmatrix} \begin{pmatrix} \tilde{E}_p \\ \tilde{E}_s \end{pmatrix}_{in}$.

Incidentally, the reflection-type liquid crystal modulation element may be arranged so that (i) the $V_1$ is a voltage not greater than a threshold voltage that causes the liquid crystal layer to start acting, while the $V_2$ is not smaller than 5 times the threshold voltage, (ii) a twist angle is not less than 70 degrees and not more than 73 degrees, and (iii) $\Delta nd/\lambda$ is not less than 0.38 and not more than 0.48, where d represents a liquid crystal layer thickness and $\Delta n$ represents a difference between indexes of refraction of the liquid crystalline material at at least one wavelength $\lambda$ among wavelengths used, $\Delta nd/\lambda$ being obtained by dividing a product of the difference $\Delta n$ and the thickness d by the wavelength $\lambda$.

Alternatively, the reflection-type liquid crystal modulation element may be arranged so that the $V_1$ is about a threshold voltage that causes the liquid crystal layer to start acting, while the $V_2$ exceeds 1.5 times the threshold voltage and not greater than 5 times the threshold voltage;

a twist angle is given as:

$$-\frac{23}{\left(\frac{V_2}{V_1}-1\right)}+73$$

$\Delta nd/\lambda$, obtained by dividing a product $\Delta nd$ of a liquid crystal layer thickness d and a difference $\Delta n$ between indexes of refraction of the liquid crystalline material at a wavelength in a range of wavelengths used, by at least one wavelength $\lambda$, satisfies:

$$\frac{0.31}{\left(\frac{V_2}{V_1}-1\right)^2}+0.38 \leq \frac{\Delta nd}{\lambda} \leq \frac{0.36}{\left(\frac{V_2}{V_1}-1\right)^2}+0.44$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for evaluating optical modulation characteristics of a liquid crystal modulation element that includes one or a plurality of optical modulation elements for modulating a polarization state of light, one of said optical modulation elements being an optically anisotropic object having a liquid crystal layer, said method comprising the steps of:

given:
that optical modulation effects of said optical modulation element are expressed by Mueller matrices, respectively;
that said Mueller matrices are multiplied from left in a light transmission order so as to obtain a Mueller matrix given as $M_{LCD}$;
that, one of V1 and V2 of a control factor V of said optical modulation element is for dark state of display, and the other one is for bright state of display; and
that Mueller matrices regarding light since immediately before incidence to the optically anisotropic object until immediately after outgoing therefrom when $V=V_1$ and when $V=V_2$ are given as $M(V_1)$ and $M(V_2)$, respectively, a) deriving a Mueller matrix $M\alpha$ expressed as:

$M\alpha = M(V_2)M(V_1)^{-1}$ and, (b) evaluating optical modulation characteristics of said liquid crystal modulation element by:
expressing a QOM that is a predetermined quantity of said optically anisotropic object with elements of said $M\alpha$;
arranging said QOM so as to be proportional to a difference between a value in the bright display and a value in the dark display of an (0,0)element of said $M_{LCD}$, the (0,0) element indicating a brightness of said liquid crystal modulation element; and
using the QOM as an index for a brightness modulation quantity equivalent to a difference between brightness of the bright display and that of the dark display.

2. The method as set forth in claim 1, wherein:
said optical modulation element is a single-polarizing-plate reflection-type liquid crystal modulation element; and
said QOM satisfies:

$QOM \equiv 1-\{(M_{1c}(V_2)(M_{1c}(V_1))^{-1})_{33}\}^2$ where:
$M_{1c}(V_1)$ and $M_{1c}(V_2)$ are Mueller matrices expressing effects upon light of a specific wavelength that passes through a liquid crystal layer in a normal direction with respect to said layer, liquid crystal alignment of said layer being controlled by a control factor V; and
a subscript of "33" is indicative of an (3,3)element as a matrix element of said Mueller matrix that determines transform relationship of a circularly polarized component of said Mueller matrix.

3. The method as set forth in claim 1, further comprising the step of:
evaluating whether a value of said QOM is not less than a predetermined value, in at least a part of a wavelength range of light used, with said control factors $V_1$ and $V_2$.

4. The method as set forth in claim 3, further comprising the step of:
controlling said liquid crystal layer and said control factor so as to cause said QOM to have a value be not less than 0.9.

5. The method as set forth in claim 1, wherein:
in said step (b), FOM is used as an index for a brightness modulation quantity equivalent to a difference between brightness of the bright display and that of the dark display concerning said optically anisotropic object, said FOM being derived as:

$K=1/\int_{380}^{730} y(\lambda)S(\lambda)d\lambda$ where:

K is a constant that causes a maximum of said FOM to become 1, said K being expressed as:

$$FOM = K \int_{380}^{780} QOM(\lambda) y(\lambda) S(\lambda) d\lambda$$

where:

$\lambda$ represents a wavelength of light to be modulated;

$y(\lambda)$ represents a curve of a spectral luminous efficiency for the CIE standard photometric observer; and $S(\lambda)$ represents a spectrum of a light source used in the evaluation.

6. The method as set forth in claim 5, wherein:

said optical modulation element includes at least one linearly polarized light selective transmission element and takes advantage of external field response of said liquid crystalline material, said method further comprising the step of:

controlling said liquid crystal layer and said control factor so as to cause said FOM to have a value not less than a predetermined value with respect to a wavelength range of light used, with said control factors $V_1$ and $V_2$.

7. The method as set forth in claim 6, wherein:

in said step of controlling said liquid crystal layer and said control factor, said liquid crystal layer and said control factor are controlled so as to cause said FOM to have a value of not less than 0.9.

8. The method as set forth in claim 5, wherein:

said spectrum $S(\lambda)$ of a light source is a spectrum of an illumination light source used for illumination of a liquid crystal display device or a spectrum $S_{D65}(\lambda)$ of a standard light source $D_{65}$; and said constant K is defined as:

$$K = 1 / \int_{380}^{780} y(\lambda) S(\lambda) d\lambda$$

said method further comprising the steps of:

evaluating whether or not an evaluation function FOM_Y defined as below has a value not less than a predetermined value; and evaluating adequacy of white balance of said liquid crystal modulation element by:

deriving tristimulus values X, Y, and Z defined by the CIE from FOM_X and FOM_Z expressed as below as well as said FOM_Y;

$$FOM\_X = K \int_{380}^{780} QOM(\lambda) x(\lambda) S(\lambda) d\lambda$$

$$FOM\_Y = K \int_{380}^{780} QOM(\lambda) y(\lambda) S(\lambda) d\lambda$$

$$FOM\_Z = K \int_{380}^{780} QOM(\lambda) z(\lambda) S(\lambda) d\lambda$$

and, deriving a chromaticity coordinate from said tristimulus values X, Y, and Z, so that the adequacy of white balance of said liquid crystal modulation element should be evaluated with the chromaticity coordinate.

9. The method as set forth in claim 1, wherein:

said $V_1$ is a voltage not greater than a threshold voltage that causes said liquid crystal layer to start acting, while said $V_2$ is not smaller than 5 times the threshold voltage;

a twist angle is not less than 70 degrees and not more than 73 degrees; and $\Delta n \lambda$ is not less than 0.38 and not more than 0.48, where d represents a liquid crystal layer thickness and $\Delta n$ represents a difference between indexes of refraction of the liquid crystalline material at at least one wavelength $\lambda$ among wavelengths used, $\Delta nd/\lambda$ being obtained by dividing a product of the difference $\Delta n$ and the thickness d by the wavelength $\lambda$.

10. The method as set forth in claim 1, wherein:

said $V_1$ is about a threshold voltage that causes said liquid crystal layer to start acting, while said $V_2$ exceeds 1.5 times the threshold voltage and not greater than 5 times the threshold voltage;

a twist angle is given as:

$$-\frac{23}{\left(\frac{V_2}{V_1} - 1\right)} + 73$$

$\Delta nd/\lambda$, obtained by dividing a product $\Delta nd$ of a liquid crystal layer thickness d and a difference $\Delta n$ between indexes of refraction of the liquid crystalline material at a wavelength in a range of wavelengths used, by at least one wavelength $\lambda$, satisfies:

$$\frac{0.31}{\left(\frac{V_2}{V_1} - 1\right)^2} + 0.38 \leq \frac{\Delta nd}{\lambda} \leq \frac{0.36}{\left(\frac{V_2}{V_1} - 1\right)^2} + 0.44.$$

11. The method as set forth in claim 1, wherein said liquid crystal layer exhibits a horizontal alignment without twist.

12. The method as set forth in claim 1, wherein said liquid crystal layer exhibits a horizontal alignment with twist.

13. The method as set forth in claim 1, wherein said liquid crystal layer is nematic liquid crystal.

14. A liquid crystal display device as a liquid crystal modulation element that includes one or a plurality of optical modulation elements for modulating a polarization state of light, one of said optical modulation elements being an optically anisotropic object having a liquid crystal layer, said liquid crystal display device being produced by:

given:

that optical modulation effects of said optical modulation element are expressed by Mueller matrices, respectively;

that said Mueller matrices are multiplied from left in a light transmission order so as to obtain a Mueller matrix given as $M_{LCD}$;

that, one of V1 and V2 of a control factor V of said optical modulation element is for dark state of display, and the other one is for bright state of display; and that Mueller matrices regarding light since immediately before incidence to the optically anisotropic object until immediately after outgoing therefrom when $V = V_1$ and when $V = V_2$ are given as $M(V_1)$ and $M(V_2)$, respectively, deriving a Mueller matrix $M\alpha$ expressed as:

$$M\alpha = M(V_2) M(V_1)^{-1}$$

and, evaluating optical modulation characteristics of said liquid crystal modulation element by:

expressing a QOM that is a predetermined quantity of said optically anisotropic object with elements of said $M\alpha$;

arranging said QOM so as to be proportional to a difference between a value in the bright display and a value in the dark display of an (0,0)element of said $M_{LCD}$, the (0,0) element indicating a brightness of said liquid crystal modulation element; and using the QOM as an index for a brightness modulation quantity equivalent to a difference between brightness of the bright display and that of the dark display.

15. An evaluation device for evaluating optical modulation characteristics of a liquid crystal modulation element that includes one or a plurality of optical modulation elements for modulating a polarization state of light, one of said optical modulation elements being an optically anisotropic object having a liquid crystal layer, said evaluation device comprising:

given:
that optical modulation effects of said optical modulation element are expressed by Mueller matrices, respectively;
that said Mueller matrices are multiplied from left in a light transmission order so as to obtain a Mueller matrix given as $M_{LCD}$;
that, one of V1 and V2 of a control factor V of said optical modulation element is for dark state of display, and the other one is for bright state of display; and
that Mueller matrices regarding light since immediately before incidence to the optically anisotropic object until immediately after outgoing therefrom when $V=V_1$ and when $V=V_2$ are given as $M(V_1)$ and $M(V_2)$, respectively, matrix calculation means for deriving a Mueller matrix $M\alpha$ expressed as:

$$M\alpha = M(V_2)M(V_1)^{-1}$$

and, evaluating means for evaluating the optical modulation characteristics of said liquid crystal modulation element, by:
expressing a QOM that is a predetermined quantity of said optically anisotropic object with elements of said $M\alpha$;
arranging said QOM so as to be proportional to a difference between a value in the bright display and a value in the dark display of an (0,0)element of said $M_{LCD}$, the (0,0) element indicating a brightness of said liquid crystal modulation element; and
using the QOM as an index for a brightness modulation quantity equivalent to a difference between brightness of the bright display and that of the dark display.

16. A computer-readable storage medium storing program for evaluating optical modulation characteristics of a liquid crystal modulation element, said liquid crystal modulation element including one or a plurality of optical modulation elements for modulating a polarization state of light, one of said optical modulation elements being an optically anisotropic object having a liquid crystal layer, said program being for evaluating optical modulation characteristics of said liquid crystal modulation element by:

given:
that optical modulation effects of said optical modulation element are expressed by Mueller matrices, respectively;
that said Mueller matrices are multiplied from left in a light transmission order so as to obtain a Mueller matrix given as $M_{LCD}$;
that, one of V1 and V2 of a control factor V of said optical modulation element is for dark state of display, and the other one is for bright state of display; and
that matrices regarding light since immediately before incidence to the optically anisotropic object until immediately after outgoing therefrom when $V=V_1$ and when $V=V_2$ are given as $M(V_1)$ and $M(V_2)$, respectively, deriving a Mueller matrix $M\alpha$ expressed as:

$$M\alpha = M(V_2)M(V_1)^{-1}$$

and, evaluating the optical modulation characteristics of said liquid crystal modulation element, by:
expressing a QOM that is a predetermined quantity of said optically anisotropic object with elements of said $M\alpha$;
arranging said QOM so as to be proportional to a difference between a value in the bright display and a value in the dark display of an (0,0)element of said $M_{LCD}$, the (0,0) element indicating a brightness of said liquid crystal modulation element; and
using the QOM as an index for a brightness modulation quantity equivalent to a difference between brightness of the bright display and that of the dark display.

* * * * *